(12) United States Patent
Rubenstein

(10) Patent No.: US 11,558,347 B2
(45) Date of Patent: Jan. 17, 2023

(54) SYSTEM AND METHOD FOR NETWORK TAPESTRY MULTIPROTOCOL INTEGRATION

(71) Applicant: UMBRA Technologies Ltd., Hong Kong (CN)

(72) Inventor: Joseph E. Rubenstein, Beijing (CN)

(73) Assignee: UMBRA TECHNOLOGIES LTD., Hong Kong (CN)

( * ) Notice: Subject to any disclaimer, the term of this patent is extended or adjusted under 35 U.S.C. 154(b) by 0 days.

(21) Appl. No.: 15/580,570

(22) PCT Filed: Jun. 13, 2016

(86) PCT No.: PCT/IB2016/001161
§ 371 (c)(1),
(2) Date: Dec. 7, 2017

(87) PCT Pub. No.: WO2016/198961
PCT Pub. Date: Dec. 15, 2016

(65) Prior Publication Data
US 2020/0145375 A1 May 7, 2020

Related U.S. Application Data

(60) Provisional application No. 62/174,394, filed on Jun. 11, 2015.

(51) Int. Cl.
*H04L 69/18* (2022.01)
*H04L 9/40* (2022.01)
(Continued)

(52) U.S. Cl.
CPC ........ *H04L 63/0218* (2013.01); *H04L 45/243* (2022.05); *H04L 45/302* (2013.01);
(Continued)

(58) Field of Classification Search
CPC . H04L 63/0218; H04L 67/1097; H04L 69/18; H04L 67/1095; H04L 49/358
See application file for complete search history.

(56) References Cited

U.S. PATENT DOCUMENTS 4,890,281 A  12/1989  Balboni et al.
5,828,847 A  10/1998  Gehr et al.
(Continued)

FOREIGN PATENT DOCUMENTS

CN  1315088 A  9/2001
CN  1392708 A  1/2003
(Continued)

OTHER PUBLICATIONS

Definition of "server" in Microsoft Computer Dictionary, 2002, Fifth Edition, Microsoft Press (Year: 2002).*
(Continued)

*Primary Examiner* — Jeffery L Williams
*Assistant Examiner* — Zhimei Zhu
(74) *Attorney, Agent, or Firm* — Wilmer Cutler Pickering Hale and Dorr LLP

(57) ABSTRACT

Systems and methods for connecting devices via a virtual global network across network fabrics using a network tapestry are disclosed. The network system comprises a first access point server in communication with a first backbone exchange server, a second access point server in communication with a second backbone exchange server, and a network tapestry comprising a first communication path connecting the first and second access point servers and a second communication path connecting the first and second backbone exchange servers.

16 Claims, 69 Drawing Sheets

(51) Int. Cl.
*H04L 49/356* (2022.01)
*H04L 67/1095* (2022.01)
*H04L 67/1097* (2022.01)
*H04L 45/302* (2022.01)
*H04L 45/243* (2022.01)

(52) U.S. Cl.
CPC ........ *H04L 49/358* (2013.01); *H04L 67/1095* (2013.01); *H04L 67/1097* (2013.01); *H04L 69/18* (2013.01)

(56) References Cited

U.S. PATENT DOCUMENTS

| | | | |
|---|---|---|---|
| 5,893,089 A | 4/1999 | Kikinis | |
| 6,209,039 B1 | 3/2001 | Albright et al. | |
| 6,463,465 B1 | 10/2002 | Nieuwejaar | |
| 6,477,166 B1 | 11/2002 | Sanzi et al. | |
| 6,593,863 B2 | 7/2003 | Pitio | |
| 6,611,587 B2 | 8/2003 | Brown et al. | |
| 6,671,361 B2 | 12/2003 | Goldstein | |
| 6,678,241 B1 * | 1/2004 | Gai ................ H04L 12/462 | |
| | | | 370/216 |
| 6,690,223 B1 | 2/2004 | Wan | |
| 6,735,207 B1 | 5/2004 | Prasad et al. | |
| 6,879,995 B1 | 4/2005 | Chinta et al. | |
| 6,973,048 B2 | 12/2005 | Pitio | |
| 6,996,117 B2 | 2/2006 | Lee et al. | |
| 7,006,505 B1 | 2/2006 | Bleszynski et al. | |
| 7,039,701 B2 | 5/2006 | Wesley | |
| 7,069,318 B2 | 6/2006 | Burbeck et al. | |
| 7,145,882 B2 | 12/2006 | Limaye et al. | |
| 7,145,922 B2 | 12/2006 | Pitio | |
| 7,161,899 B2 | 1/2007 | Limaye et al. | |
| 7,161,965 B2 | 1/2007 | Pitio | |
| 7,173,902 B2 | 2/2007 | Daniell et al. | |
| 7,177,929 B2 | 2/2007 | Burbeck et al. | |
| 7,221,687 B2 | 5/2007 | Shugard | |
| 7,224,706 B2 | 5/2007 | Loeffler-Lejeune | |
| 7,254,833 B1 | 8/2007 | Cornelius et al. | |
| 7,269,130 B2 | 9/2007 | Pitio | |
| 7,310,348 B2 | 12/2007 | Trinh et al. | |
| 7,349,403 B2 | 3/2008 | Lee et al. | |
| 7,349,411 B2 | 3/2008 | Pitio | |
| 7,349,435 B2 | 3/2008 | Giacomini | |
| 7,433,964 B2 | 10/2008 | Raguram et al. | |
| 7,551,623 B1 | 6/2009 | Feroz et al. | |
| 7,577,691 B2 | 8/2009 | Novik et al. | |
| 7,587,487 B1 | 9/2009 | Gunturu | |
| 7,633,909 B1 | 12/2009 | Jones et al. | |
| 7,689,722 B1 | 3/2010 | Timms et al. | |
| 7,742,405 B2 | 6/2010 | Trinh et al. | |
| 7,742,411 B2 | 6/2010 | Trinh et al. | |
| 7,801,030 B1 | 9/2010 | Aggarwal et al. | |
| 7,822,877 B2 | 10/2010 | Chong et al. | |
| 7,870,418 B2 | 1/2011 | Sekaran et al. | |
| 7,886,305 B2 | 2/2011 | Ahmed et al. | |
| 7,930,339 B2 | 4/2011 | Tobita et al. | |
| 7,957,311 B2 | 6/2011 | Trinh et al. | |
| 8,010,751 B2 | 8/2011 | Yang et al. | |
| 8,064,909 B2 | 11/2011 | Spinelli et al. | |
| 8,069,258 B1 | 11/2011 | Howell | |
| 8,069,435 B1 | 11/2011 | Lai | |
| 8,073,777 B2 | 12/2011 | Barry et al. | |
| 8,107,363 B1 | 1/2012 | Saluja | |
| 8,266,672 B2 | 9/2012 | Moore | |
| 8,401,028 B2 | 3/2013 | Mihaly et al. | |
| 8,422,397 B2 | 4/2013 | Ansari et al. | |
| 8,437,641 B2 | 5/2013 | Lee et al. | |
| 8,458,786 B1 | 6/2013 | Kailash et al. | |
| 8,544,065 B2 | 9/2013 | Archer et al. | |
| 8,611,335 B1 | 12/2013 | Wu et al. | |
| 8,611,355 B1 | 12/2013 | Sella et al. | |
| 8,625,411 B2 | 1/2014 | Srivivasan et al. | |
| 8,769,057 B1 | 7/2014 | Breau et al. | |
| 8,798,060 B1 | 8/2014 | Vautrin et al. | |
| 8,861,344 B2 | 10/2014 | Trinh et al. | |
| 8,874,680 B1 * | 10/2014 | Das ................ G06F 3/0655 | |
| | | | 709/212 |
| 8,966,075 B1 | 2/2015 | Chickering et al. | |
| 8,976,798 B2 | 3/2015 | Border et al. | |
| 9,015,310 B2 | 4/2015 | Ochi | |
| 9,038,151 B1 | 5/2015 | Chua et al. | |
| 9,110,820 B1 | 8/2015 | Bent et al. | |
| 9,164,702 B1 | 10/2015 | Nesbit et al. | |
| 9,167,501 B2 | 10/2015 | Kempf et al. | |
| 9,172,603 B2 | 10/2015 | Padmanabhan et al. | |
| 9,241,004 B1 | 1/2016 | April | |
| 9,253,028 B2 | 2/2016 | DeCusatis et al. | |
| 9,277,452 B1 | 3/2016 | Aithal et al. | |
| 9,294,304 B2 | 3/2016 | Sindhu | |
| 9,350,644 B2 | 5/2016 | Desai et al. | |
| 9,350,710 B2 | 5/2016 | Herle et al. | |
| 9,351,193 B2 | 5/2016 | Raleigh et al. | |
| 9,432,258 B2 | 8/2016 | Van der Merwe et al. | |
| 9,432,336 B2 | 8/2016 | Ostrowski | |
| 9,450,817 B1 | 9/2016 | Bahadur et al. | |
| 9,455,924 B2 | 9/2016 | Cicic et al. | |
| 9,461,996 B2 | 10/2016 | Hayton et al. | |
| 9,525,663 B2 | 12/2016 | Yuan et al. | |
| 9,525,696 B2 | 12/2016 | Kapoor et al. | |
| 9,544,137 B1 | 1/2017 | Brandwine | |
| 9,565,117 B2 | 2/2017 | Dahod et al. | |
| 9,569,587 B2 | 2/2017 | Ansari et al. | |
| 9,590,820 B1 | 3/2017 | Shukla | |
| 9,590,902 B2 | 3/2017 | Lin et al. | |
| 9,699,001 B2 | 7/2017 | Addanki et al. | |
| 9,699,135 B2 | 7/2017 | Dinha | |
| 9,729,539 B1 | 8/2017 | Agrawal et al. | |
| 9,858,559 B2 | 1/2018 | Raleigh et al. | |
| 9,888,042 B2 | 2/2018 | Annamalaisami et al. | |
| 9,898,317 B2 | 2/2018 | Nakil et al. | |
| 10,044,678 B2 | 8/2018 | Van der Merwe et al. | |
| 10,061,664 B2 | 8/2018 | Verkaik et al. | |
| 10,070,369 B2 | 9/2018 | Lynn, Jr. et al. | |
| 10,078,754 B1 | 9/2018 | Brandwine et al. | |
| 10,079,839 B1 | 9/2018 | Bryan et al. | |
| 10,091,304 B2 | 10/2018 | Hoffmann | |
| 10,237,253 B2 | 3/2019 | Chen | |
| 10,331,472 B2 | 6/2019 | Wang | |
| 10,574,482 B2 | 2/2020 | Ore et al. | |
| 10,673,712 B1 | 6/2020 | Gosar et al. | |
| 10,756,929 B2 | 8/2020 | Knutsen et al. | |
| 10,904,201 B1 | 1/2021 | Ermagan et al. | |
| 11,032,187 B2 | 6/2021 | Hassan | |
| 2002/0007350 A1 | 1/2002 | Yen | |
| 2002/0029267 A1 * | 3/2002 | San ................ G06Q 30/02 | |
| | | | 709/224 |
| 2002/0046253 A1 | 4/2002 | Uchida et al. | |
| 2002/0049901 A1 | 4/2002 | Carvey | |
| 2002/0087447 A1 | 7/2002 | McDonald et al. | |
| 2002/0186654 A1 * | 12/2002 | Tornar ............. H04L 12/4608 | |
| | | | 370/225 |
| 2003/0046529 A1 | 3/2003 | Loison et al. | |
| 2003/0110214 A1 | 6/2003 | Sato | |
| 2003/0147403 A1 | 8/2003 | Border et al. | |
| 2003/0195973 A1 | 10/2003 | Savarda | |
| 2003/0233551 A1 | 12/2003 | Kouznetsov et al. | |
| 2004/0205339 A1 | 10/2004 | Medin | |
| 2004/0268151 A1 | 12/2004 | Matsuda | |
| 2005/0203892 A1 | 9/2005 | Wesley et al. | |
| 2005/0208926 A1 | 9/2005 | Hamada | |
| 2005/0235352 A1 | 10/2005 | Staats et al. | |
| 2006/0020793 A1 | 1/2006 | Rogers et al. | |
| 2006/0031407 A1 | 2/2006 | Dispensa et al. | |
| 2006/0031483 A1 | 2/2006 | Lund et al. | |
| 2006/0047944 A1 | 3/2006 | Kilian-Kehr | |
| 2006/0075057 A1 | 4/2006 | Gildea et al. | |
| 2006/0179150 A1 | 8/2006 | Farley et al. | |
| 2006/0195896 A1 | 8/2006 | Fulp et al. | |
| 2006/0225072 A1 | 10/2006 | Lari et al. | |
| 2007/0112812 A1 | 5/2007 | Harvey et al. | |
| 2007/0165672 A1 | 7/2007 | Keels et al. | |
| 2007/0168486 A1 | 7/2007 | McCoy et al. | |
| 2007/0168517 A1 | 7/2007 | Weller et al. | |

(56) References Cited

U.S. PATENT DOCUMENTS

| | | |
|---|---|---|
| 2007/0226043 A1 | 9/2007 | Pietsch et al. |
| 2008/0010676 A1 | 1/2008 | Dosa Racz et al. |
| 2008/0043742 A1 | 2/2008 | Pong et al. |
| 2008/0091598 A1 | 4/2008 | Fauleau |
| 2008/0117927 A1 | 5/2008 | Donhauser et al. |
| 2008/0130891 A1 | 6/2008 | Sun et al. |
| 2008/0168377 A1 | 7/2008 | Stallings et al. |
| 2008/0240121 A1 | 10/2008 | Xiong et al. |
| 2008/0256166 A1 | 10/2008 | Branson et al. |
| 2008/0260151 A1 | 10/2008 | Fluhrer et al. |
| 2008/0301794 A1 | 12/2008 | Lee |
| 2009/0003223 A1 | 1/2009 | McCallum et al. |
| 2009/0092043 A1 | 4/2009 | Lapuh et al. |
| 2009/0100165 A1 | 4/2009 | Wesley, Sr. et al. |
| 2009/0106569 A1 | 4/2009 | Roh et al. |
| 2009/0122990 A1 | 5/2009 | Gundavelli et al. |
| 2009/0129386 A1 | 5/2009 | Rune |
| 2009/0132621 A1 | 5/2009 | Jensen et al. |
| 2009/0141734 A1* | 6/2009 | Brown .................. H04L 45/742 370/419 |
| 2009/0144416 A1 | 6/2009 | Chatley et al. |
| 2009/0144443 A1 | 6/2009 | Vasseur et al. |
| 2009/0193428 A1 | 7/2009 | Dalberg et al. |
| 2009/0213754 A1 | 8/2009 | Melamed |
| 2009/0217109 A1 | 8/2009 | Sekaran et al. |
| 2009/0259798 A1 | 10/2009 | Wang et al. |
| 2010/0017603 A1 | 1/2010 | Jones |
| 2010/0131616 A1 | 5/2010 | Walter et al. |
| 2010/0250700 A1* | 9/2010 | O'Brien ................ G06F 3/0635 709/217 |
| 2010/0316052 A1 | 12/2010 | Petersen |
| 2010/0325309 A1 | 12/2010 | Cicic et al. |
| 2011/0007652 A1 | 1/2011 | Bai |
| 2011/0185006 A1 | 7/2011 | Raghav et al. |
| 2011/0231917 A1 | 9/2011 | Chaturvedi et al. |
| 2011/0247063 A1 | 10/2011 | Aabye et al. |
| 2011/0268435 A1 | 11/2011 | Mizutani et al. |
| 2011/0314473 A1 | 12/2011 | Yang et al. |
| 2012/0005264 A1 | 1/2012 | McWhirter et al. |
| 2012/0005307 A1 | 1/2012 | Das et al. |
| 2012/0082057 A1 | 4/2012 | Welin et al. |
| 2012/0105637 A1 | 5/2012 | Yousefi et al. |
| 2012/0158882 A1* | 6/2012 | Oehme ............... G06F 16/1858 709/213 |
| 2012/0179904 A1 | 7/2012 | Dunn et al. |
| 2012/0185559 A1 | 7/2012 | Wesley, Sr. et al. |
| 2012/0188867 A1 | 7/2012 | Fiorone et al. |
| 2012/0196646 A1 | 8/2012 | Crinon et al. |
| 2012/0210417 A1 | 8/2012 | Shieh |
| 2012/0270580 A1 | 10/2012 | Anisimov et al. |
| 2012/0320916 A1* | 12/2012 | Sebastian ............. H04N 21/835 370/390 |
| 2013/0173900 A1 | 7/2013 | Liu |
| 2013/0247167 A1 | 9/2013 | Paul et al. |
| 2013/0259465 A1 | 10/2013 | Blair |
| 2013/0283118 A1 | 10/2013 | Rayner |
| 2013/0286835 A1 | 10/2013 | Plamondon et al. |
| 2013/0287037 A1 | 10/2013 | Bush et al. |
| 2013/0308471 A1 | 11/2013 | Krzanowski et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0020942 A1 | 1/2014 | Cho et al. |
| 2014/0071835 A1 | 3/2014 | Sun et al. |
| 2014/0086253 A1 | 3/2014 | Yong |
| 2014/0101036 A1 | 4/2014 | Phillips et al. |
| 2014/0149552 A1 | 5/2014 | Carney et al. |
| 2014/0169214 A1* | 6/2014 | Nakajima ............... H04L 41/12 370/254 |
| 2014/0181248 A1 | 6/2014 | Deutsch et al. |
| 2014/0210693 A1 | 7/2014 | Bhamidipati et al. |
| 2014/0215059 A1 | 7/2014 | Astiz Lezaun et al. |
| 2014/0226456 A1* | 8/2014 | Khan .................. H04W 40/30 370/216 |
| 2014/0229945 A1 | 8/2014 | Barkai et al. |
| 2014/0237464 A1 | 8/2014 | Waterman et al. |
| 2014/0250066 A1 | 9/2014 | Calkowski et al. |
| 2014/0269712 A1 | 9/2014 | Kidambi |
| 2014/0278543 A1 | 9/2014 | Kasdon |
| 2014/0280911 A1 | 9/2014 | Wood et al. |
| 2014/0289826 A1 | 9/2014 | Croome |
| 2014/0310243 A1 | 10/2014 | McGee et al. |
| 2014/0337459 A1 | 11/2014 | Kuang et al. |
| 2014/0341023 A1 | 11/2014 | Kim et al. |
| 2014/0359704 A1 | 12/2014 | Chen |
| 2014/0369230 A1 | 12/2014 | Nallur |
| 2015/0006596 A1 | 1/2015 | Fukui et al. |
| 2015/0063117 A1 | 3/2015 | DiBurro et al. |
| 2015/0063360 A1 | 3/2015 | Thakkar et al. |
| 2015/0089582 A1 | 3/2015 | Dilley et al. |
| 2015/0095384 A1 | 4/2015 | Antony et al. |
| 2015/0128246 A1 | 5/2015 | Feghali et al. |
| 2015/0222637 A1 | 8/2015 | Hung et al. |
| 2015/0248434 A1 | 9/2015 | Avati et al. |
| 2015/0271104 A1 | 9/2015 | Chikkamath et al. |
| 2015/0281176 A1 | 10/2015 | Banfield |
| 2015/0326588 A1 | 11/2015 | Vissamsetty et al. |
| 2015/0363230 A1 | 12/2015 | Kasahara et al. |
| 2016/0006695 A1 | 1/2016 | Prodoehl et al. |
| 2016/0028586 A1 | 1/2016 | Blair |
| 2016/0028770 A1 | 1/2016 | Raleigh et al. |
| 2016/0055323 A1 | 2/2016 | Stuntebeck et al. |
| 2016/0105530 A1 | 4/2016 | Shribman et al. |
| 2016/0117277 A1 | 4/2016 | Raindel et al. |
| 2016/0119279 A1 | 4/2016 | Maslak et al. |
| 2016/0127492 A1 | 5/2016 | Malwankar et al. |
| 2016/0134543 A1 | 5/2016 | Zhang et al. |
| 2016/0165463 A1 | 6/2016 | Zhang |
| 2016/0226755 A1 | 8/2016 | Hammam et al. |
| 2016/0261575 A1 | 9/2016 | Maldaner |
| 2016/0285977 A1 | 9/2016 | Ng et al. |
| 2016/0308762 A1 | 10/2016 | Teng et al. |
| 2016/0330736 A1* | 11/2016 | Polehn .............. H04W 72/0446 |
| 2016/0337223 A1 | 11/2016 | Mackay |
| 2016/0337484 A1 | 11/2016 | Tola |
| 2016/0352628 A1* | 12/2016 | Reddy ................. H04L 12/4633 |
| 2016/0364158 A1 | 12/2016 | Narayanan et al. |
| 2016/0366233 A1* | 12/2016 | Le .......................... H04L 67/16 |
| 2017/0063920 A1* | 3/2017 | Thomas ............... H04L 63/1408 |
| 2017/0078922 A1 | 3/2017 | Raleigh et al. |
| 2017/0105142 A1 | 4/2017 | Hecht et al. |
| 2017/0201556 A1 | 7/2017 | Fox et al. |
| 2017/0230821 A1 | 8/2017 | Chong et al. |
| 2017/0344703 A1 | 11/2017 | Ansari et al. |
| 2018/0013583 A1 | 1/2018 | Rubenstein et al. |
| 2018/0024873 A1 | 1/2018 | Milliron et al. |
| 2018/0091417 A1 | 3/2018 | Ore et al. |
| 2018/0198756 A1 | 7/2018 | Dawes |
| 2020/0382341 A1 | 12/2020 | Ore et al. |
| 2021/0044453 A1 | 2/2021 | Knutsen et al. |
| 2021/0342725 A1 | 11/2021 | Marsden et al. |
| 2021/0345188 A1 | 11/2021 | Shaheen |

FOREIGN PATENT DOCUMENTS

| | | |
|---|---|---|
| CN | 1536824 A | 10/2004 |
| CN | 1754161 A | 3/2006 |
| CN | 1829177 A | 9/2006 |
| CN | 101282448 A | 10/2008 |
| CN | 101478533 A | 7/2009 |
| CN | 101599888 A | 12/2009 |
| CN | 101765172 A | 6/2010 |
| CN | 101855865 A | 10/2010 |
| CN | 102006646 A | 4/2011 |
| CN | 102209355 A | 10/2011 |
| CN | 102340538 A | 2/2012 |
| CN | 102457539 A | 5/2012 |
| CN | 102687480 A | 9/2012 |
| CN | 102739434 | 10/2012 |
| CN | 103384992 A | 11/2013 |
| CN | 103828297 A | 5/2014 |
| CN | 102255794 B | 7/2014 |
| CN | 104320472 A | 1/2015 |

(56) References Cited

FOREIGN PATENT DOCUMENTS

| | | |
|---|---|---|
| EP | 1498809 A1 | 1/2005 |
| EP | 1530761 A2 | 5/2005 |
| EP | 1635253 A2 | 3/2006 |
| EP | 2154834 A1 | 2/2010 |
| EP | 2357763 A1 | 8/2011 |
| WO | WO-2003025709 A2 | 3/2003 |
| WO | WO-03/041360 A2 | 5/2003 |
| WO | WO-2003/090018 A2 | 10/2003 |
| WO | WO-2003088047 A1 | 10/2003 |
| WO | WO-2003090017 A2 | 10/2003 |
| WO | WO-2006/055838 A2 | 5/2006 |
| WO | WO-2008/058088 A1 | 5/2008 |
| WO | WO-2008/067323 A2 | 6/2008 |
| WO | WO-2010/072030 A1 | 7/2010 |
| WO | WO-2012100087 A2 | 7/2012 |
| WO | WO-2013/120069 A1 | 8/2013 |
| WO | WO-2013135753 A1 * | 9/2013 ......... H04L 12/4633 |
| WO | WO-2015/021343 A1 | 2/2015 |
| WO | WO-2016/094291 A1 | 6/2016 |
| WO | WO-2016/110785 A1 | 7/2016 |
| WO | WO-2016/123293 A1 | 8/2016 |
| WO | WO-2016/162748 A1 | 10/2016 |
| WO | WO-2016/162749 A1 | 10/2016 |
| WO | WO-2016/164612 A1 | 10/2016 |
| WO | WO-2016/198961 A2 | 12/2016 |

OTHER PUBLICATIONS

Definition of "backbone" in Microsoft Computer Dictionary, 2002, Fifth Edition, Microsoft Press (Year: 2002).*
"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis Cedex; France, vol. ORI, No. V4.1.1, Oct. 1, 2014 (185 pages).
Robert Russell, "Introduction to RDMA Programming," retrieved from the Internet: URL:web.archive.org/web/20140417205540/http://www.cs.unh.edu/~rdr/rdma-intro-module.ppt Apr. 17, 2014 (76 pages).
"Operations and Quality of Service Telegraph Services, Global Virtual Network Service," ITU-T Standard, International Telecommunication Union, Geneva, Switzerland, No. F.16, Feb. 21, 1995, pp. 1-23 (23 pages).
Baumgartner, A. et al., "Mobile core network virtualization: A model for combined virtual core network function placement and topology optimization," Proceedings of the 2015 1st IEEE Conference on Network Softwarization (NetSoft), London, UK, 2015, pp. 1-9, doi: 10.1109/NETSOFT, 2015 (9 pages).
Chen, Y. et al., "Resilient Virtual Network Service Provision in Network Virtualization Environments," 2010 IEEE 16th International Conference on Parallel and Distributed Systems, Shanghai, China, 2010, pp. 51-58, doi: 10.1109/ICPADS.2010.26., 2010 (8 pages).
Examination Report, dated Aug. 2, 2018, for European Patent Application No. 16734942.2 (8 pages).
Examination Report, dated Jul. 20, 2017, for Chinese Application No. 201680004969.3 (1 page).
Examination Report, dated Mar. 3, 2020, for Chinese Application No. 201680020937.2 (9 pages).
Examination Report, dated Mar. 5, 2020, for Chinese Patent Application No. 201580066318.2 (10 pages).
Examination Report, dated Oct. 19, 2018, for European Patent Application No. 16727220.2 (11 pages).
Extended European Search Report dated Sep. 7, 2018 received in related European Patent Application No. 16744078.3 (7 pages).
Extended European Search Report, dated Aug. 2, 2018, for European Patent Application No. 15866542.2 (8 pages).
Extended European Search Report, dated Sep. 7, 2018, for European Patent Application No. 16777297.9 (4 pages).
Extended Search Report, dated Nov. 29, 2018, for European Patent Application No. 16806960.7 (10 pages).
Figueiredo, R. J. et al., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008 (6 pages).
International Search Report and Written Opinion, dated Apr. 8, 2016, for International Application No. PCT/US2016/015278 (9 pages).
International Search Report and Written Opinion, dated Aug. 10, 2016, for International Application No. PCT/IB2016/000531 (20 pages).
International Search Report and Written Opinion, dated Aug. 23, 2017, for International Application No. PCT/IB2017/000580 (6 pages).
International Search Report and Written Opinion, dated Dec. 28, 2016, for International Application No. PCT/IB2016/001161 (7 pages).
International Search Report and Written Opinion, dated Feb. 12, 2016, for International Application No. PCT/US2015/064242 (9 pages).
International Search Report and Written Opinion, dated Jul. 28, 2017, for International Application No. PCT/IB2017/000557 (6 pages).
International Search Report and Written Opinion, dated Jul. 7, 2016, for International Application No. PCT/US2016/026489 (7 pages).
International Search Report and Written Opinion, dated Jun. 7, 2016, for International Application No. PCT/IB2016/000110 (8 pages).
International Search Report and Written Opinion, dated May 11, 2017, for International Application No. PCT/IB2016/001867 (13 pages).
International Search Report and Written Opinion, dated Sep. 1, 2017, for International Application No. PCT/IB2017/000613 (7 pages).
International Search Report and Written Opinion, dated Sep. 23, 2016, for International Application No. PCT/IB2016/000528 (11 pages).
Gong L. et al., "Revenue-Driven Virtual Network Embedding Based on Global Resource Information", Globecom 2013, Next Generation Networking Symposium, pp. 2294-2299. (Year: 2013) (6 pages).
Chowdhury, N.M.M.K. et al., "Virtual Network Embedding with Coordinated Node and Link Mapping", IEEE Communications Society Subject Matter Experts for Publication in the IEEE Infocom 2009, pp. 783-791. (Year: 2009) (9 pages).
Office Action, dated Jun. 3, 2020, for Chinese Patent Application No. 201680066545.X (11 pages).
Office Action, dated Mar. 12, 2020, for Chinese Patent Application No. 201680032657.3 (5 pages).
Office Action, dated Mar. 13, 2020, received in related Chinese Patent Application No. 201680021239.4 (9 pages).
Office Action, dated May 7, 2020, for Chinese Patent Application No. 201680020878.9 (7 pages).
Haeri, S. et al., "Global Resource Capacity Algorithm with Path Splitting for Virtual Network Embedding", 2016 IEEE, pp. 666-669. (Year: 2016) (4 pages).
Supplementary Partial European Search Report, dated May 20, 2019, for European Patent Application No. 16872483.9 (8 pages).
Szeto, W. et al., "A multi-commodity flow based approach to virtual network resource allocation," GLOBECOM1 03. IEEE Global Telecommunications Conference (IEEE Cat. No. 03CH37489), San Francisco, CA, USA, 2003, pp. 3004-3008, vol. 6, doi: 10.1109/GLOCOM.2003.1258787, 2003 (5 pages).
Supplementary European Search Report, dated Dec. 11, 2019, for European Patent Application No. 17788882.3 (8 pages).

* cited by examiner

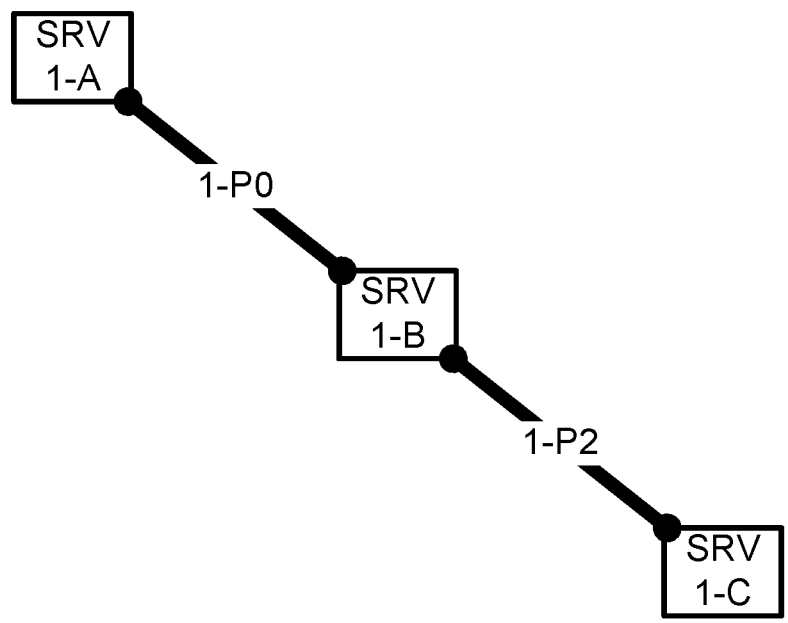
Figure # 1

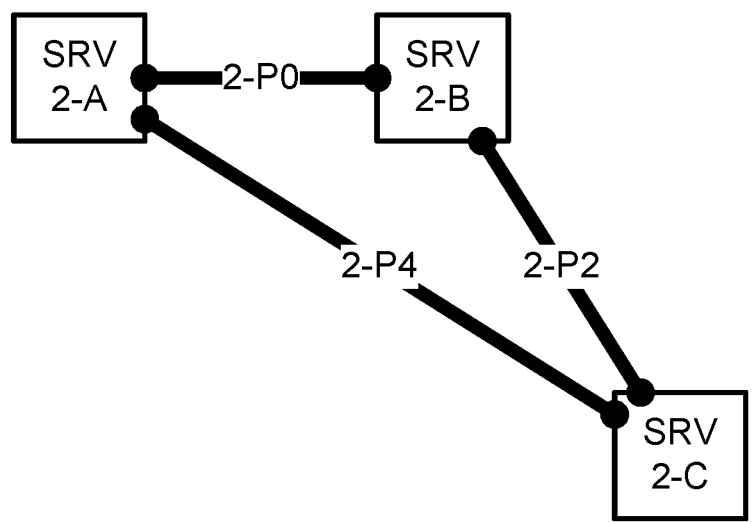
Figure # 2

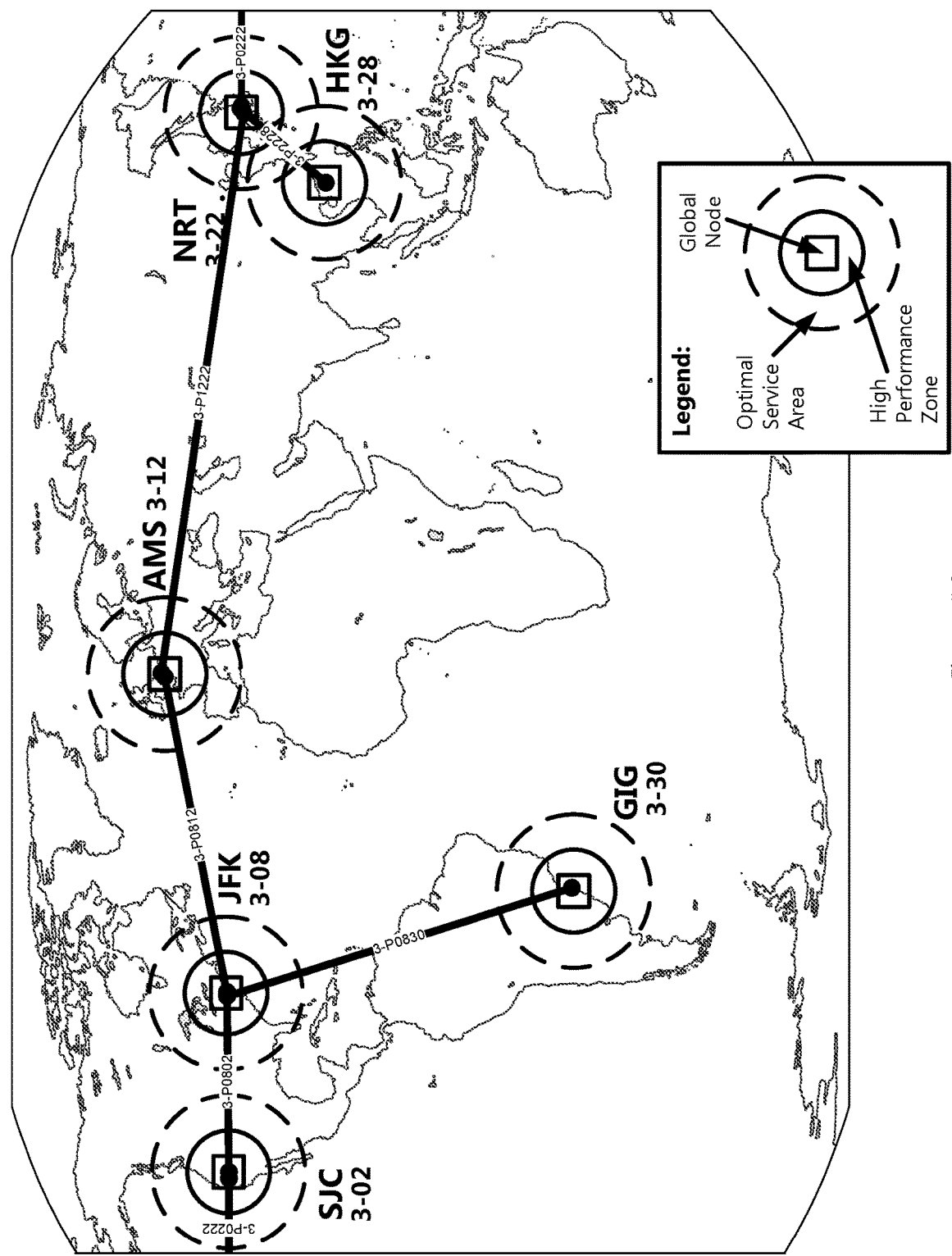
Figure # 3

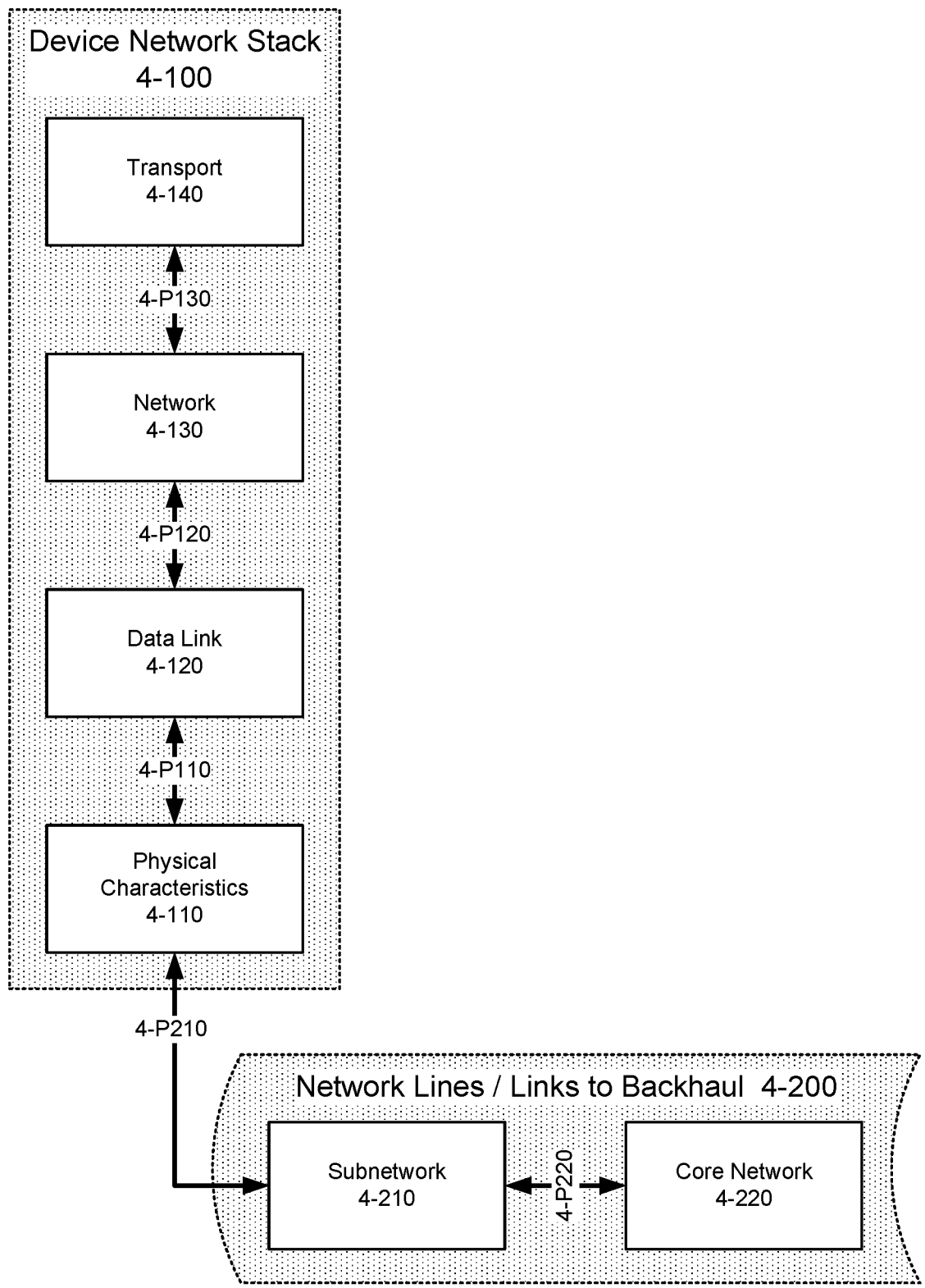
Figure # 4

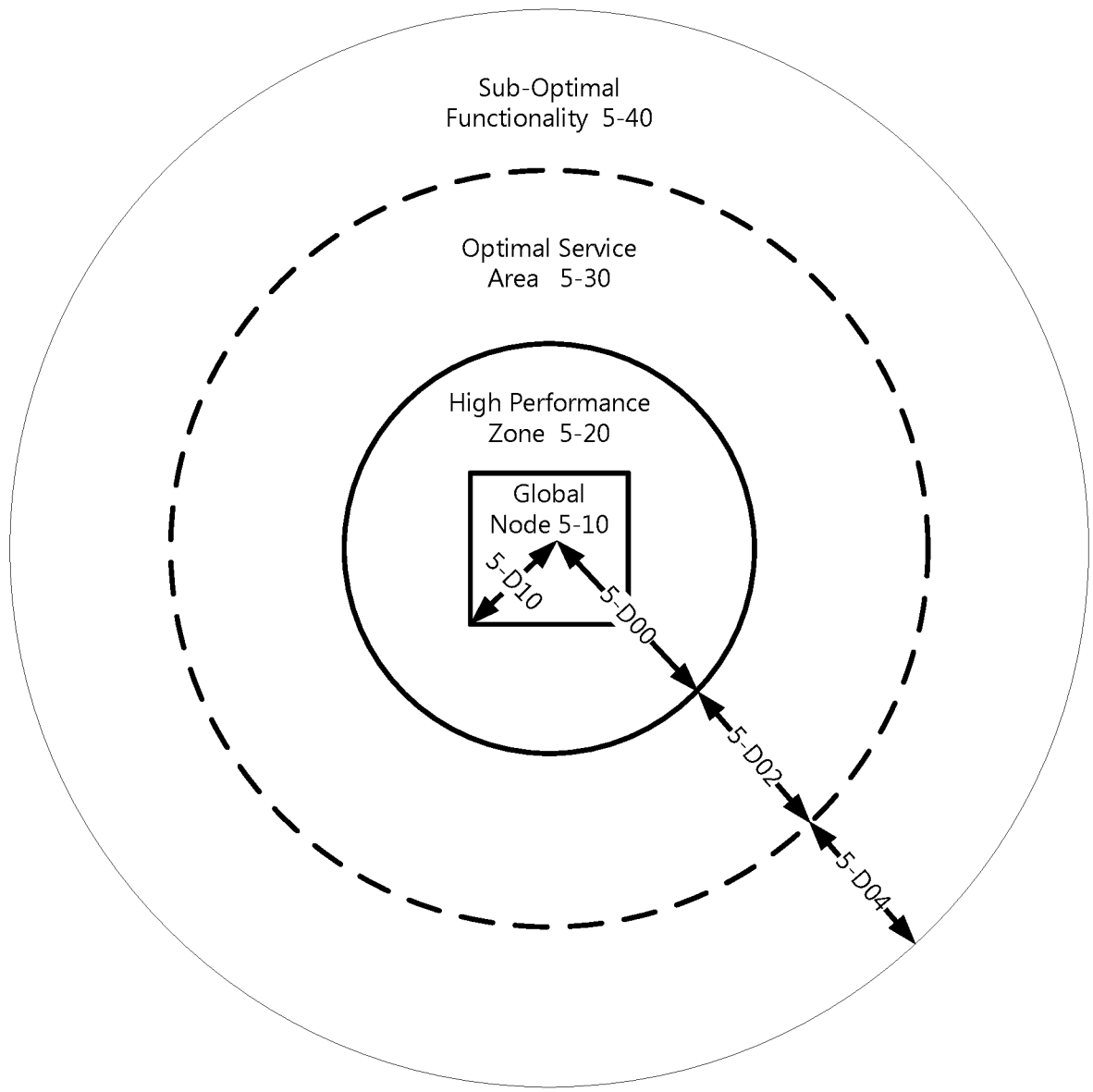
Figure # 5

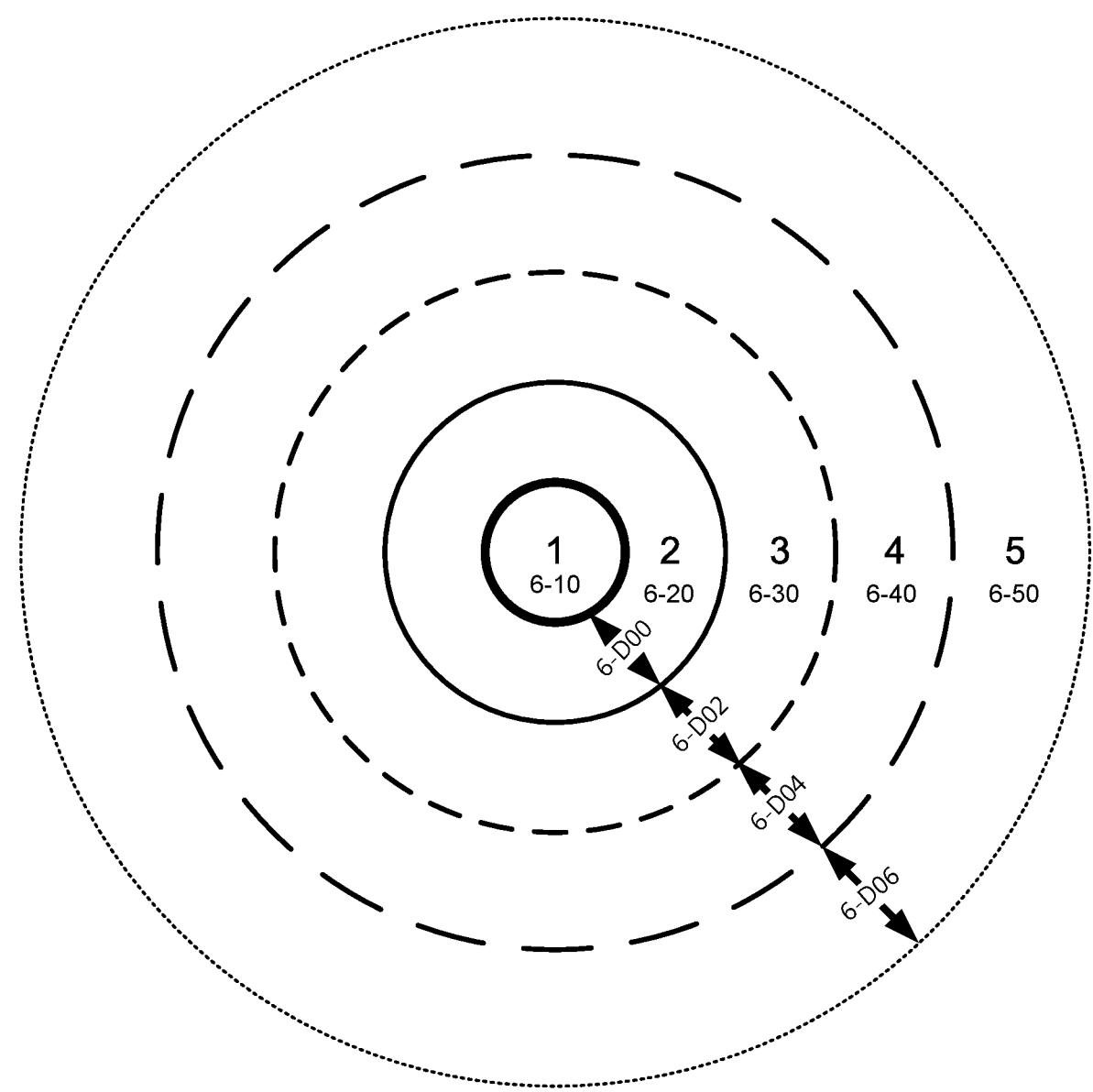
Figure # 6

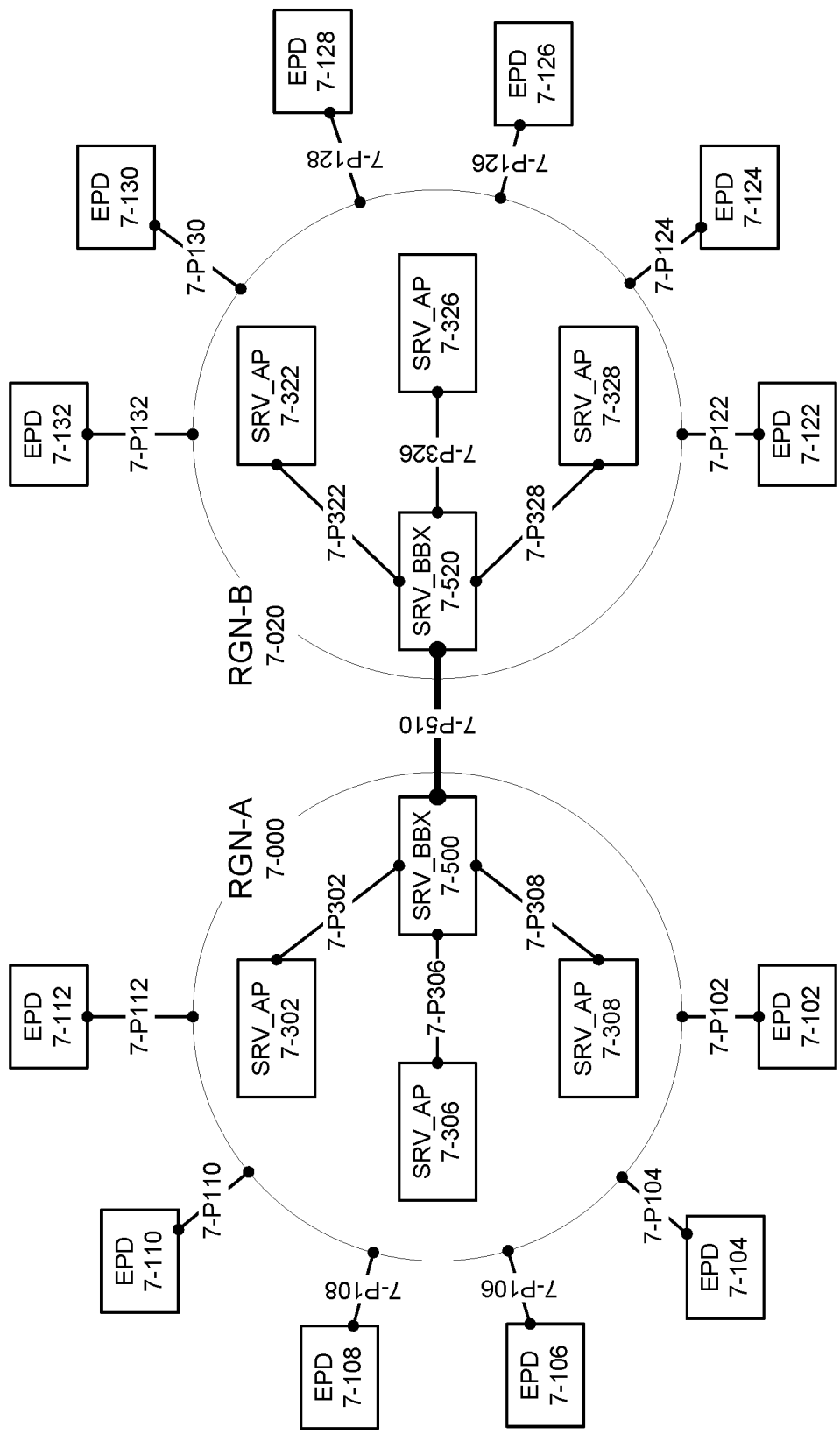
Figure # 7

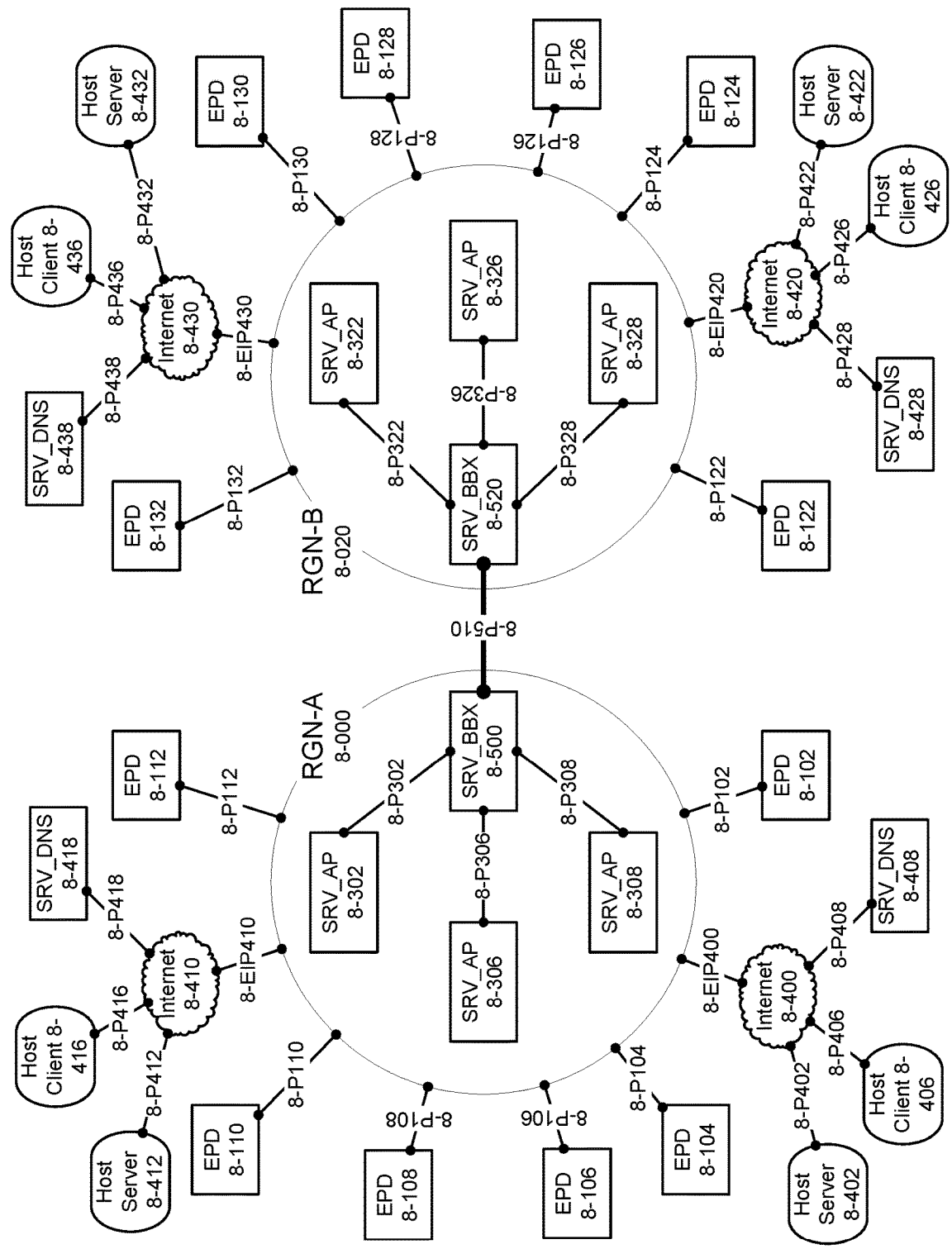
Figure # 8

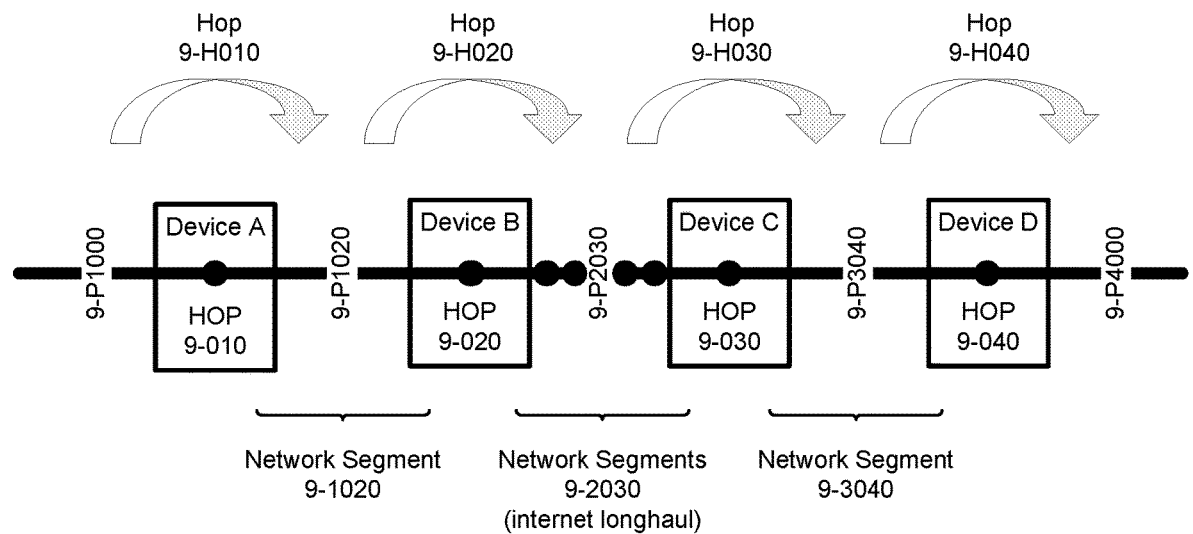
Figure # 9

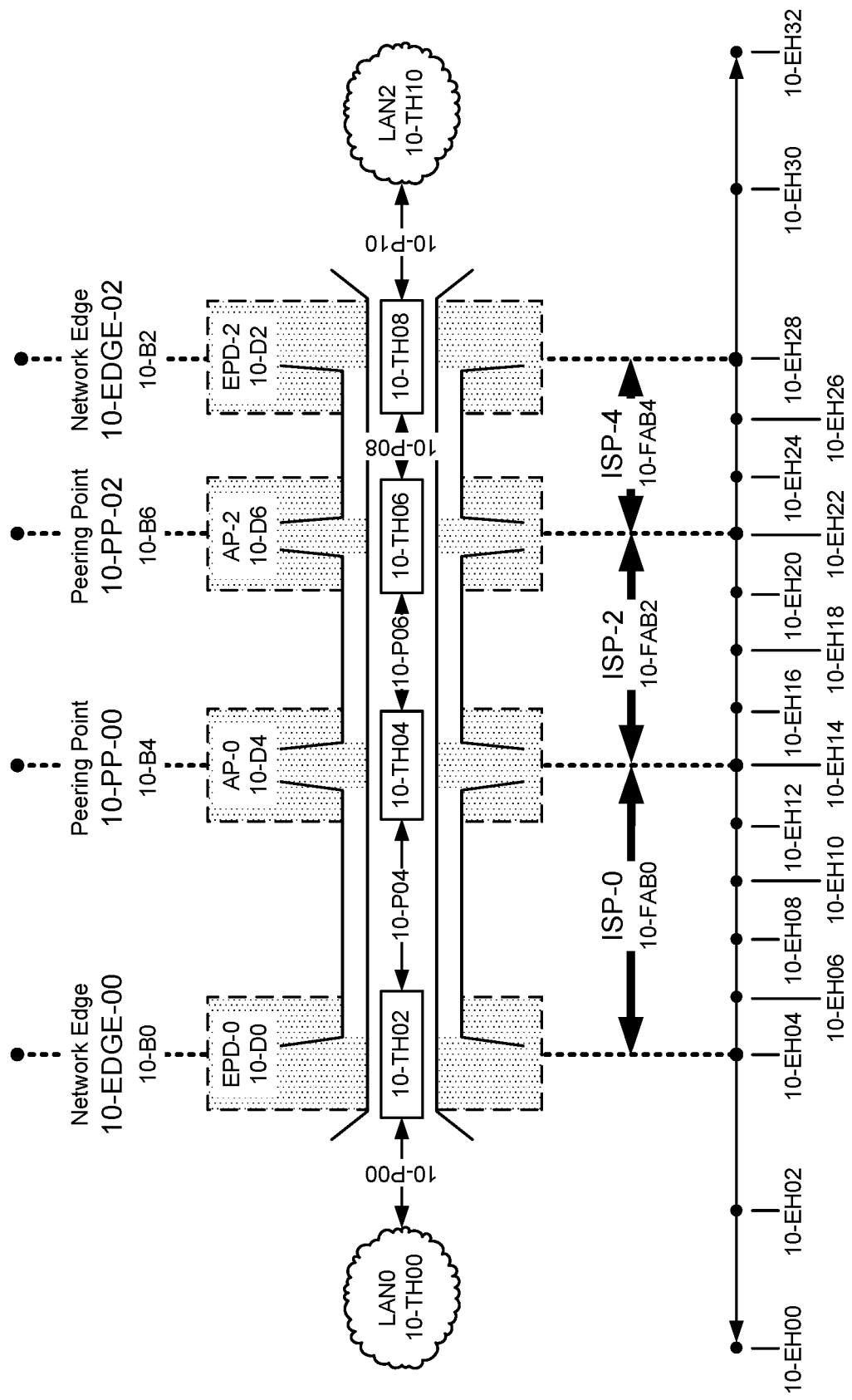
Figure # 10

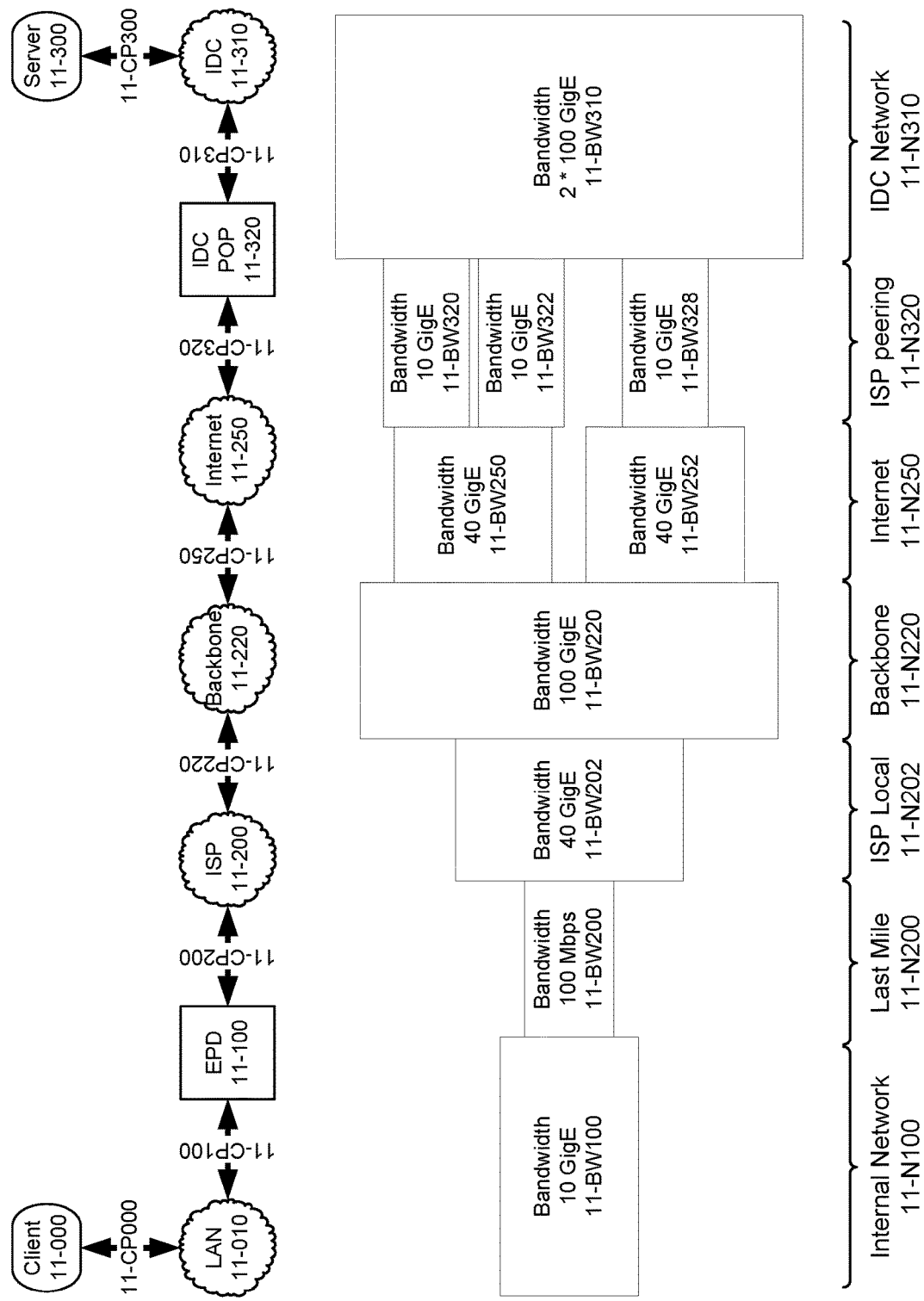
Figure # 11

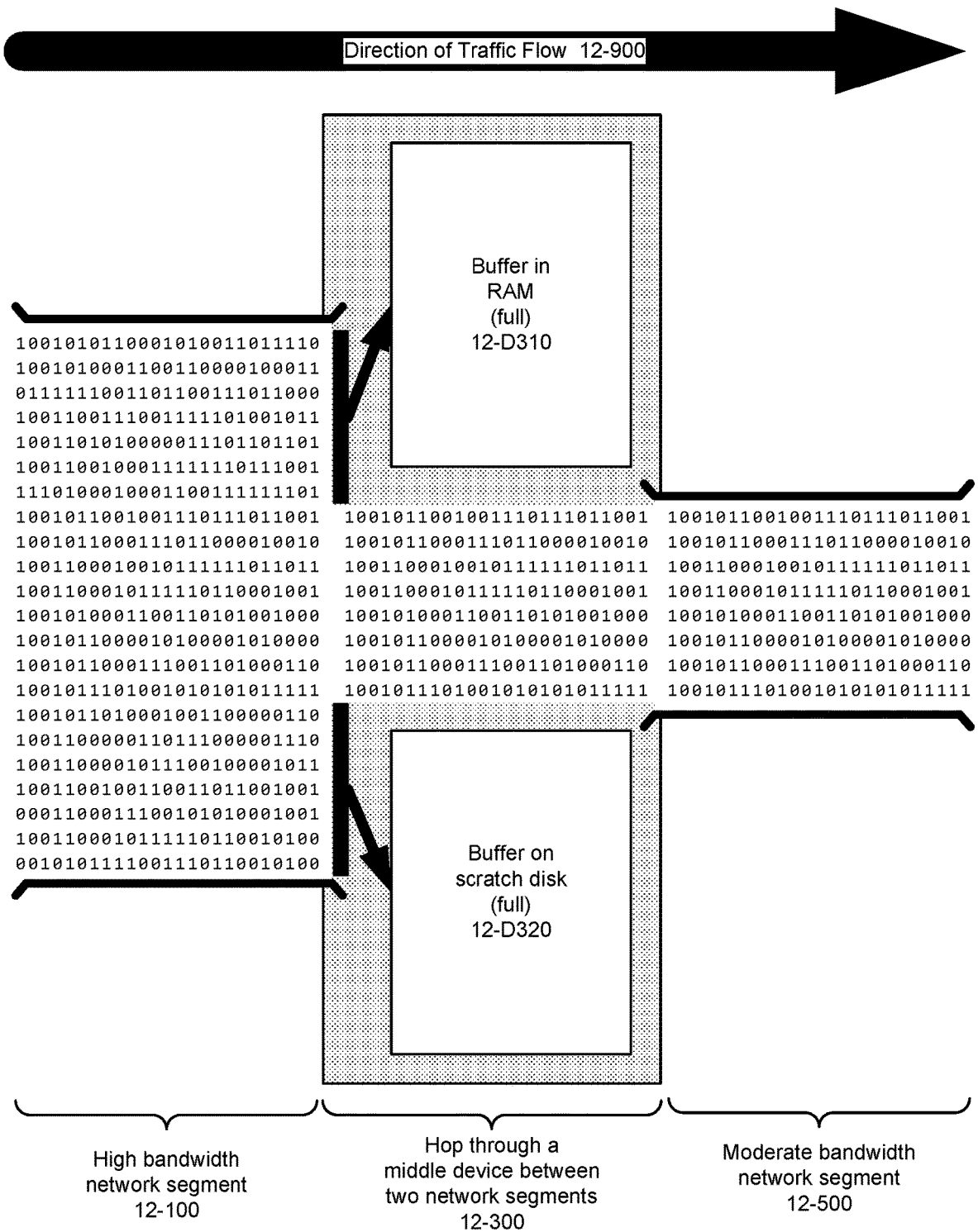
Figure # 12

$$\frac{\text{Bandwidth}}{\text{Granularity}} * \frac{\text{Bytes}}{\text{Bits}} * \text{Latency} = \text{BDP}$$

Bandwidth ##-000
Granularity ##-002
Bytes ##-020
Bits ##-022
Latency ##-050
BDP ##-080

Figure # 13

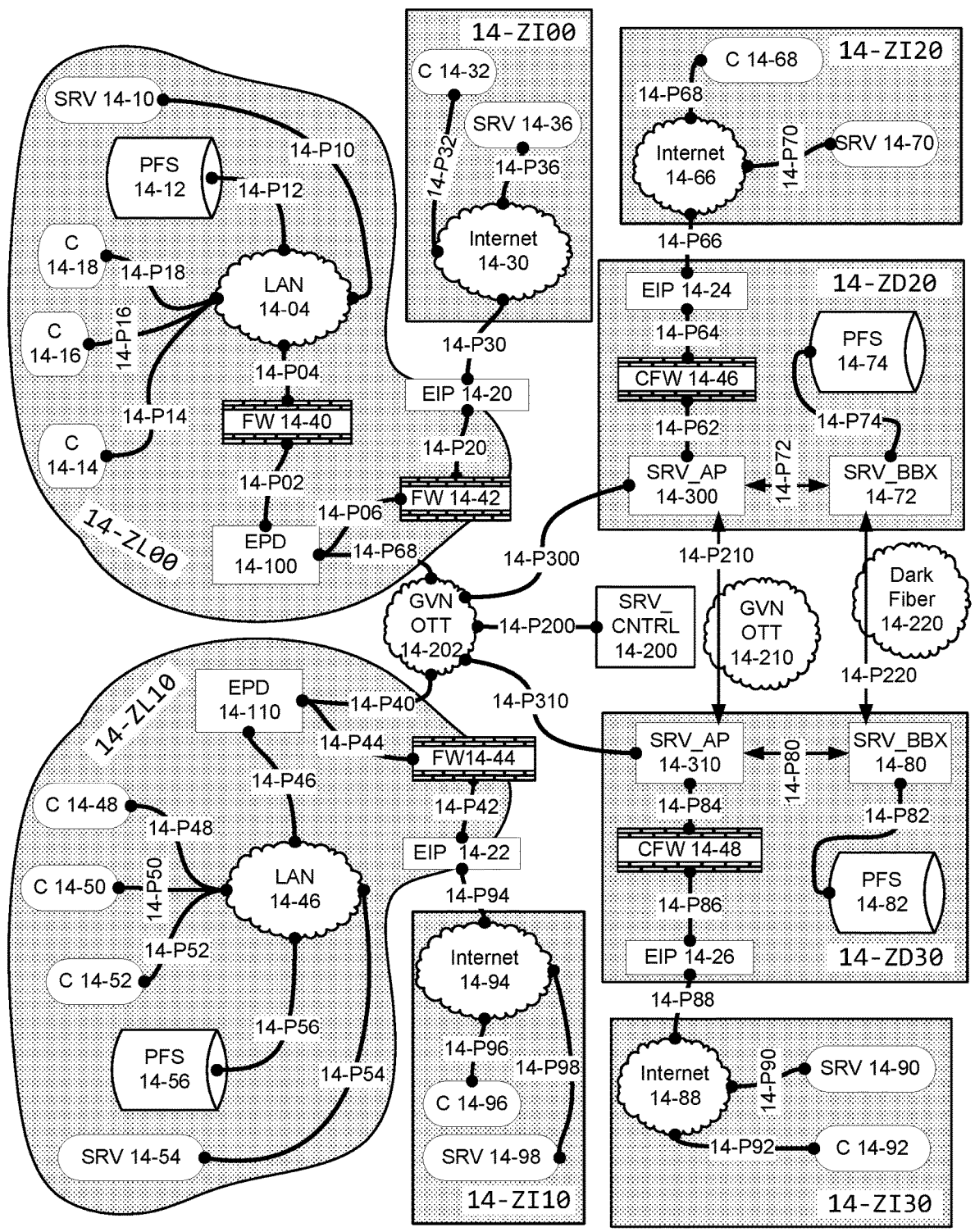
Figure # 14

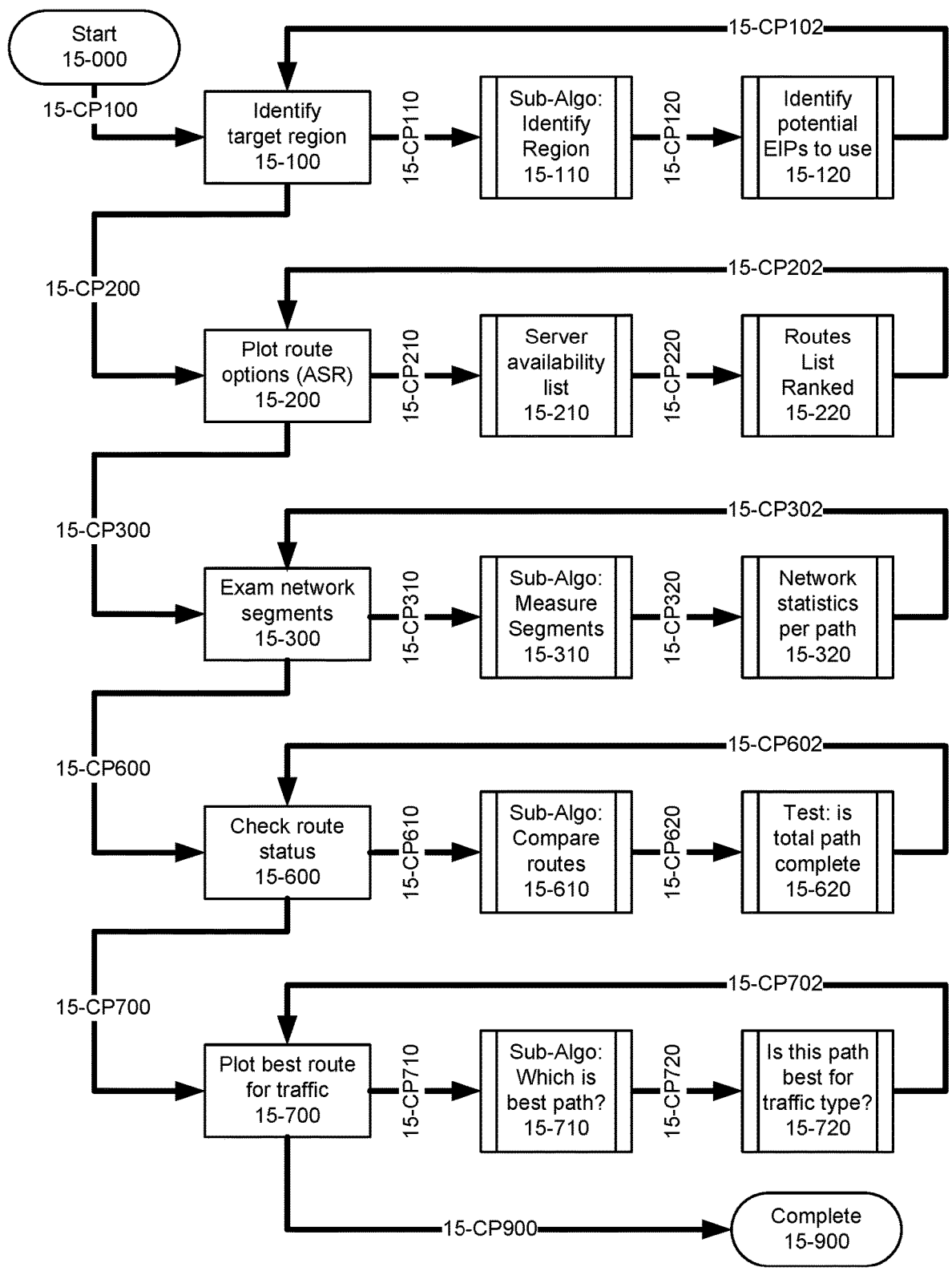
Figure # 15

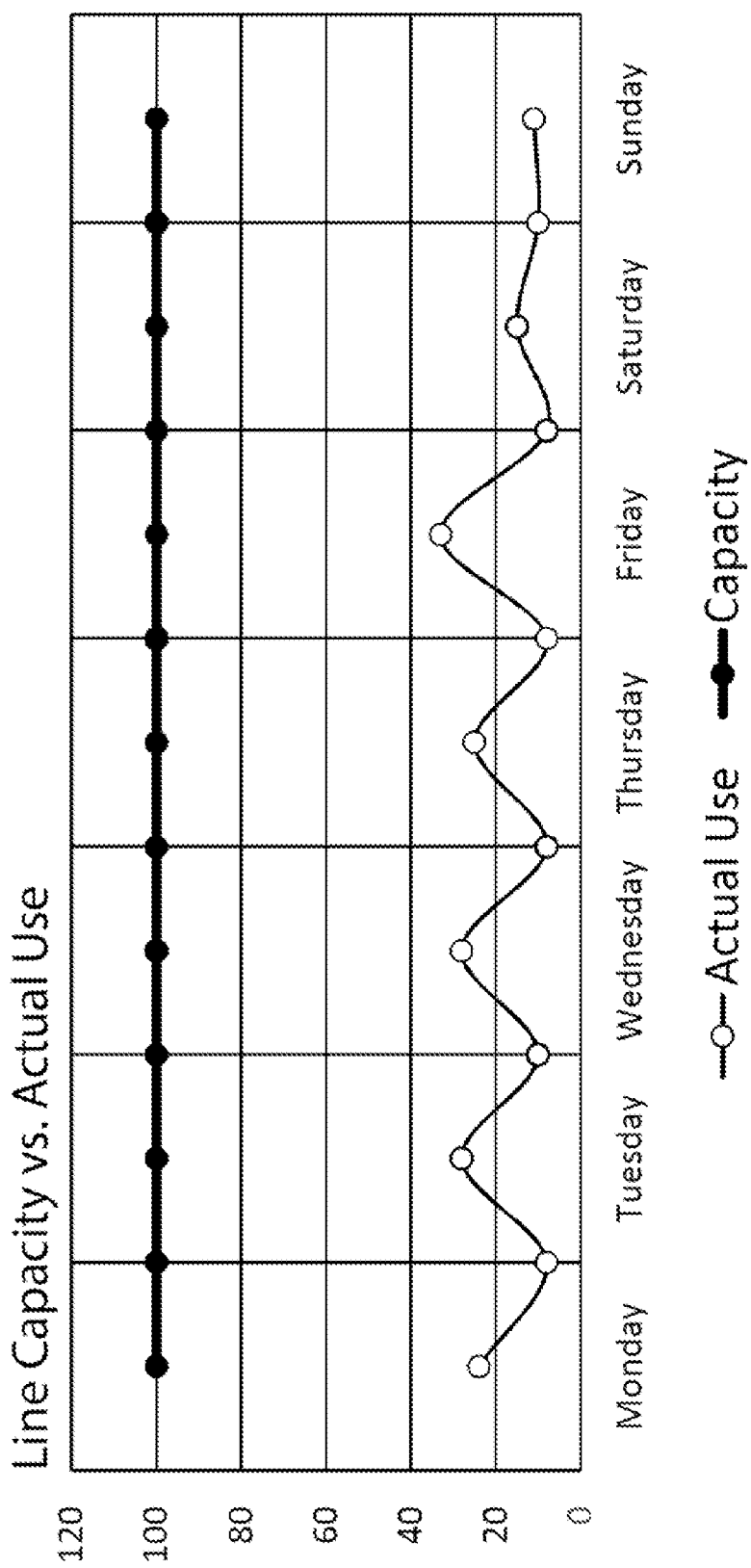
Figure # 16

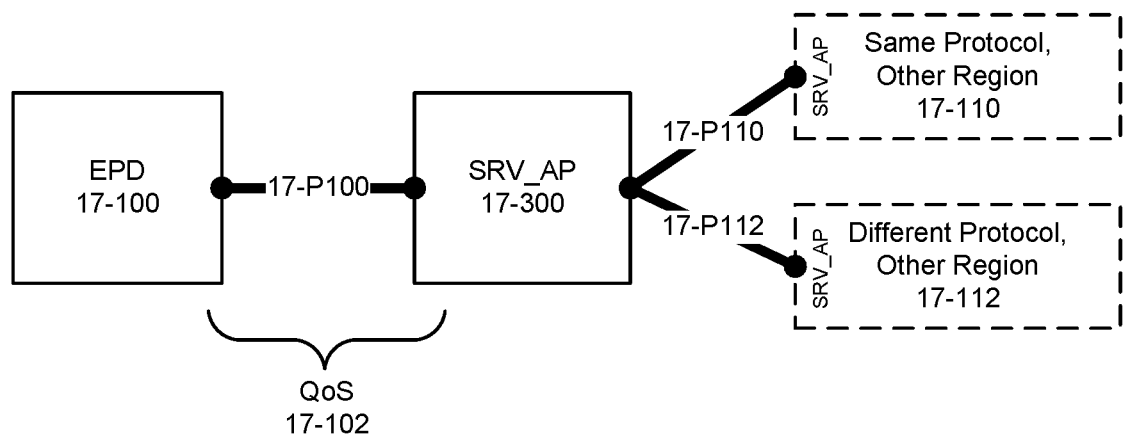
Figure # 17

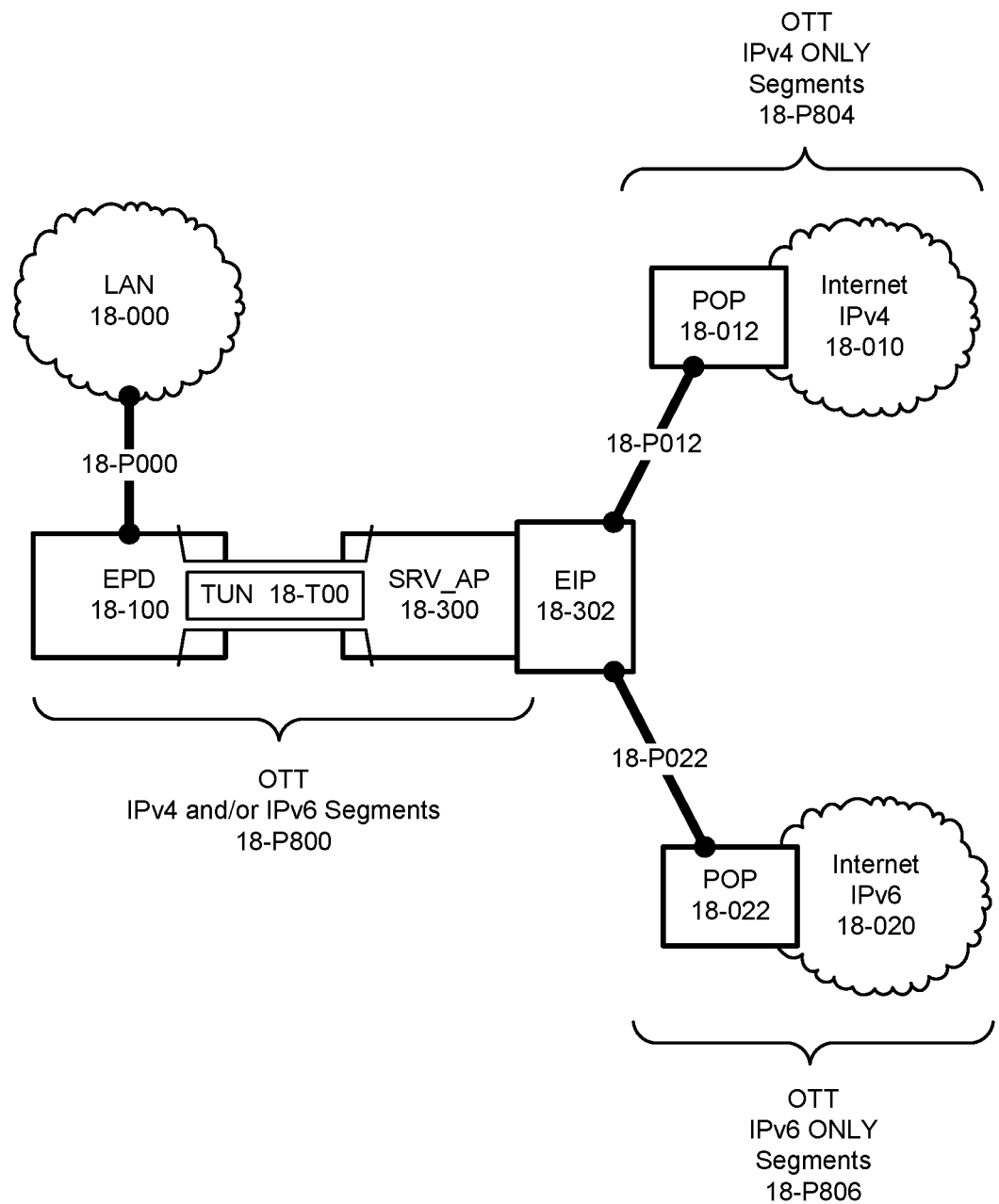
Figure # 18

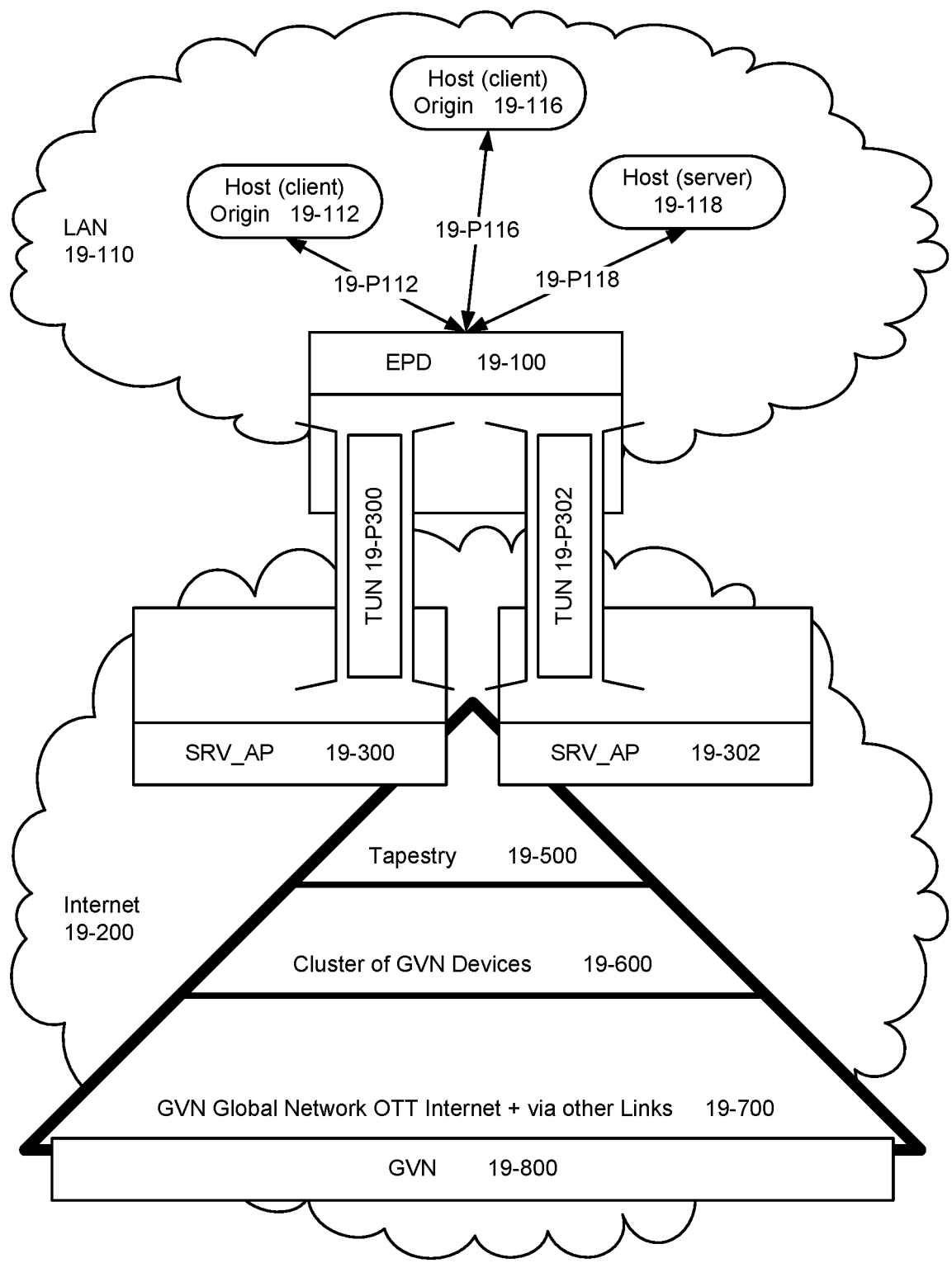
Figure # 19

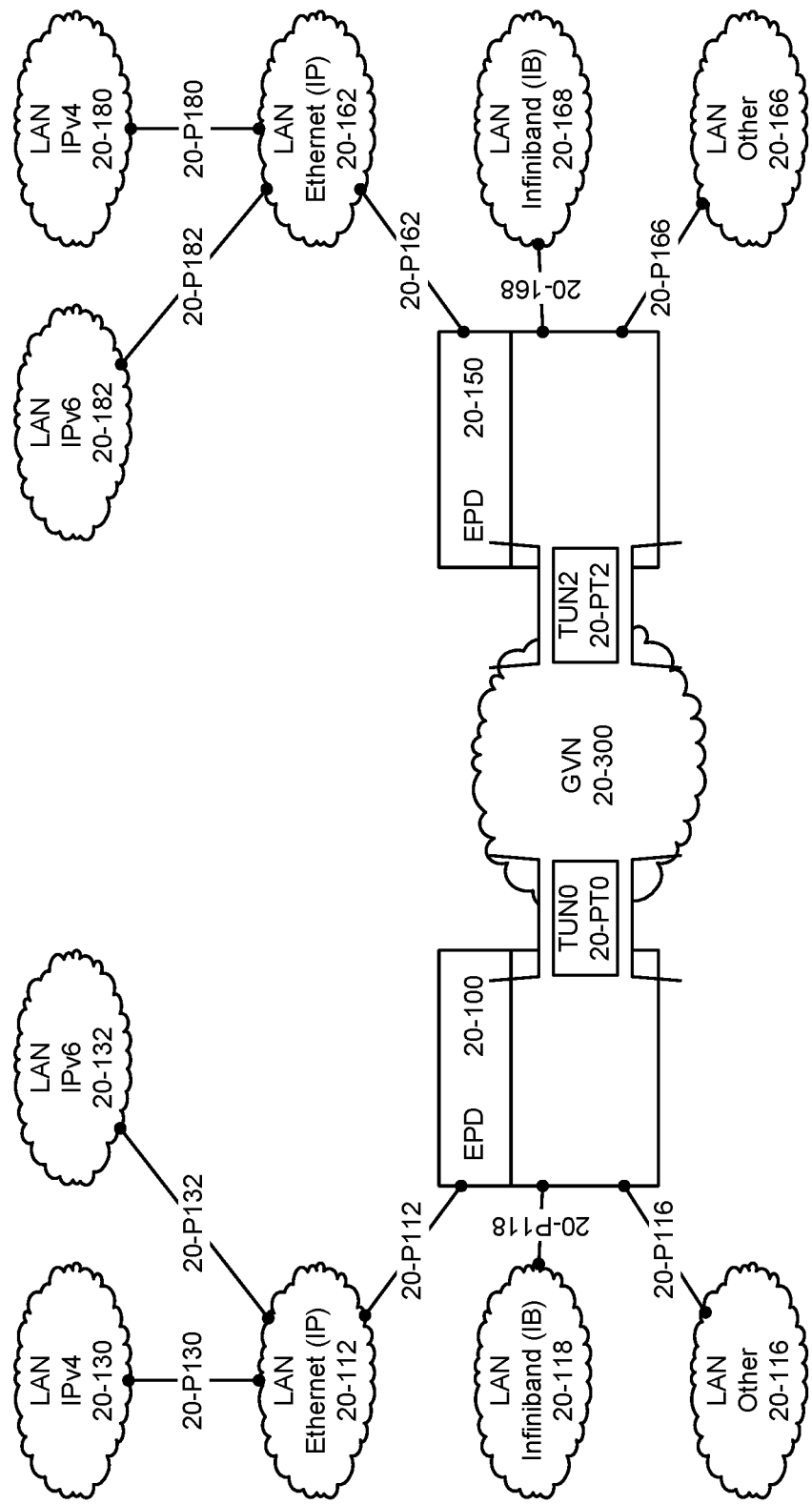
Figure # 20

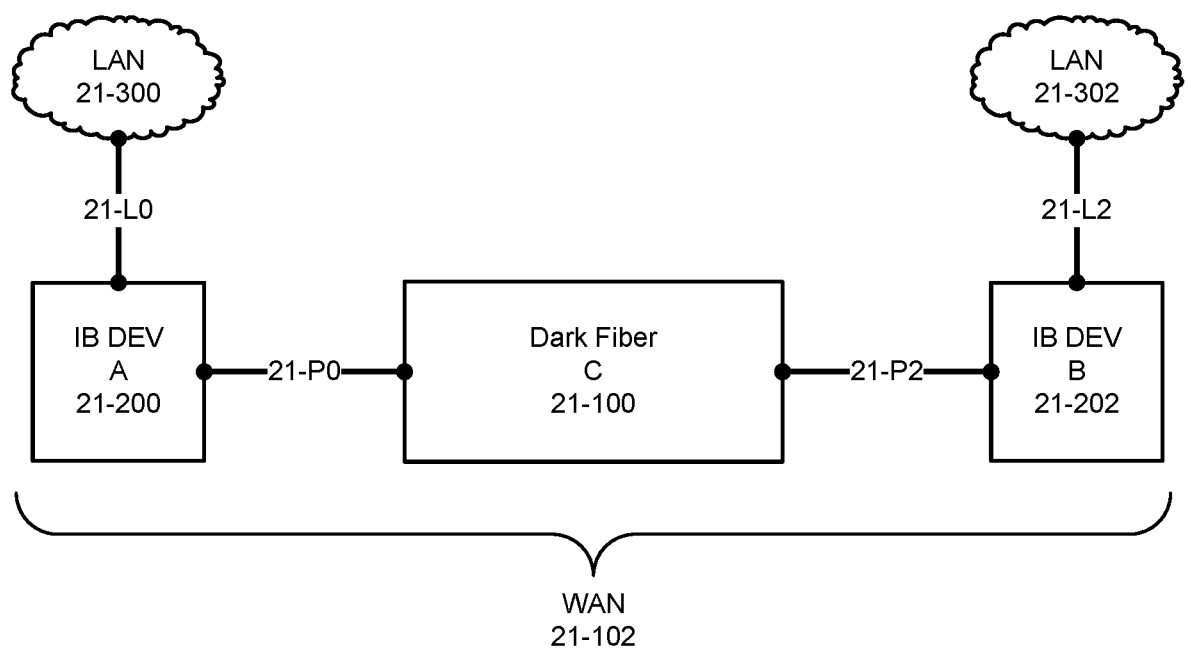
Figure # 21

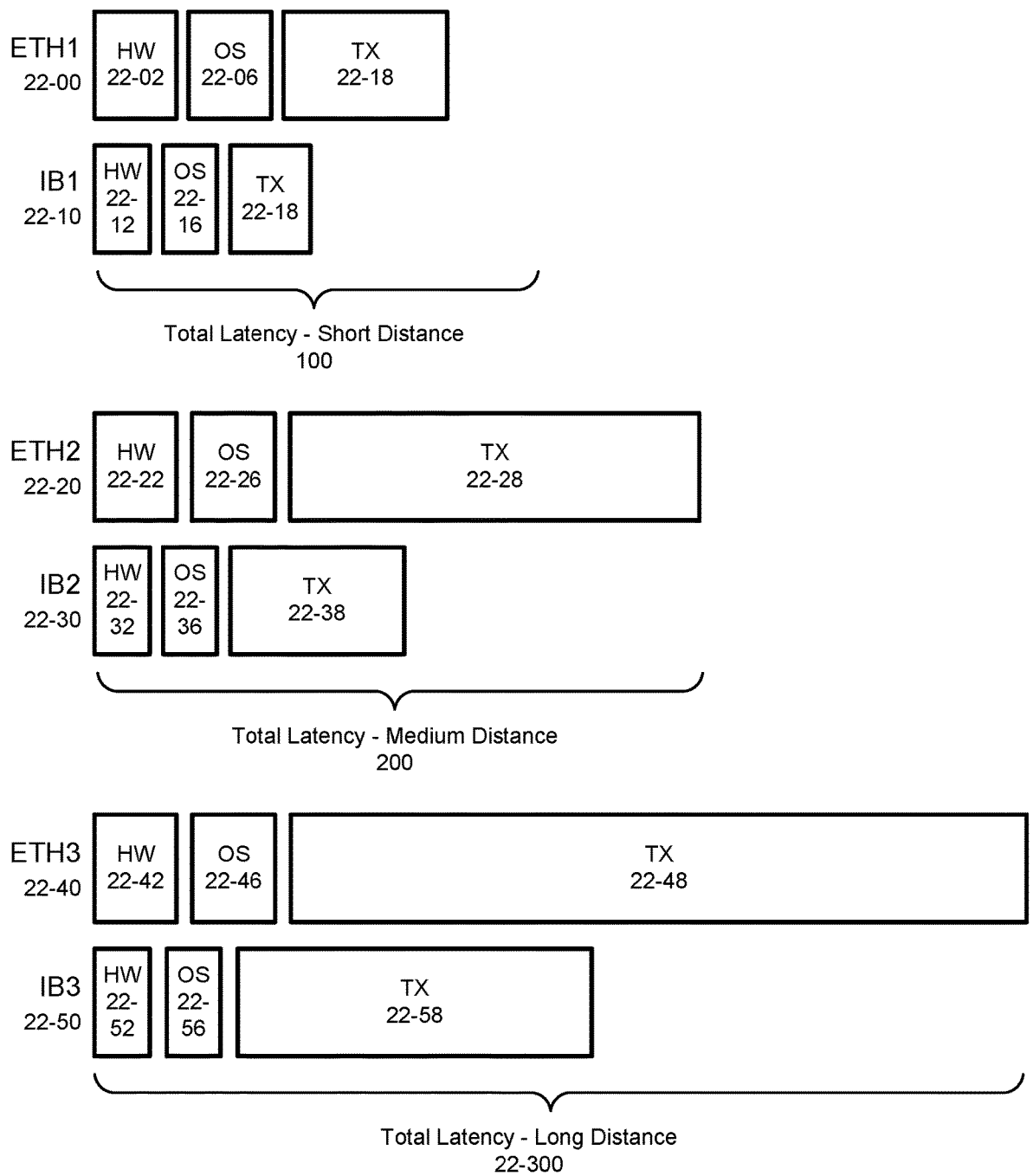
Figure # 22

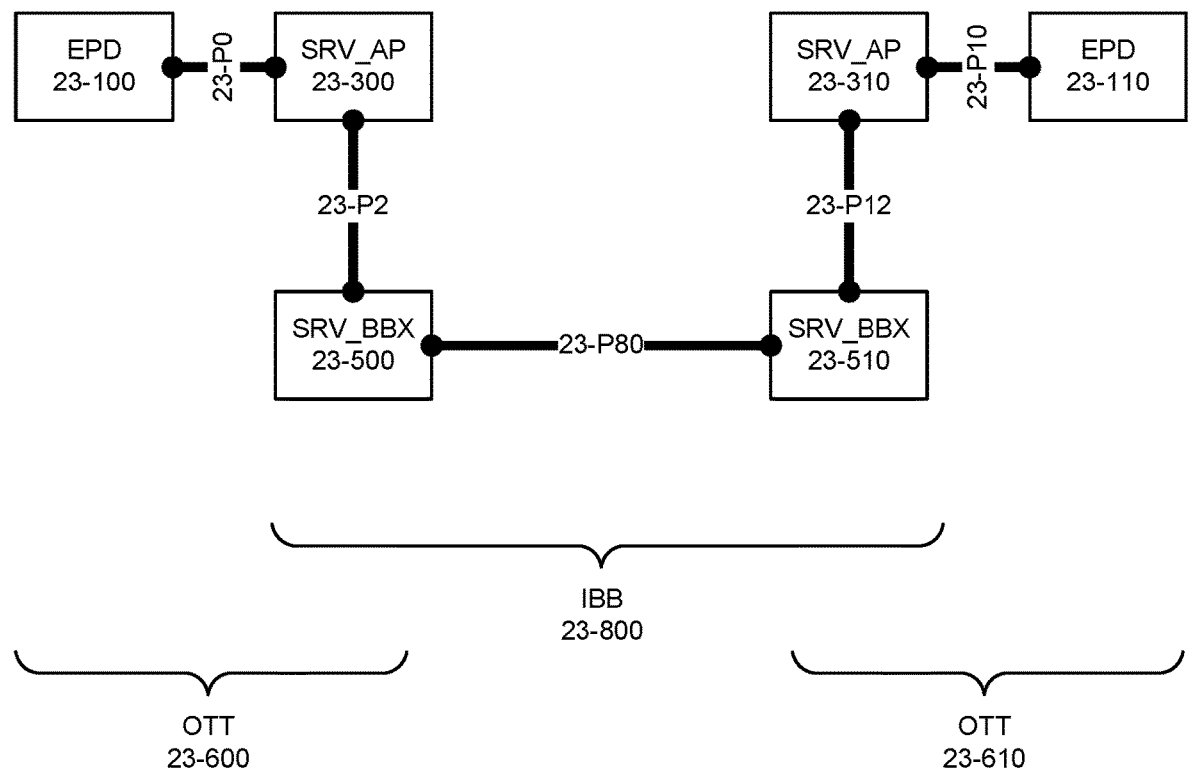
Figure # 23

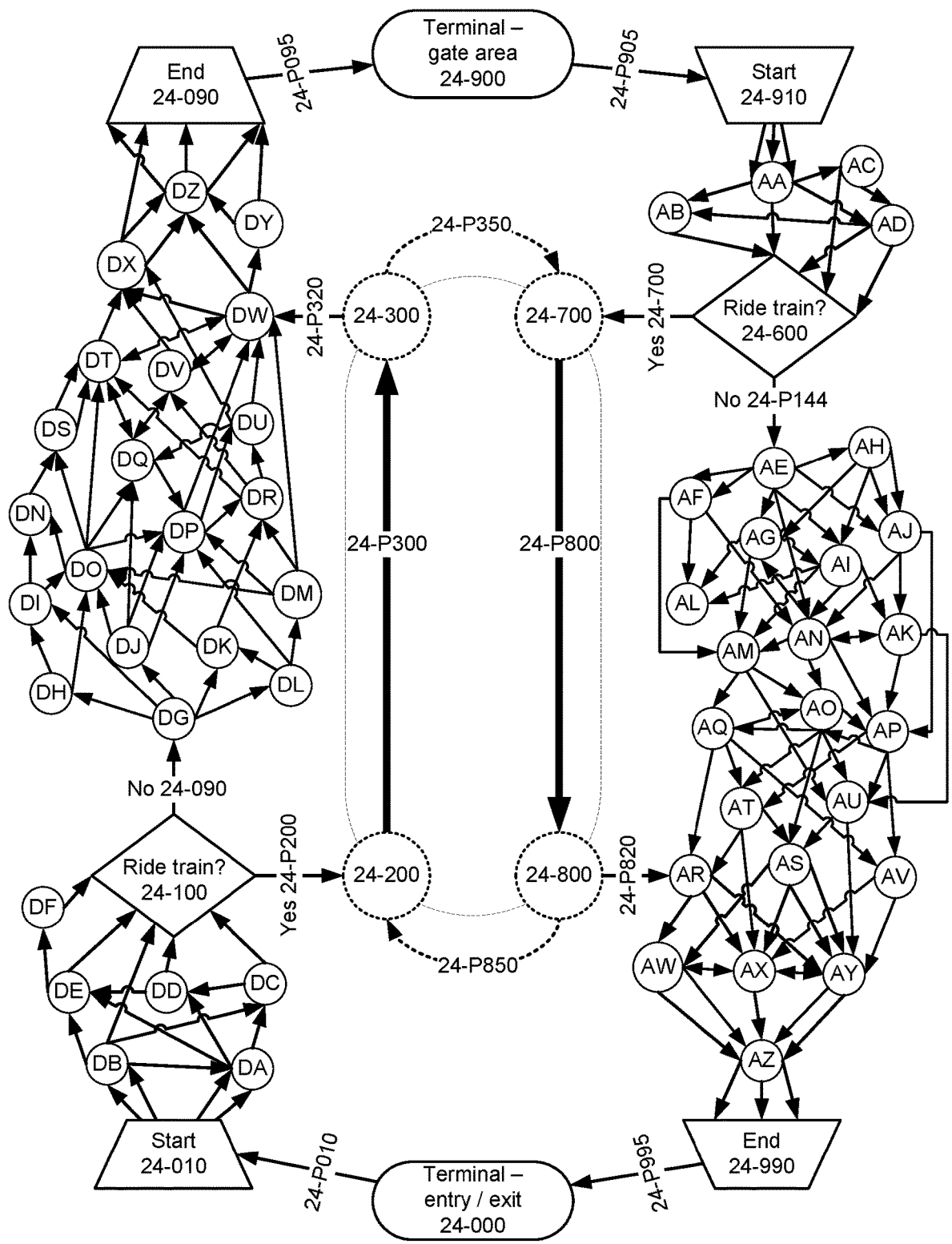
Figure # 24

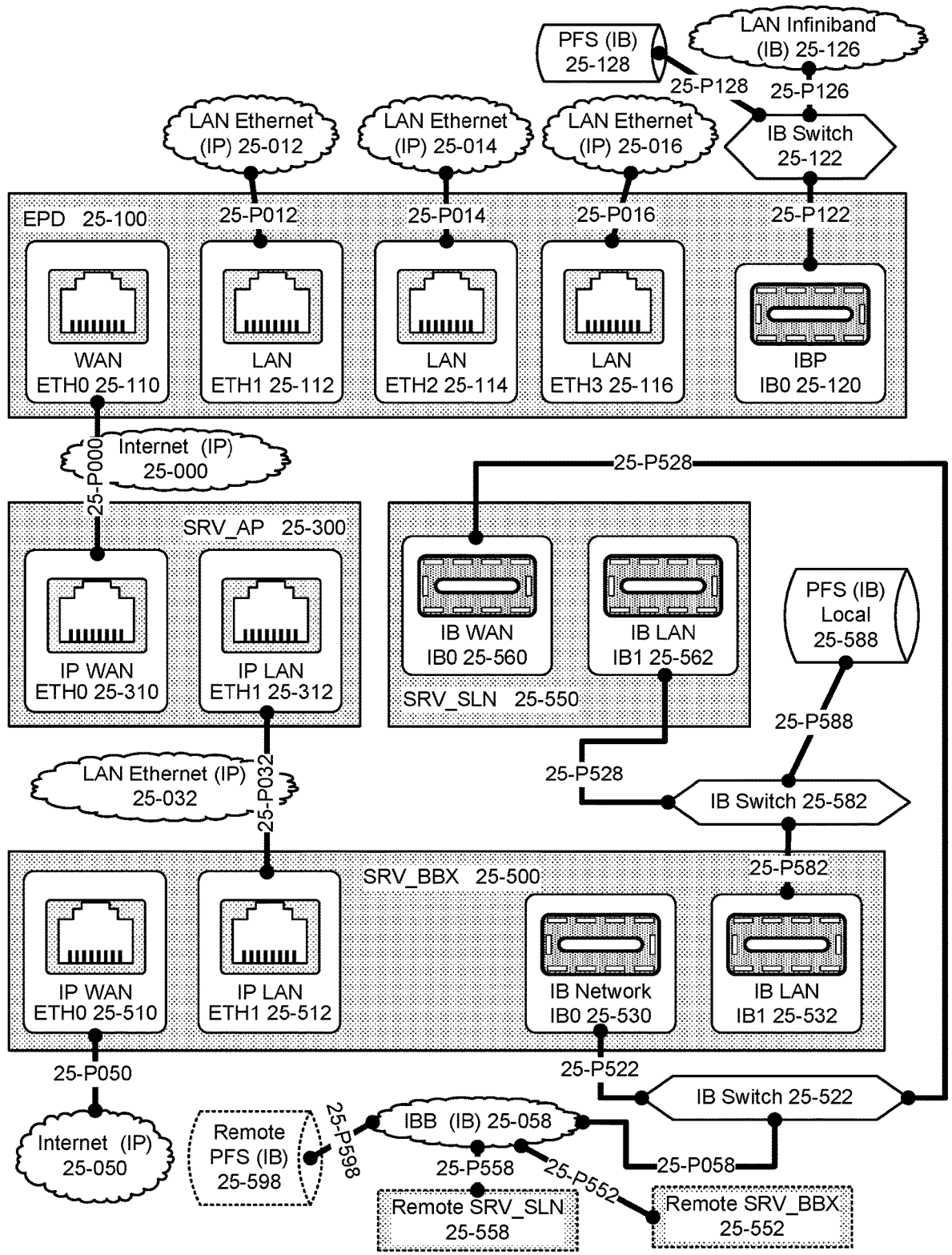
Figure # 25

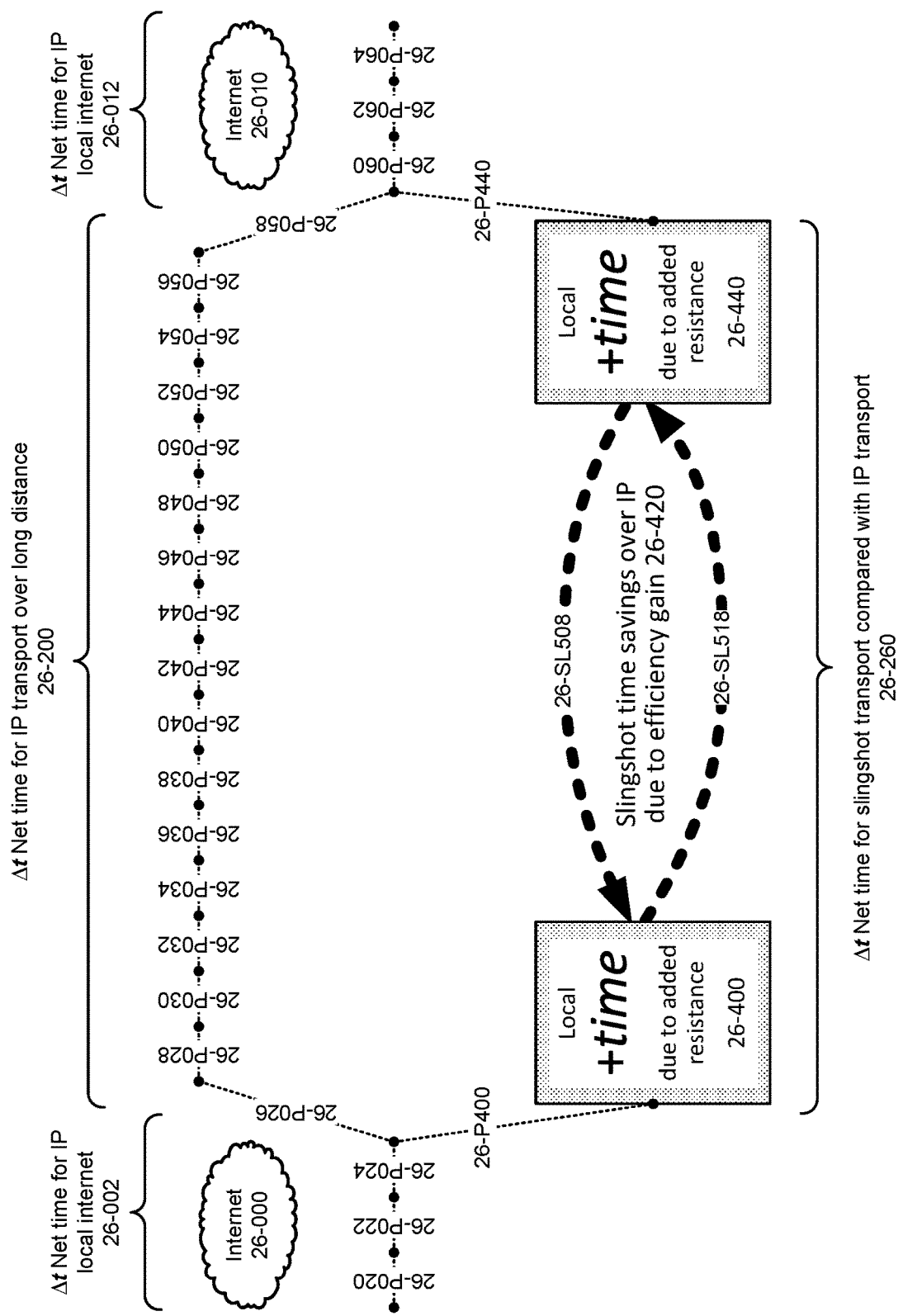
Figure # 26

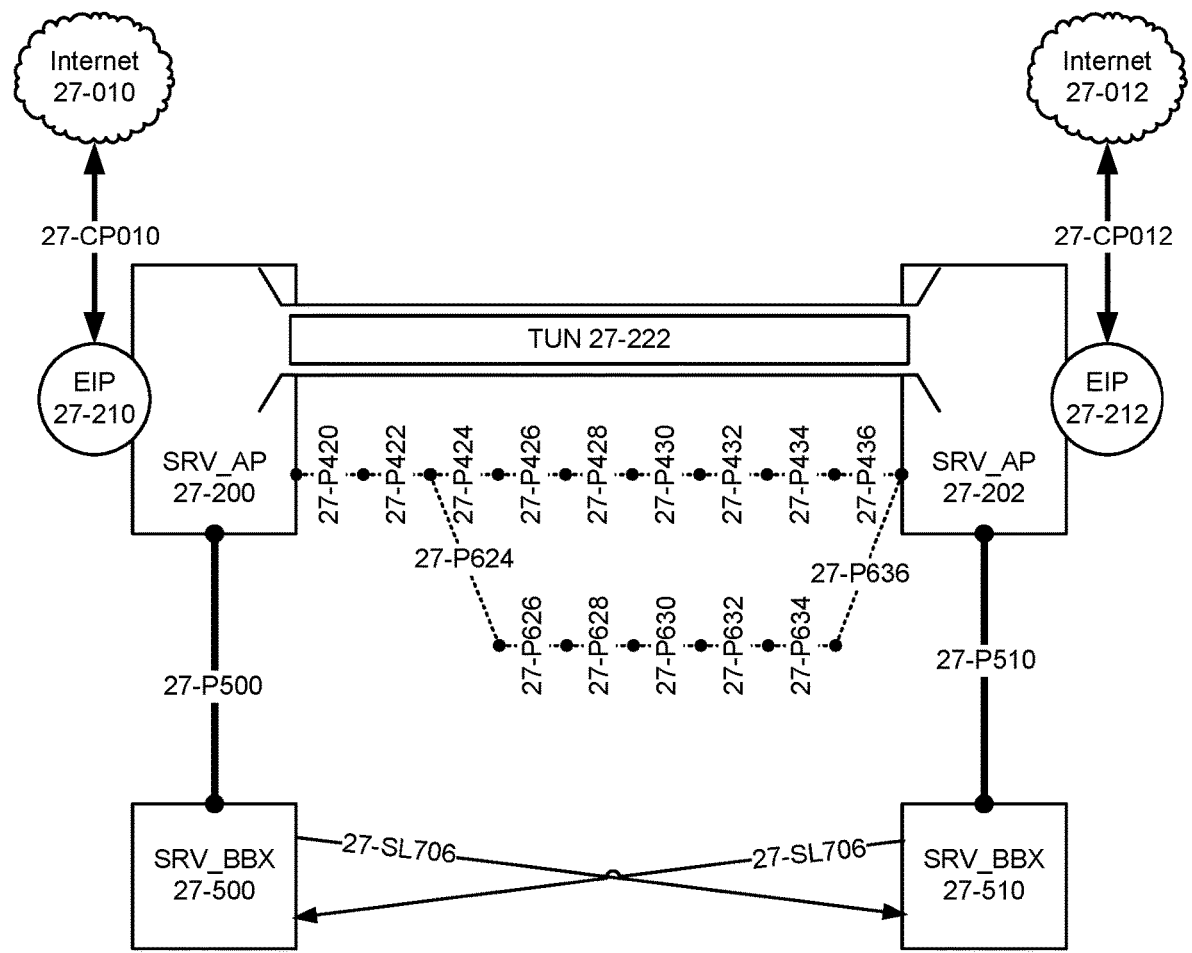
Figure # 27

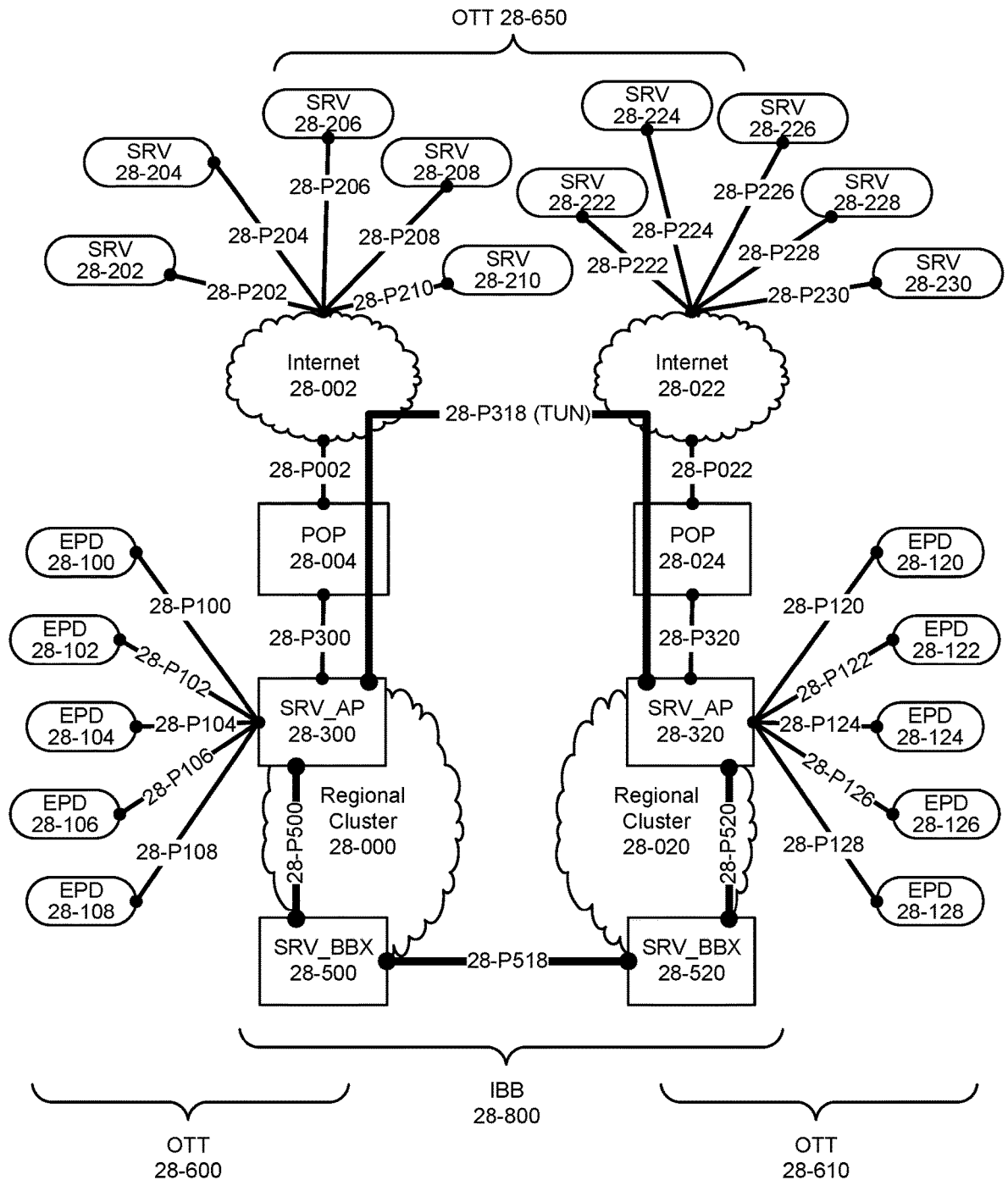
Figure # 28

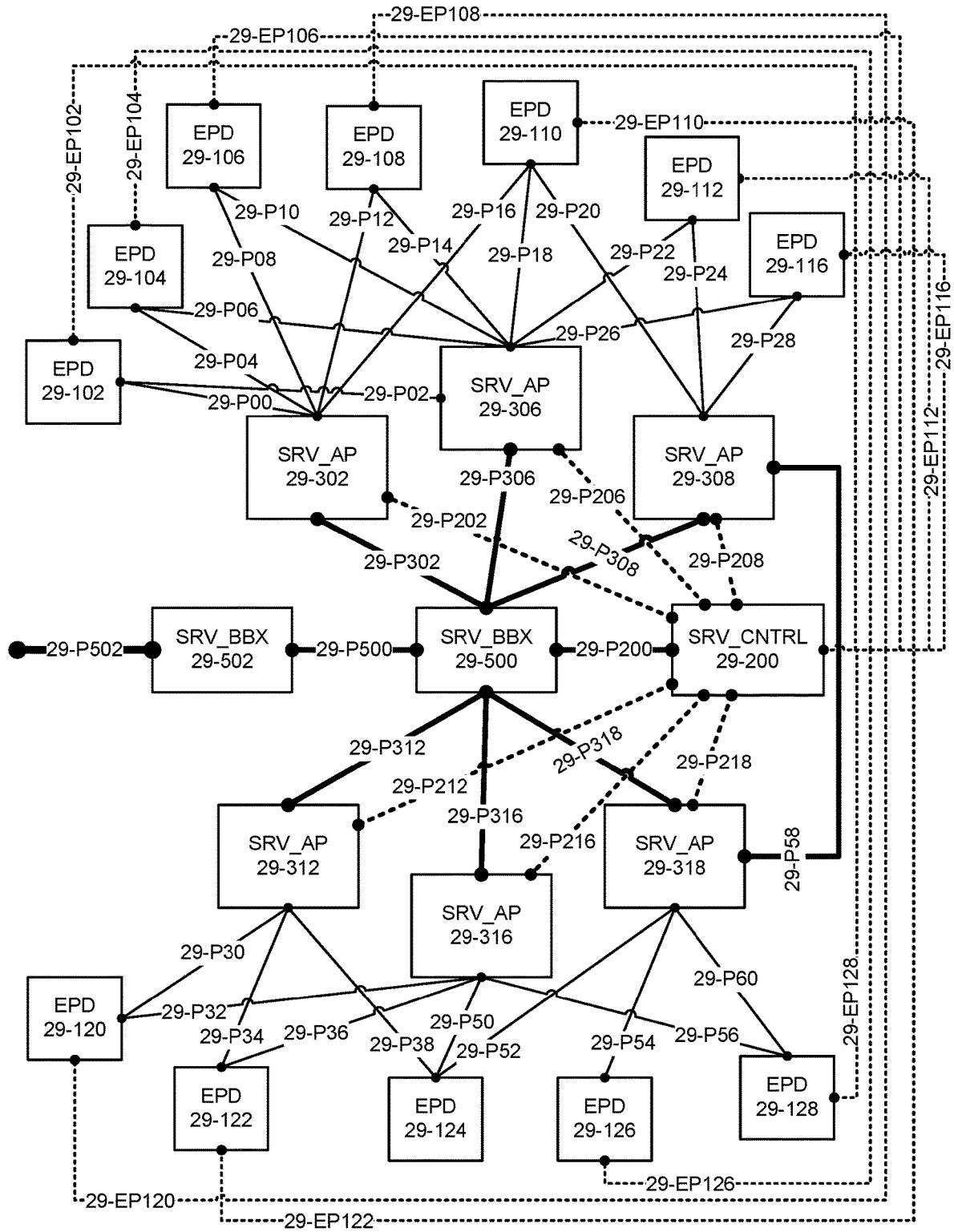
Figure # 29

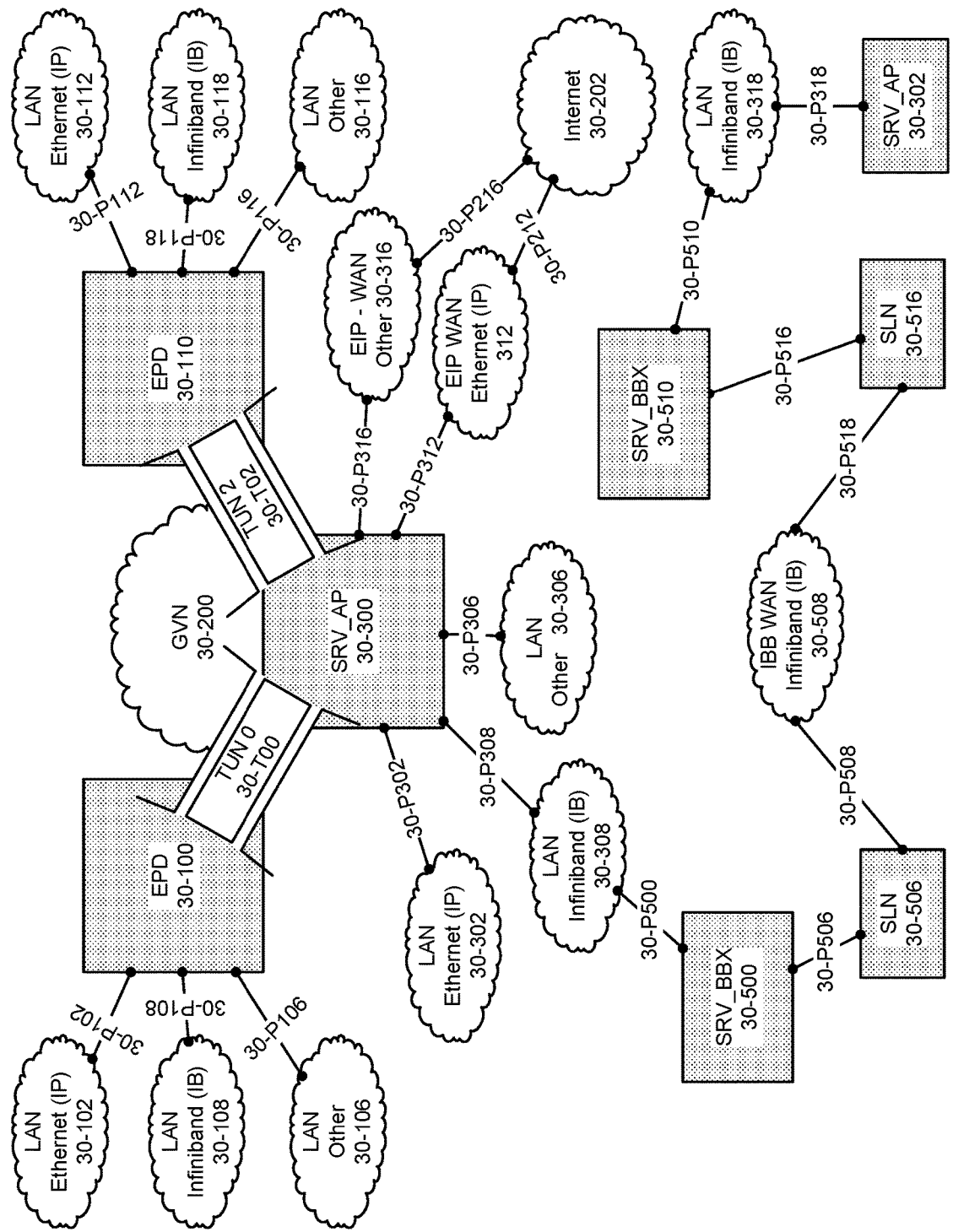
Figure # 30

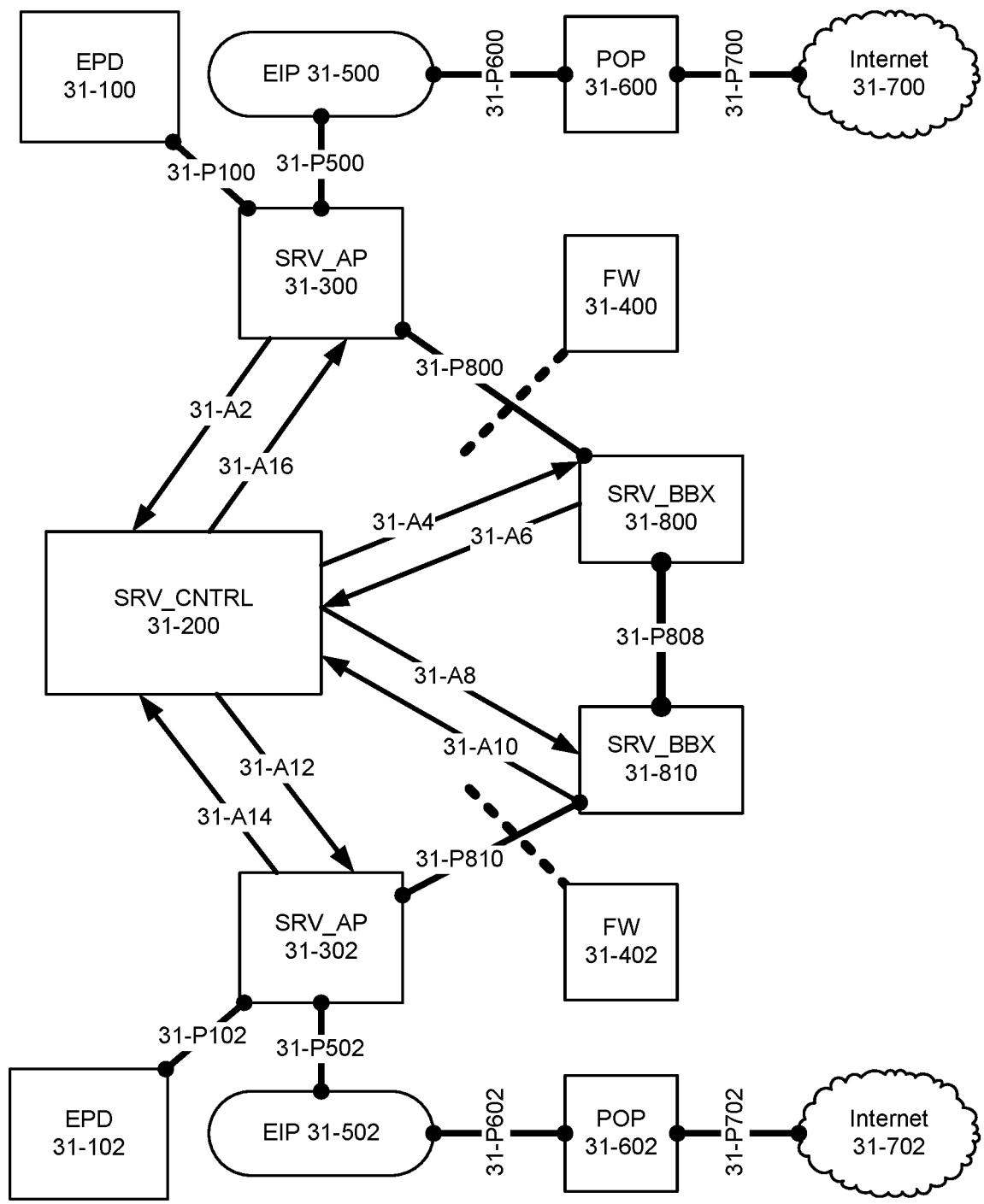
Figure # 31

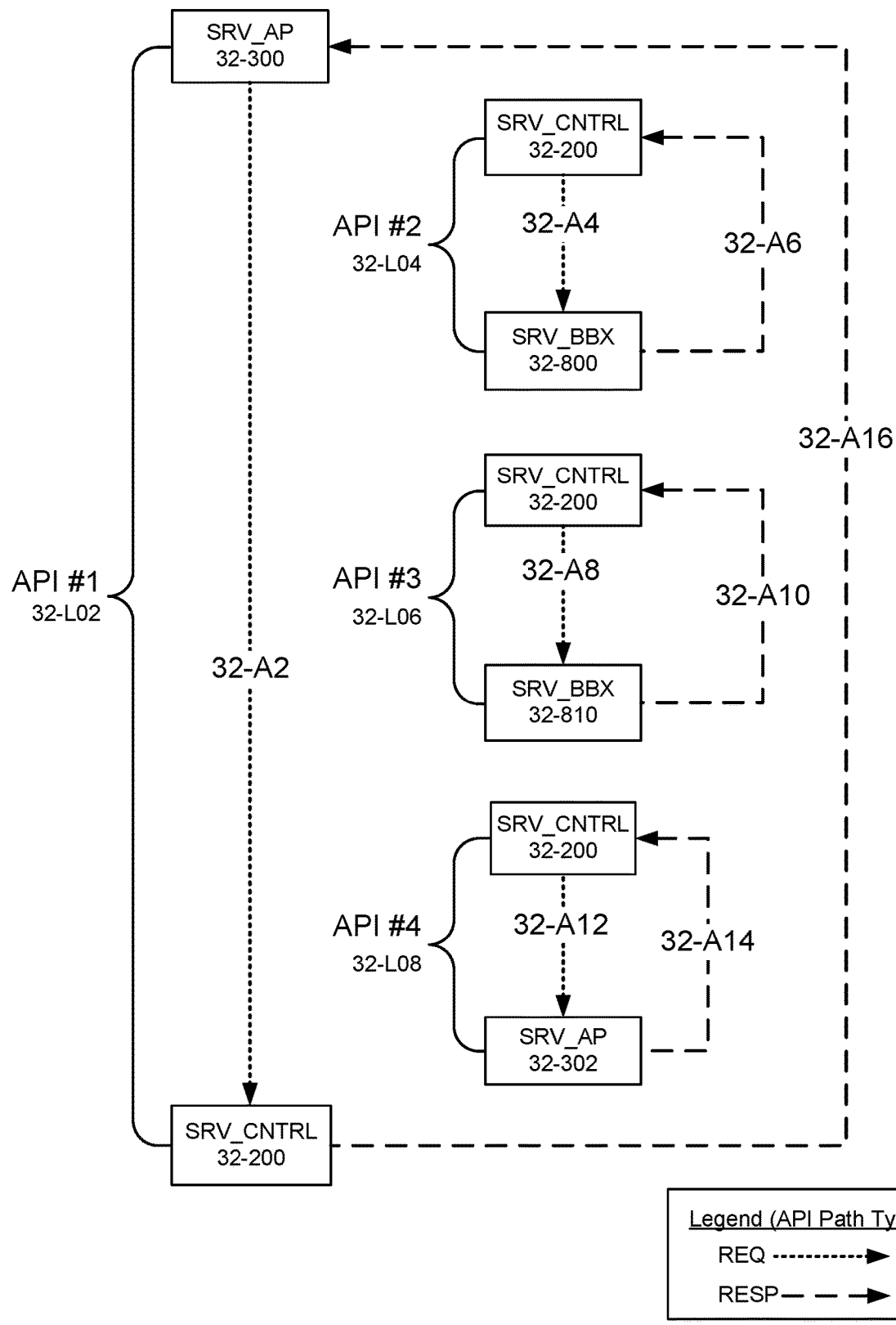
Figure # 32

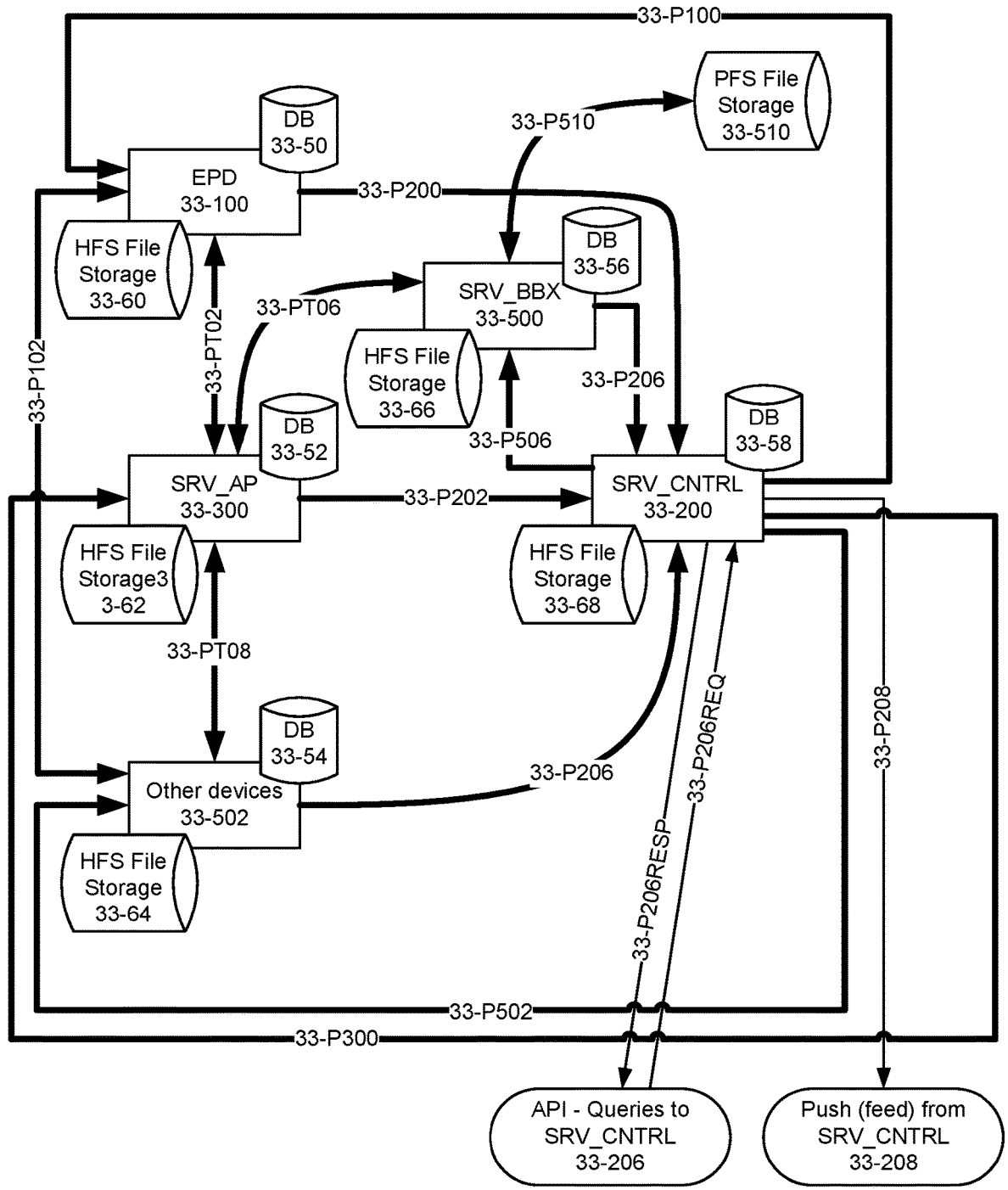
Figure # 33

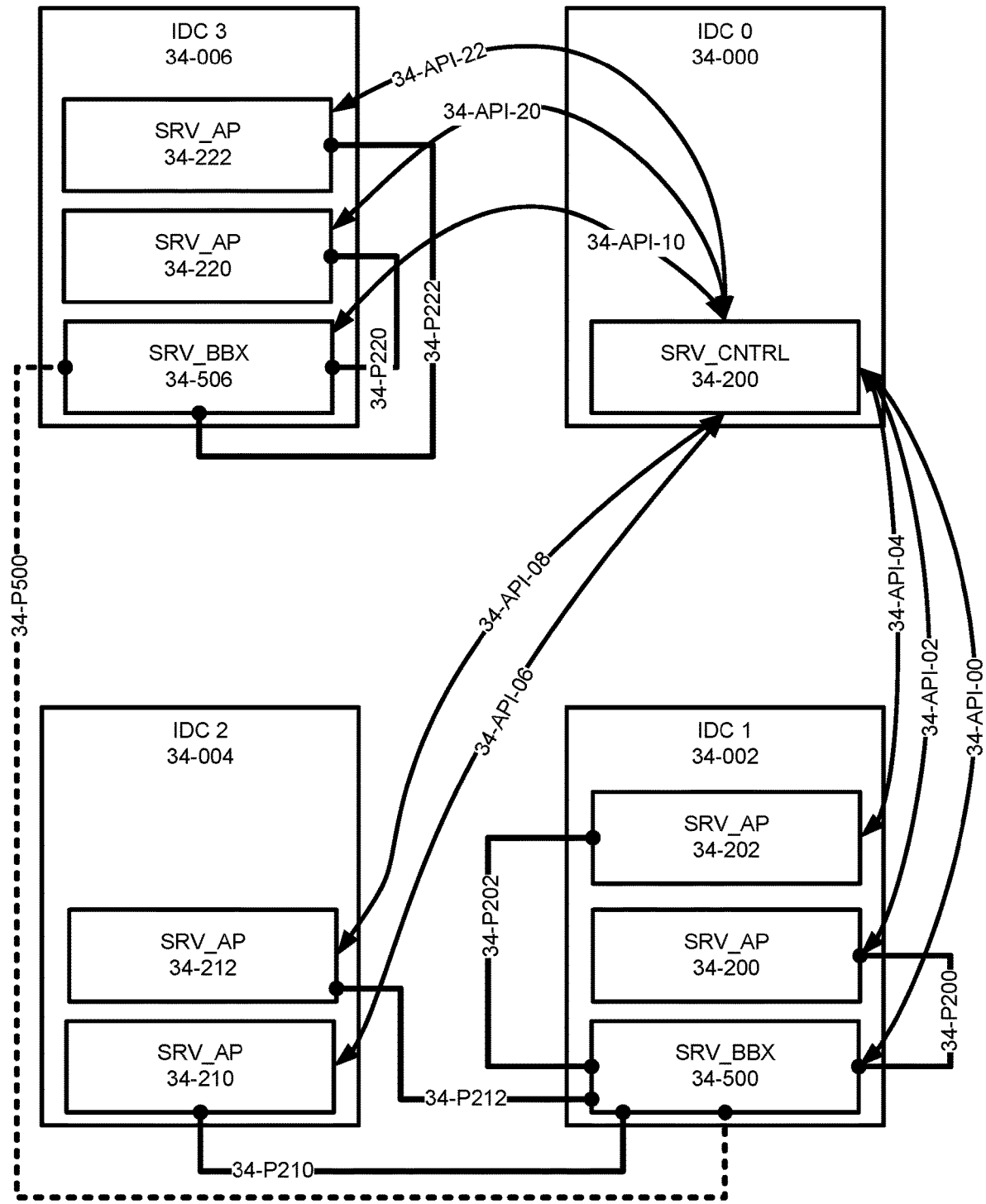
Figure # 34

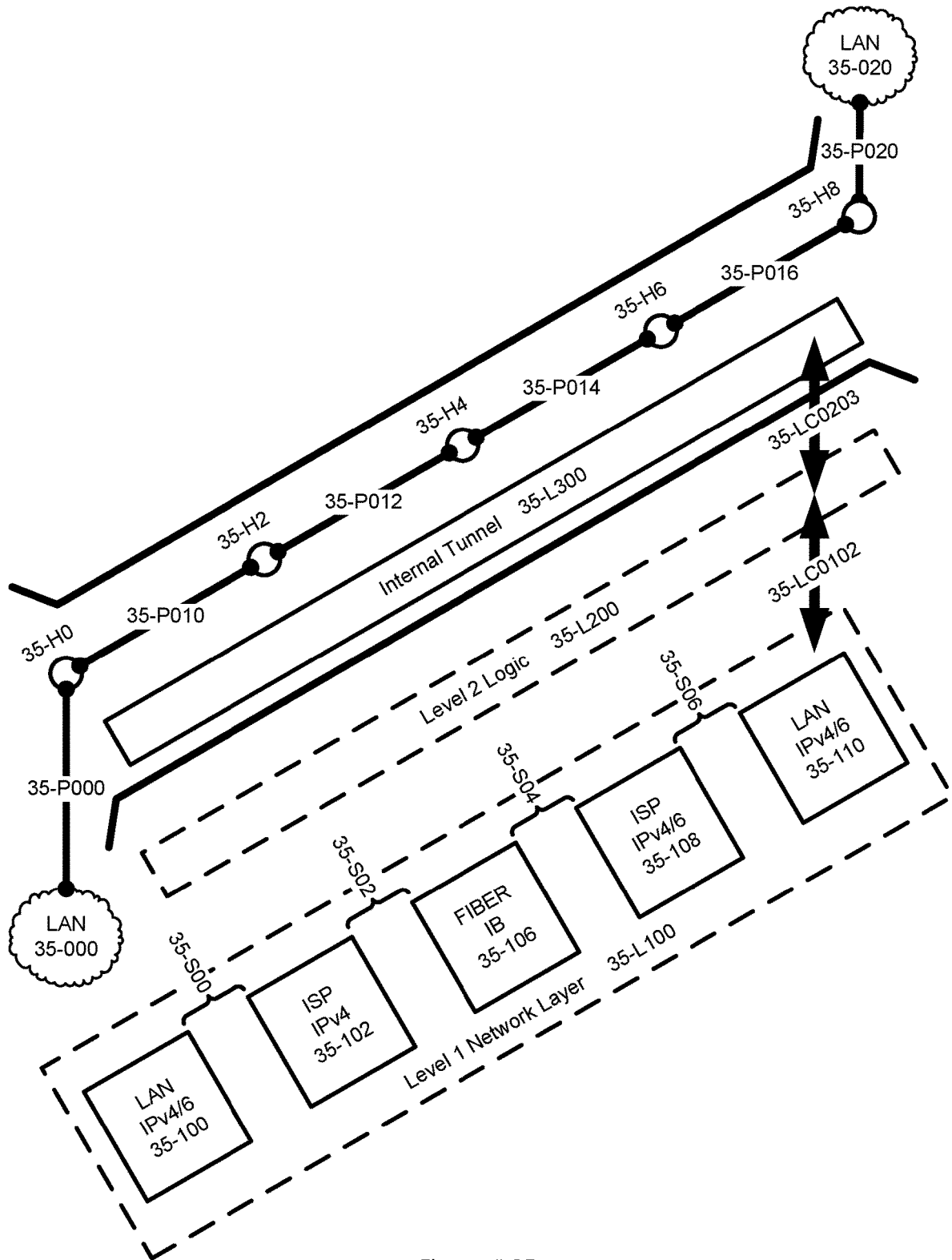
Figure # 35

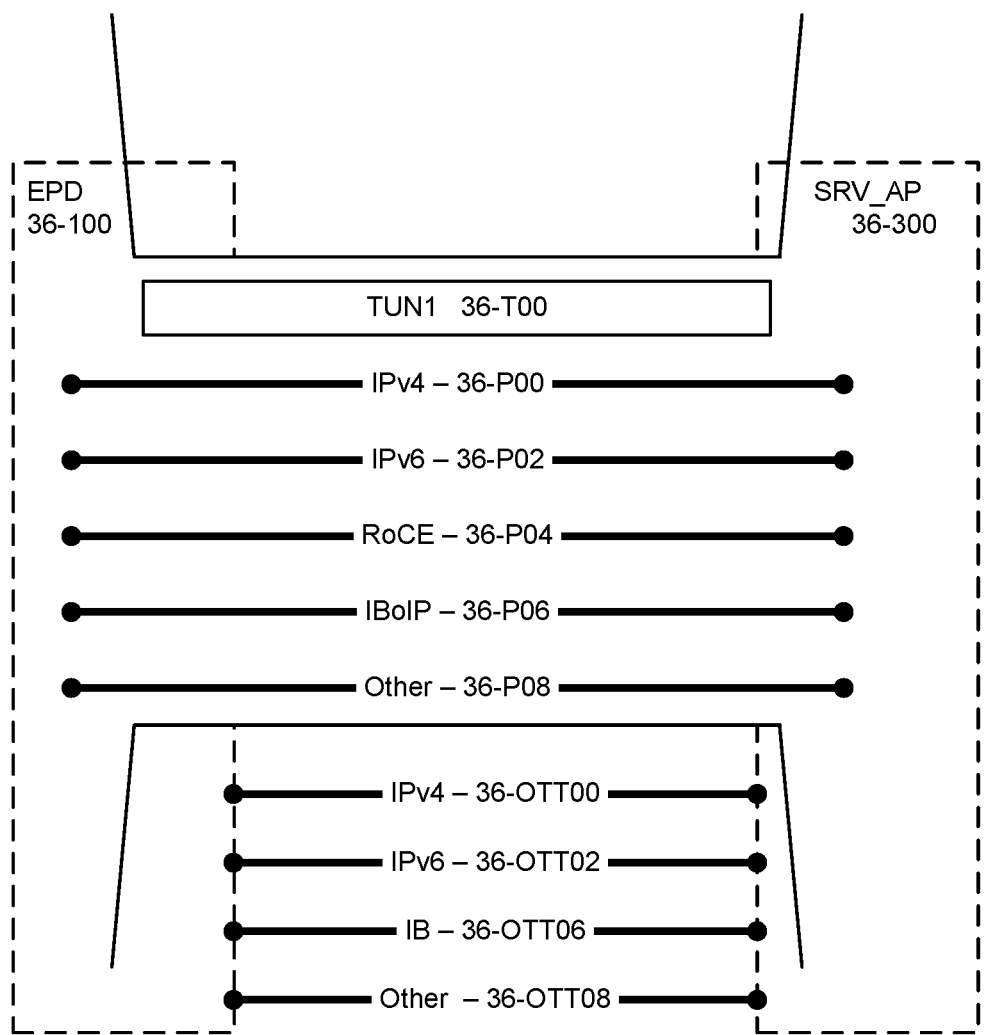
Figure # 36

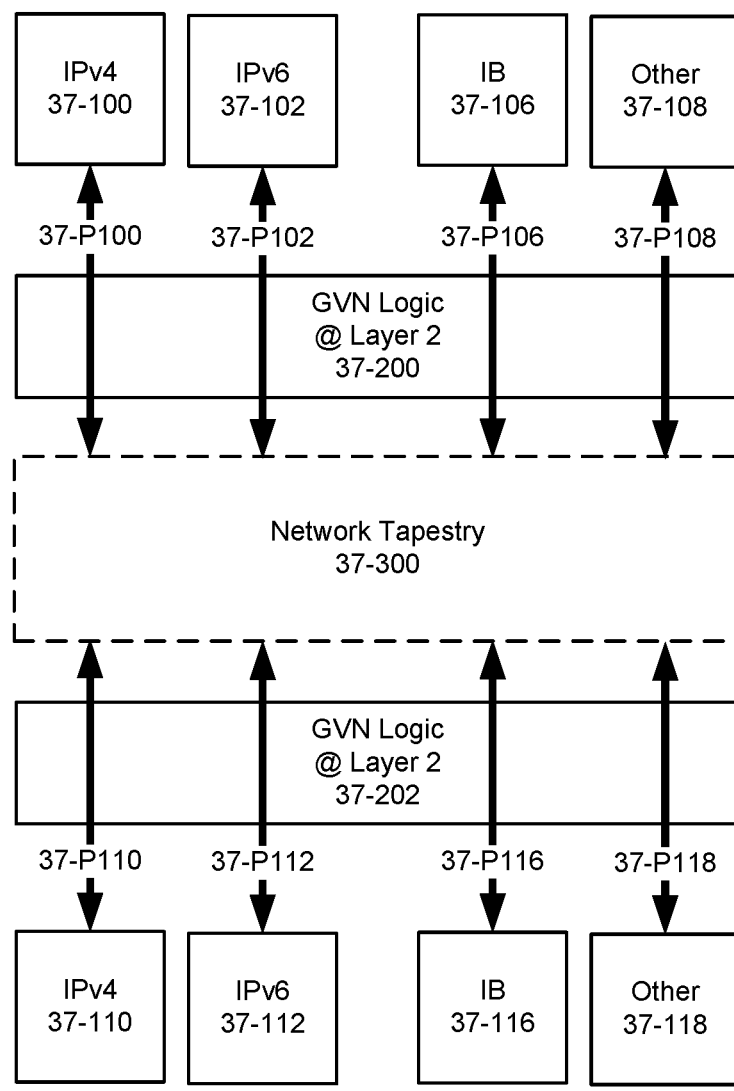
Figure # 37

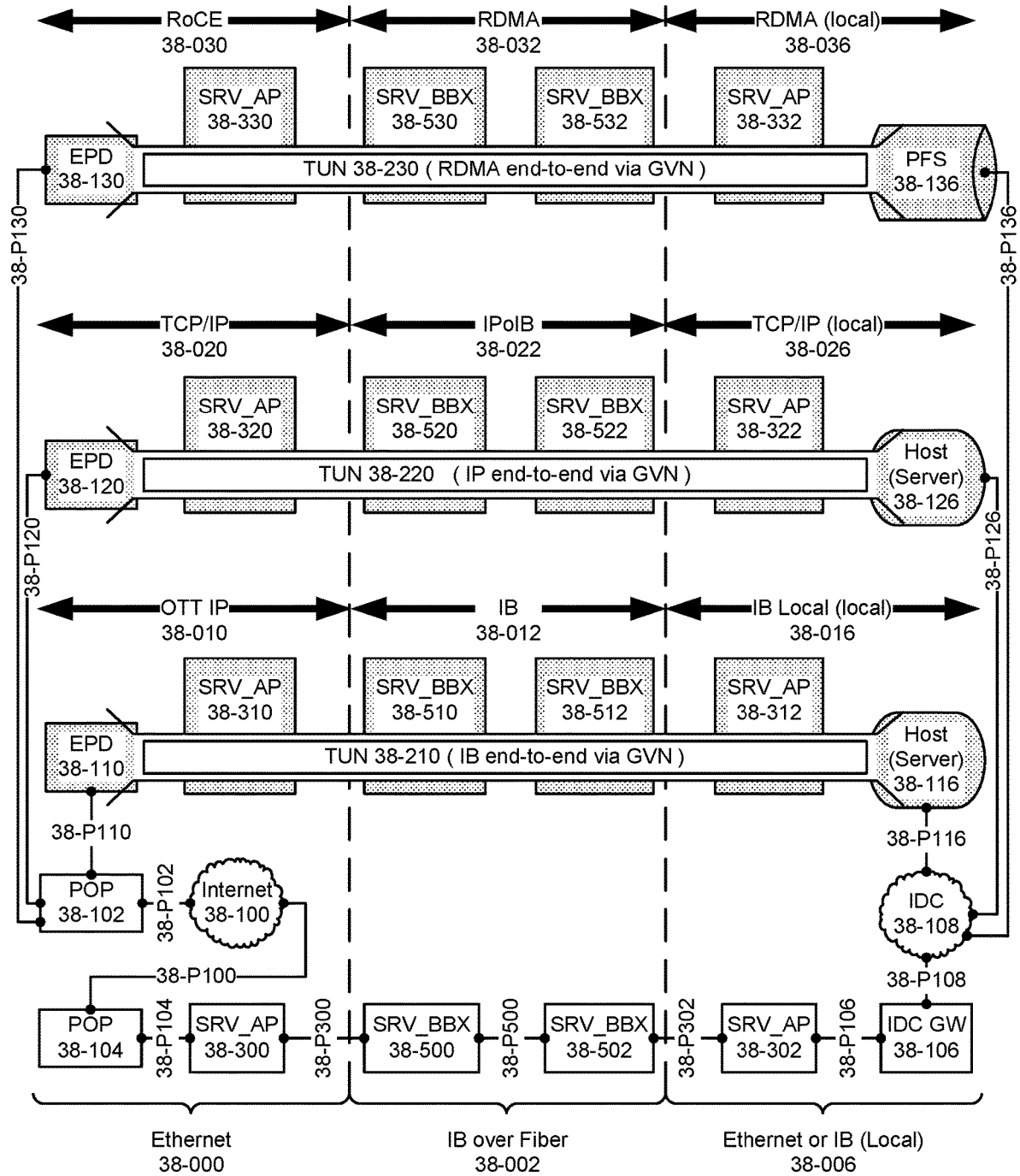
Figure # 38

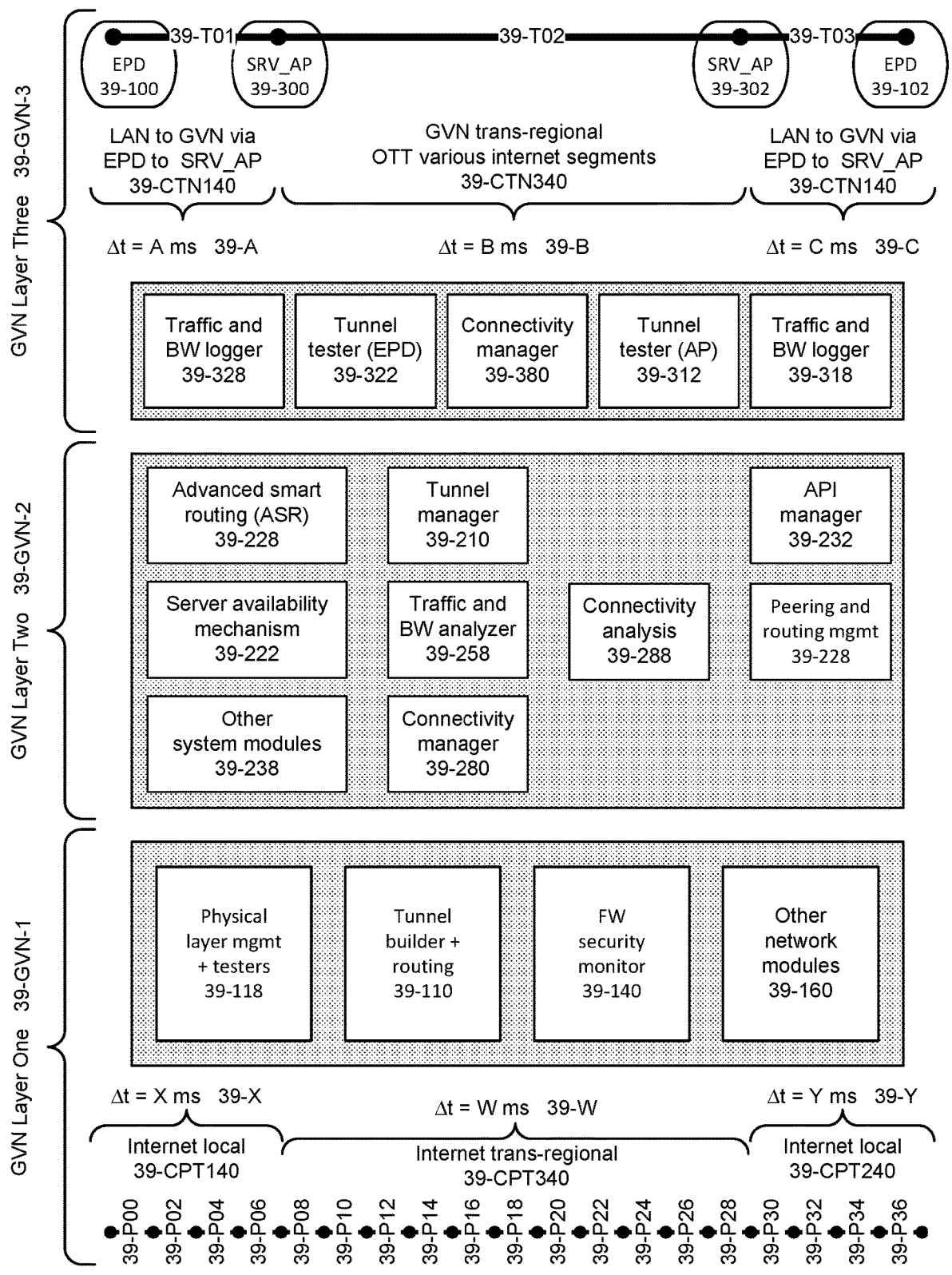
Figure # 39

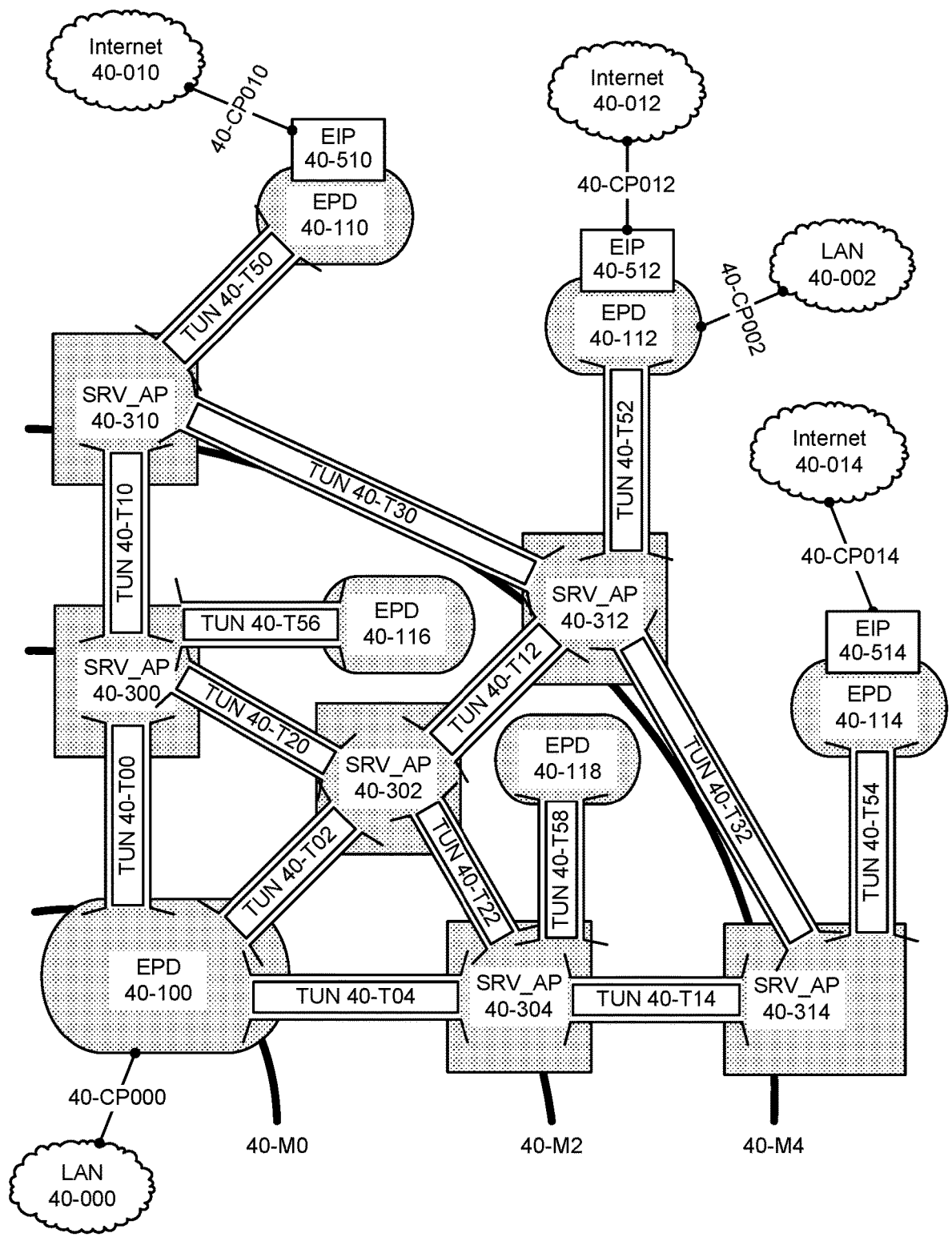
Figure # 40

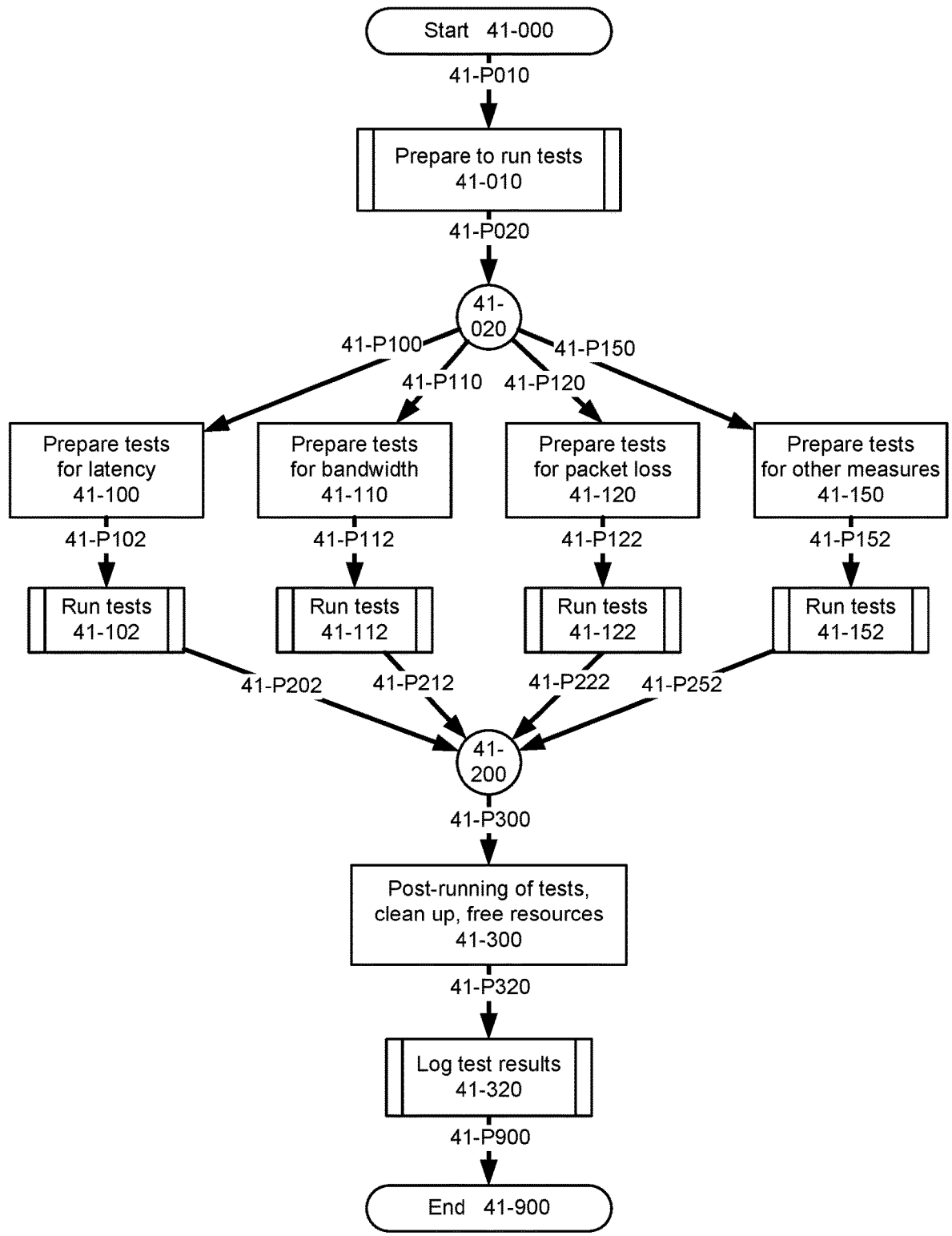
Figure # 41

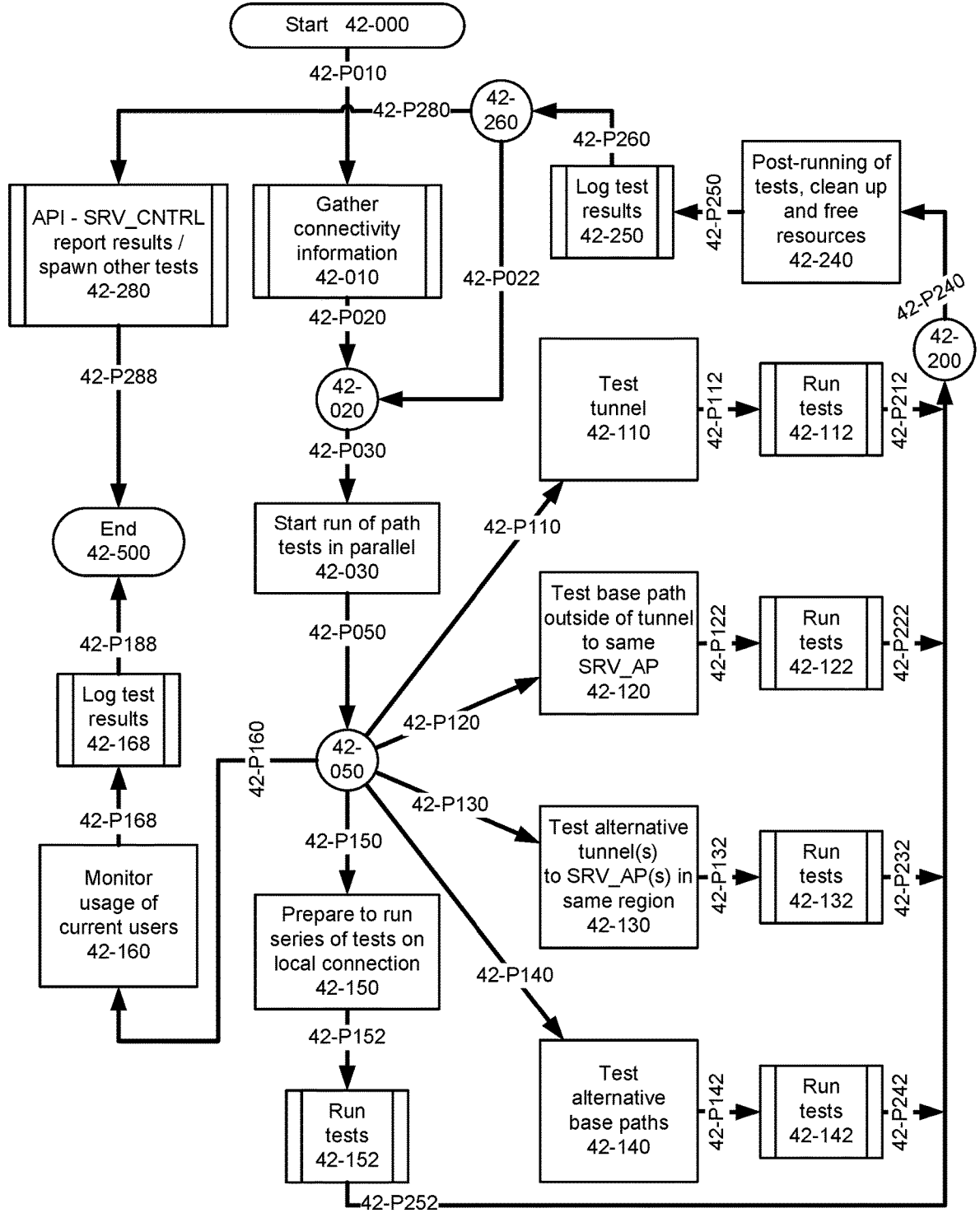
Figure # 42

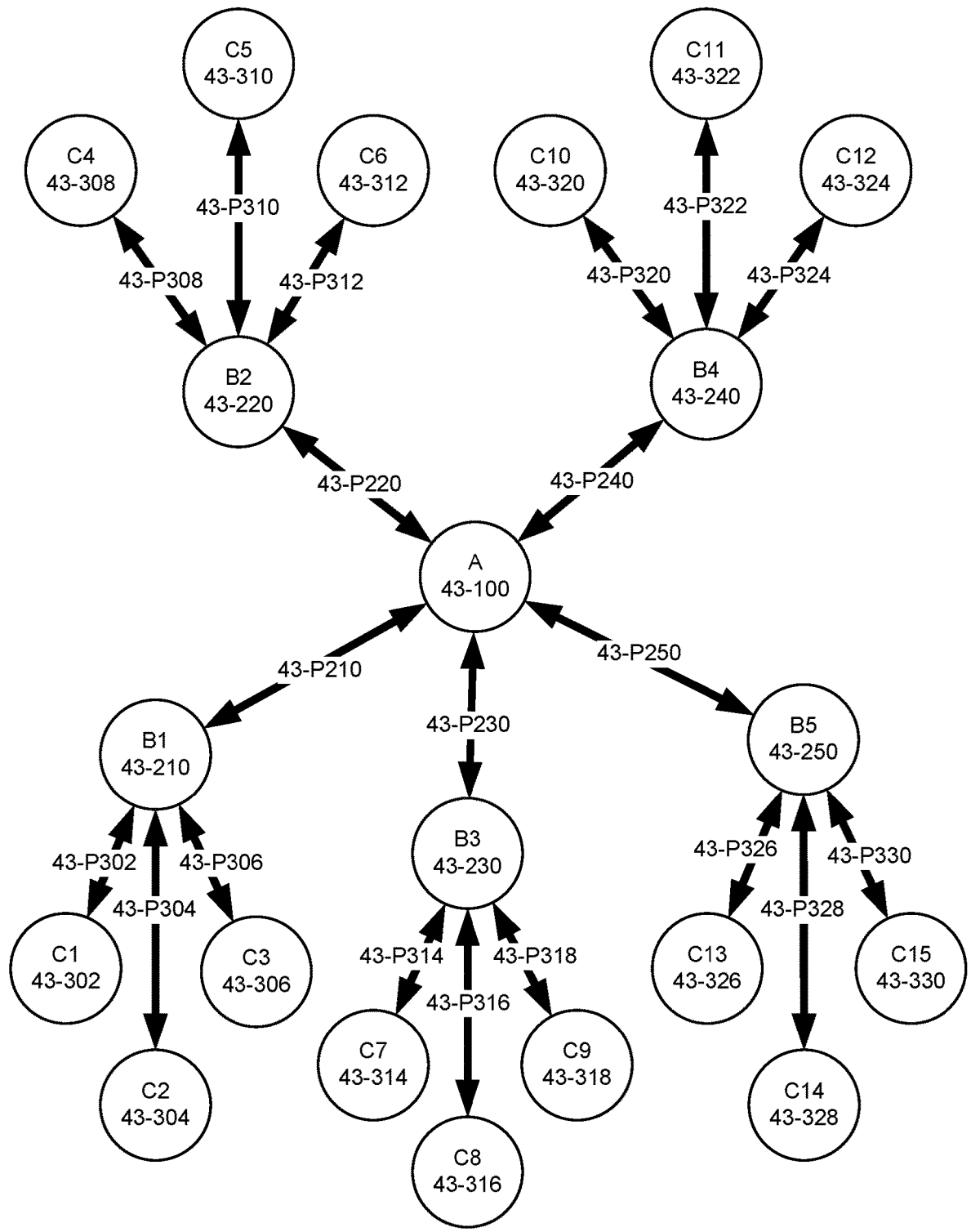
Figure # 43

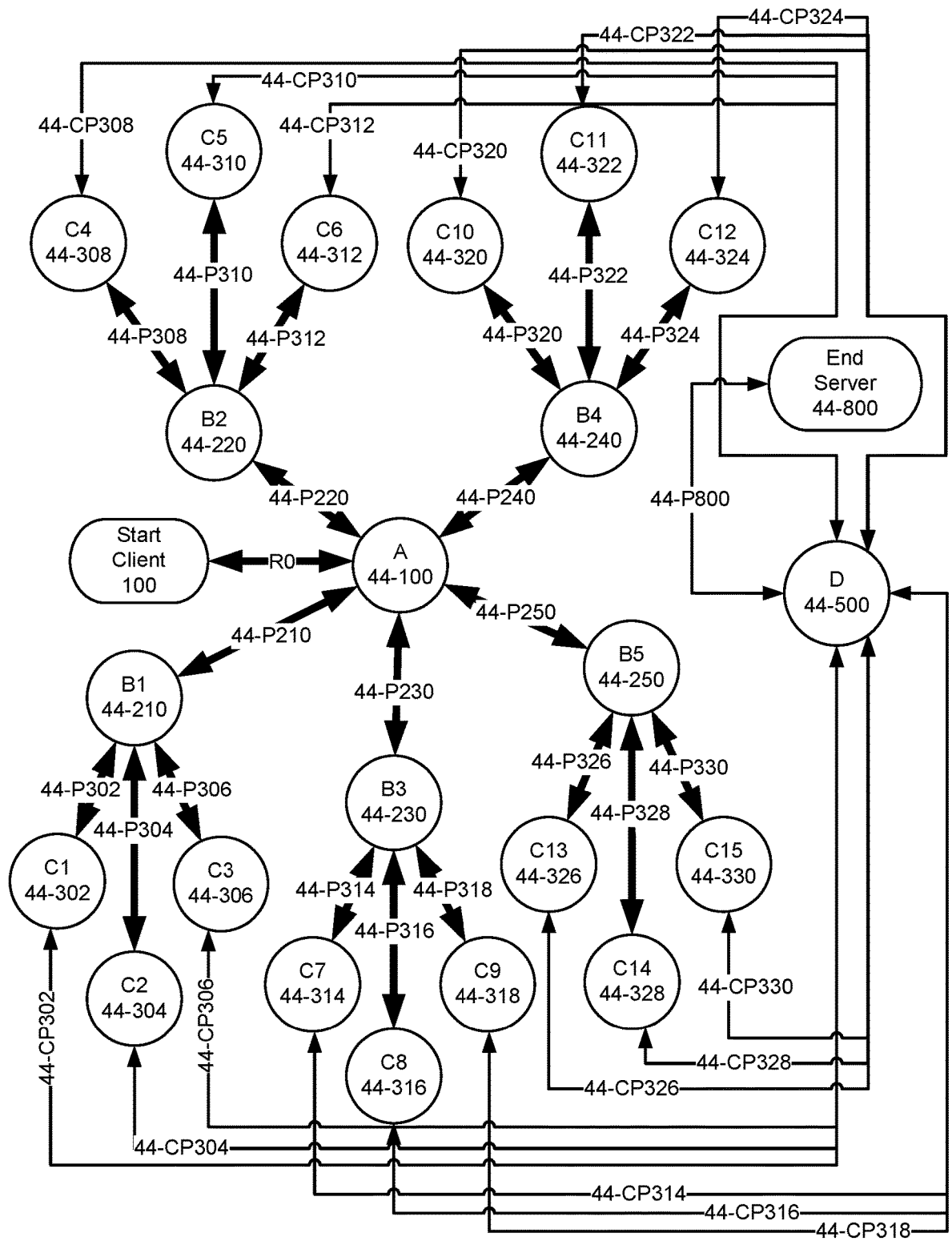
Figure # 44

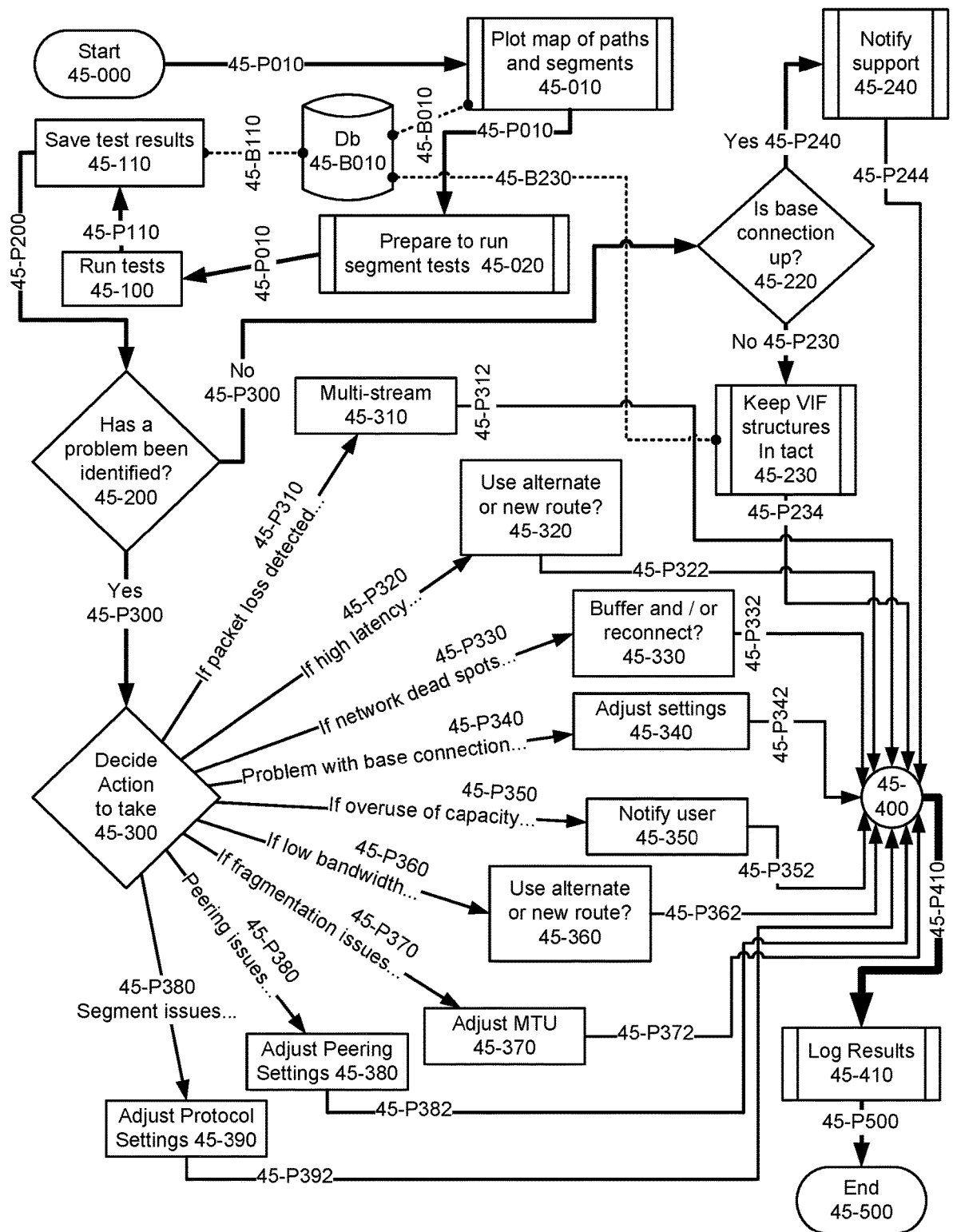
Figure # 45

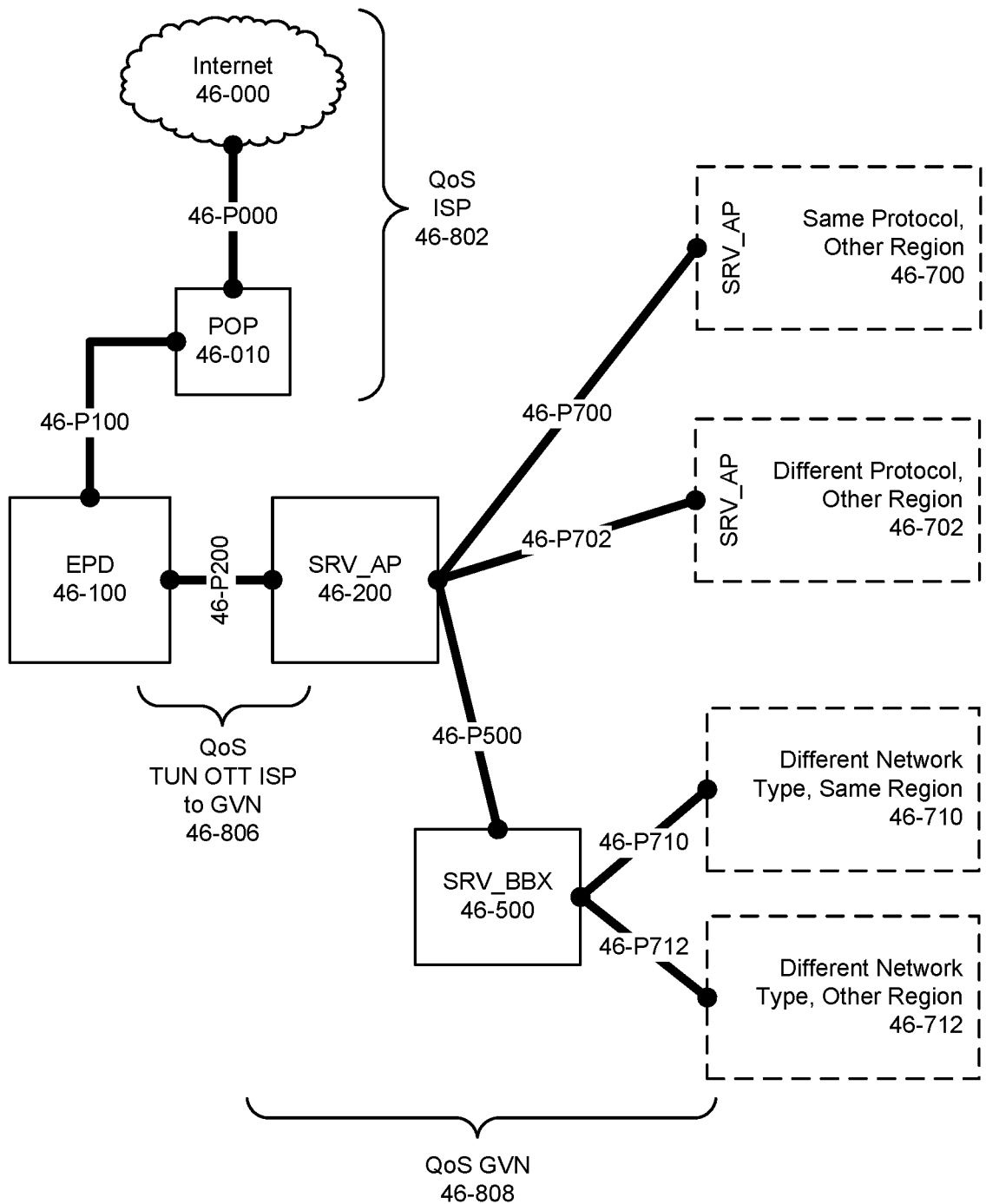
Figure # 46

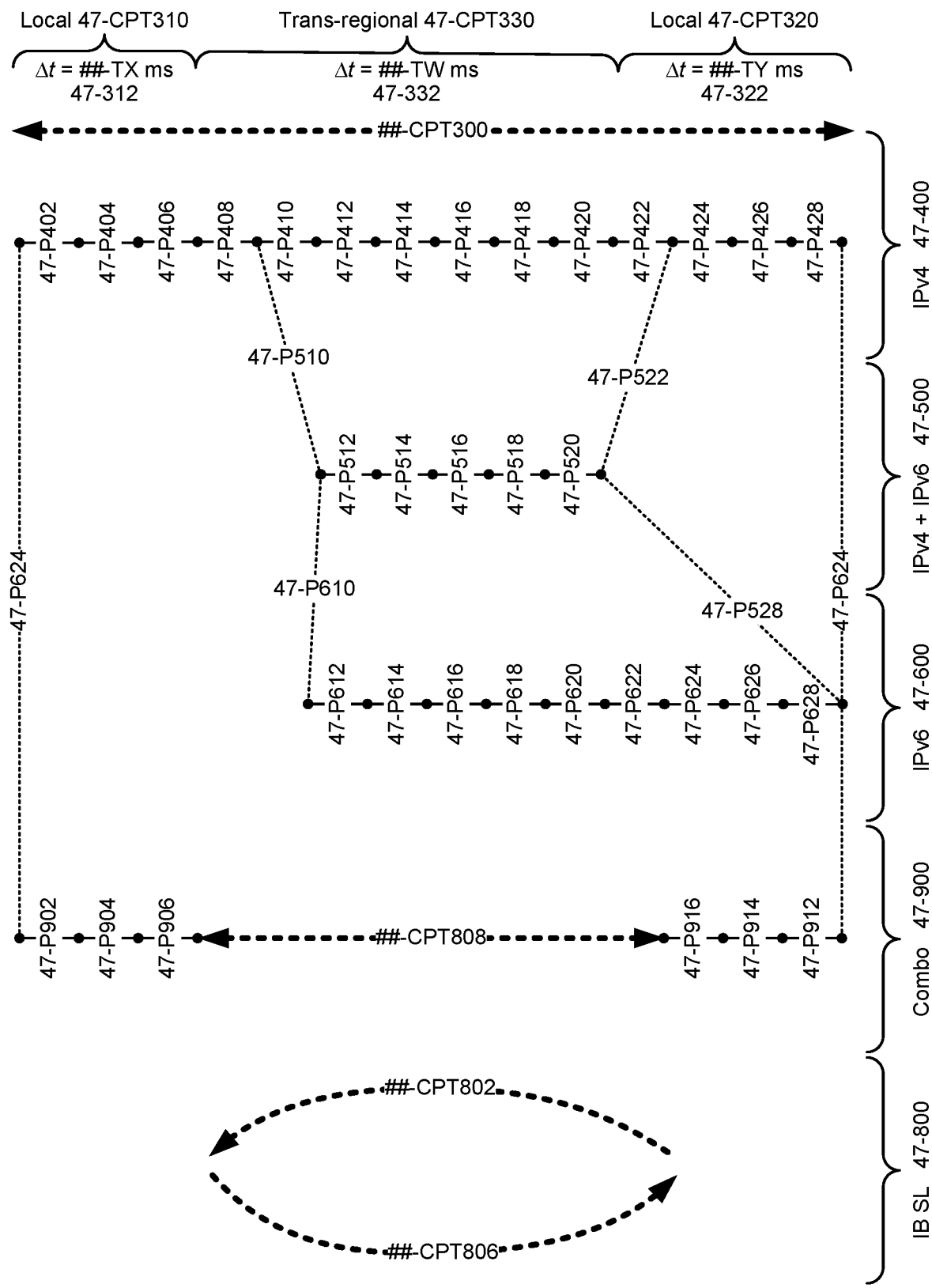
Figure # 47

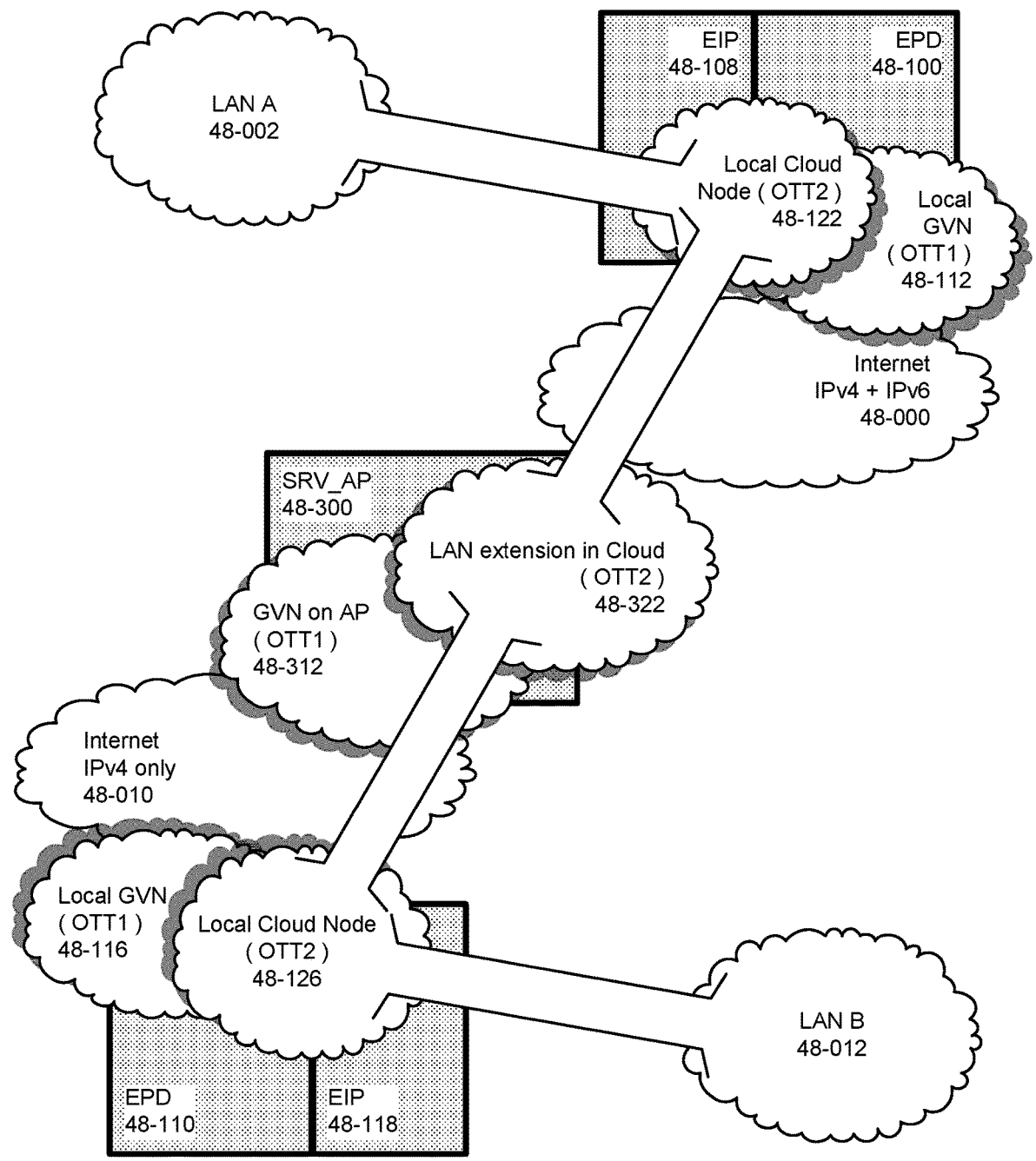
Figure # 48

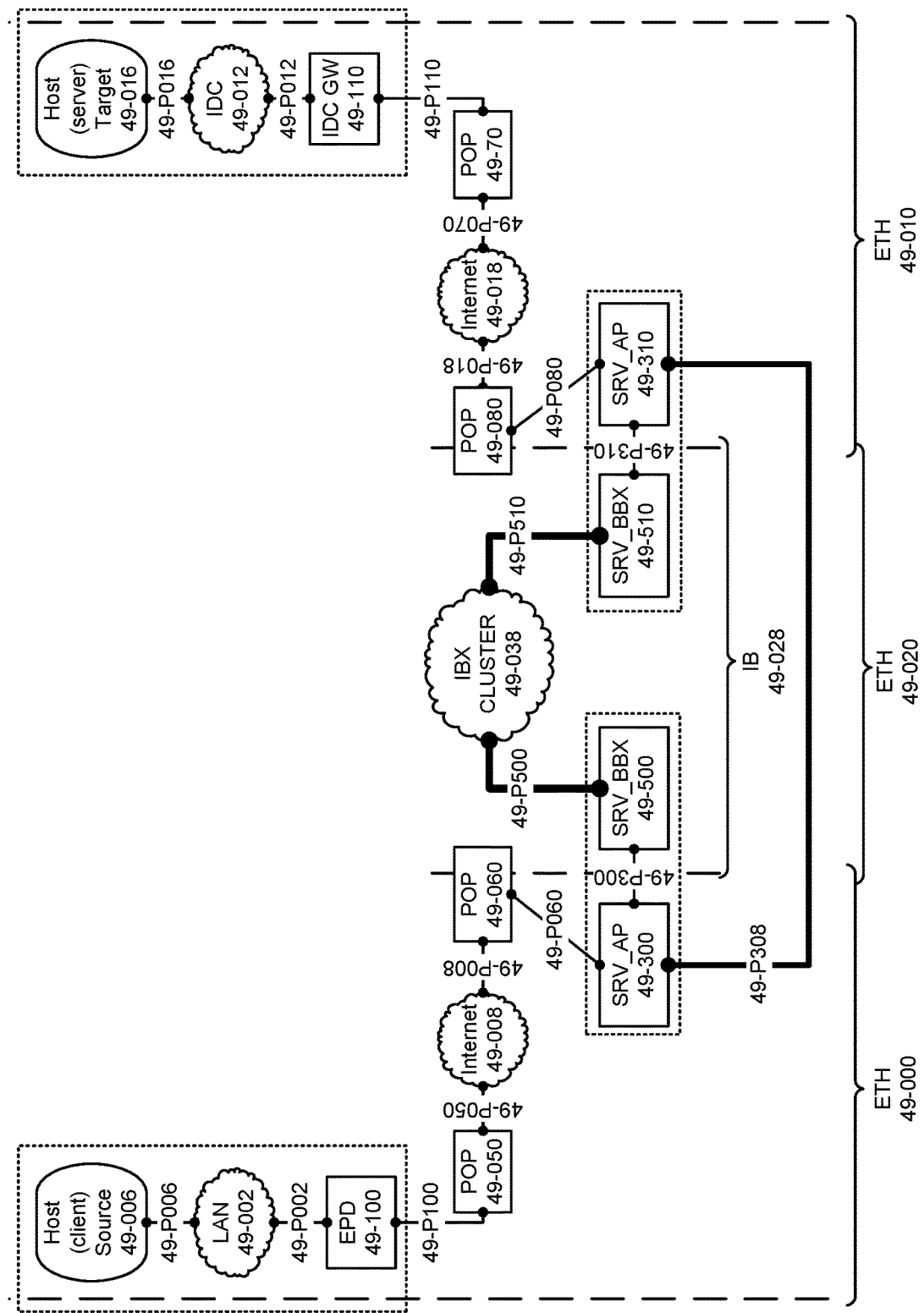
Figure # 49

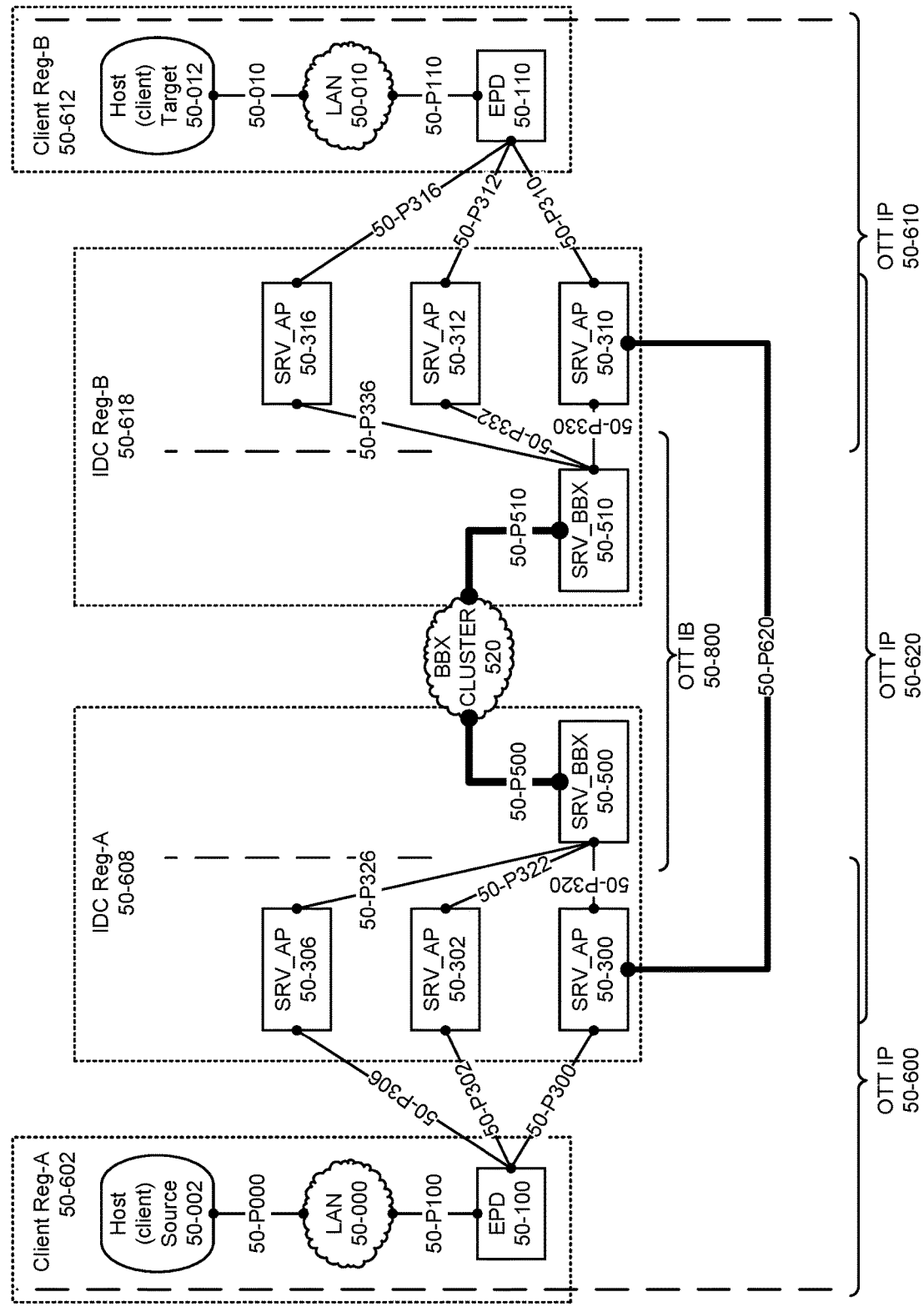
Figure # 50

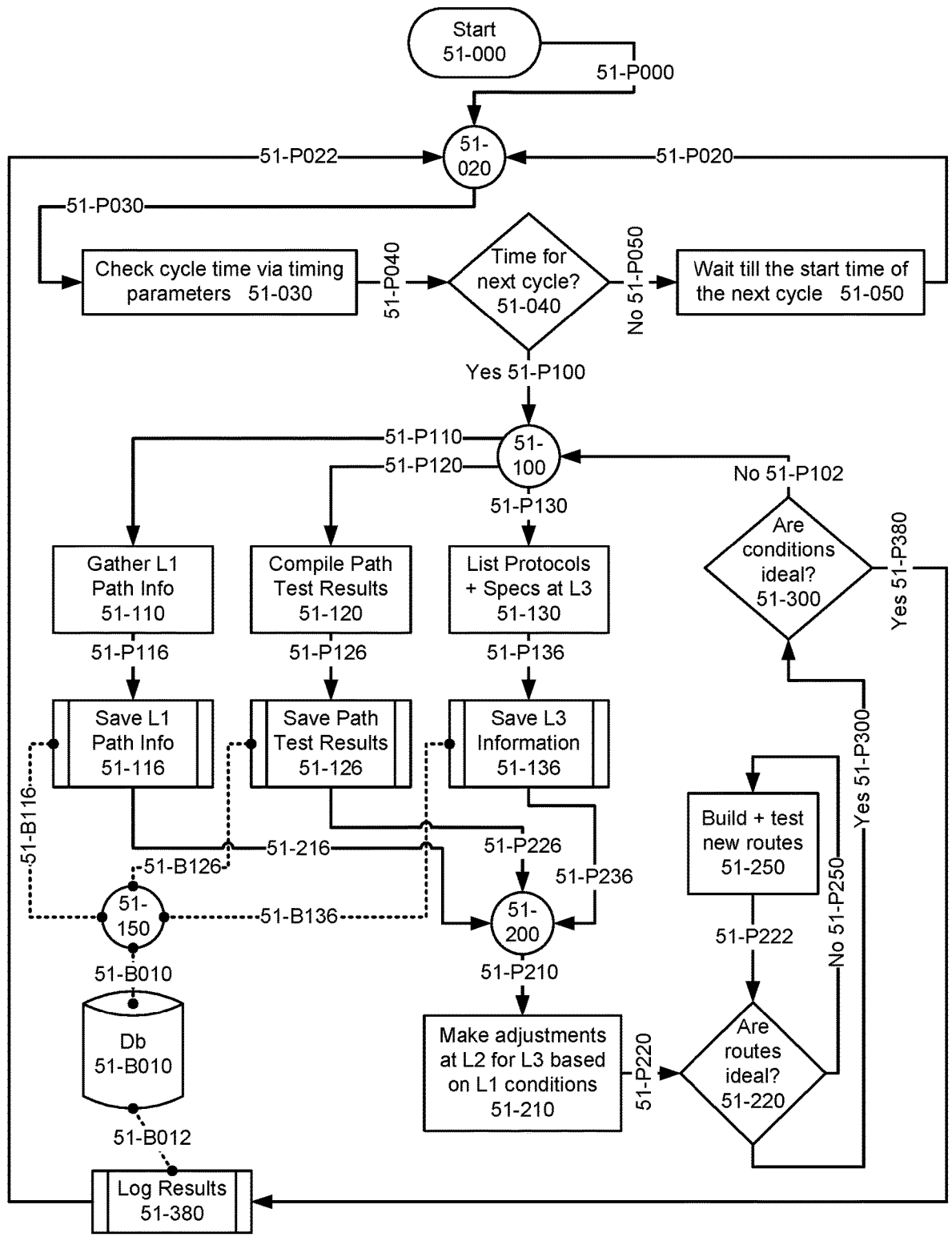
Figure # 51

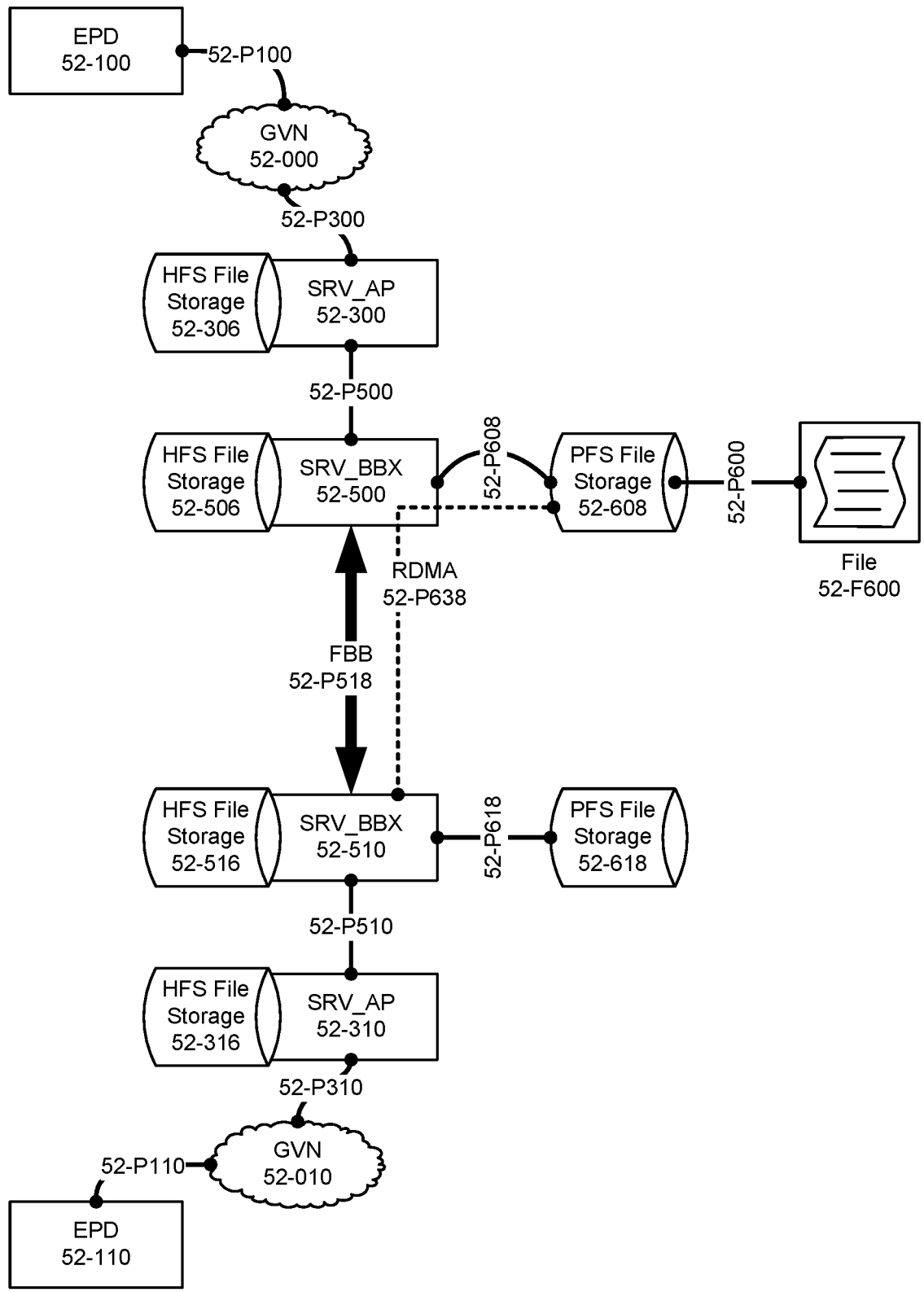
Figure # 52

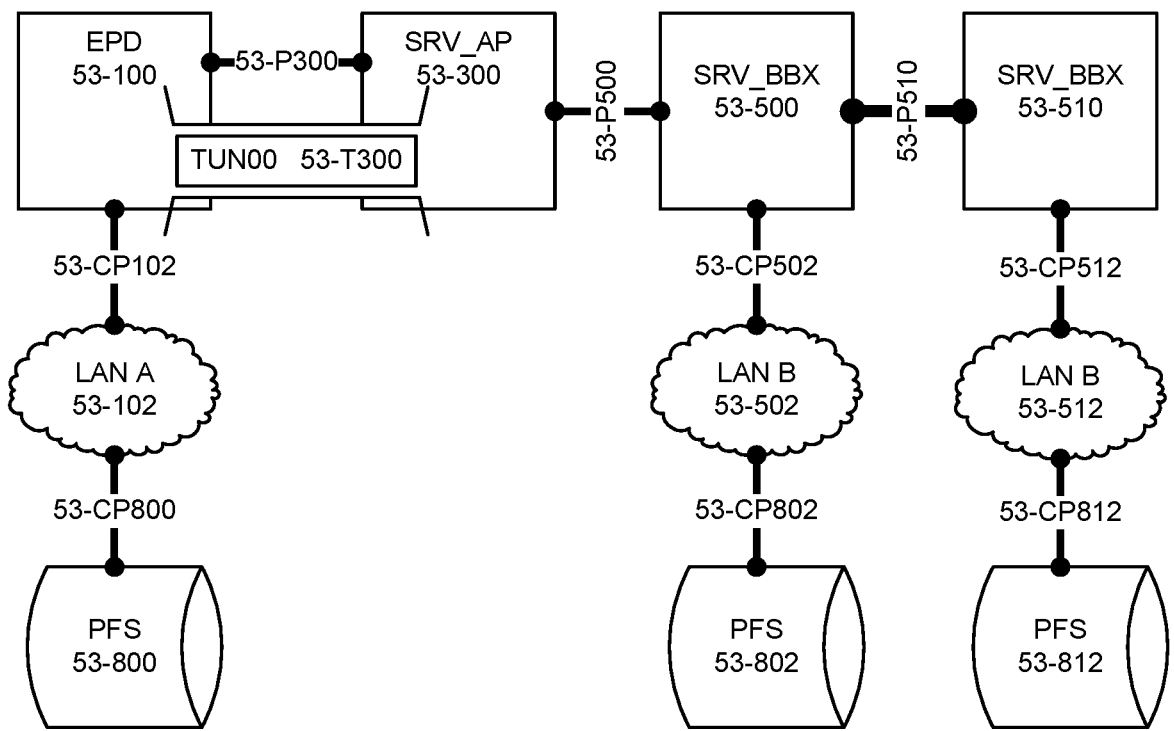
Figure # 53

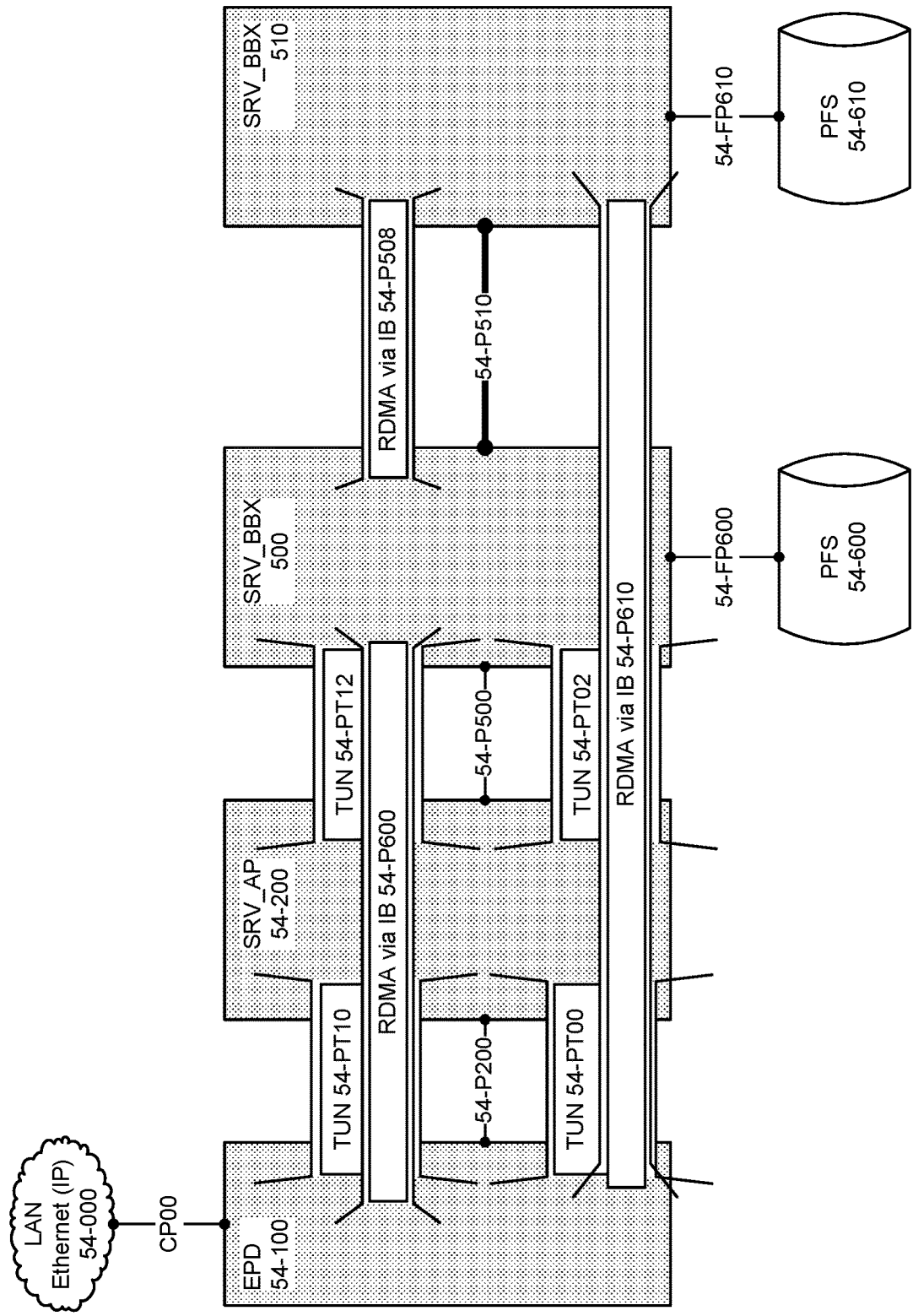
Figure # 54

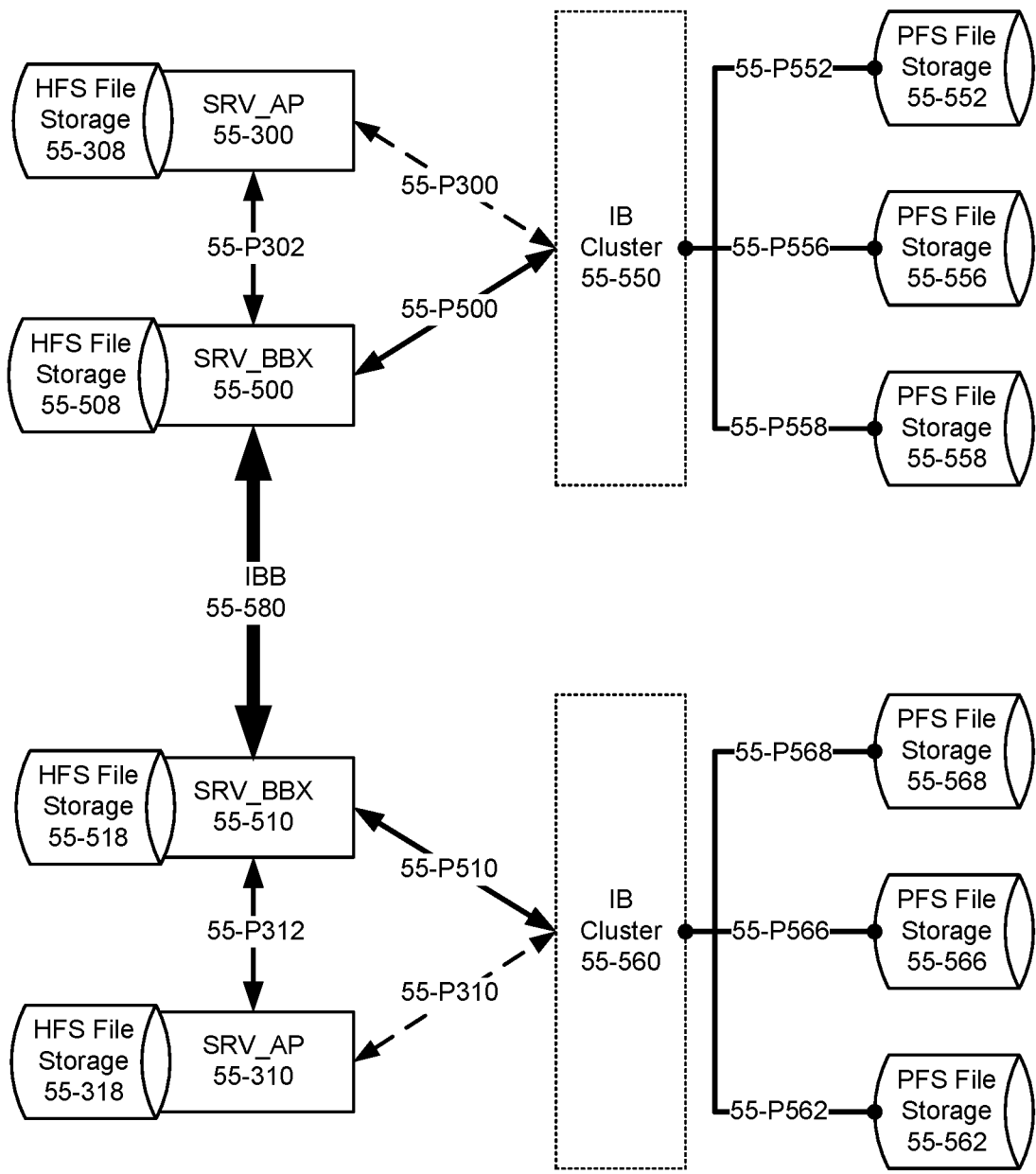
Figure # 55

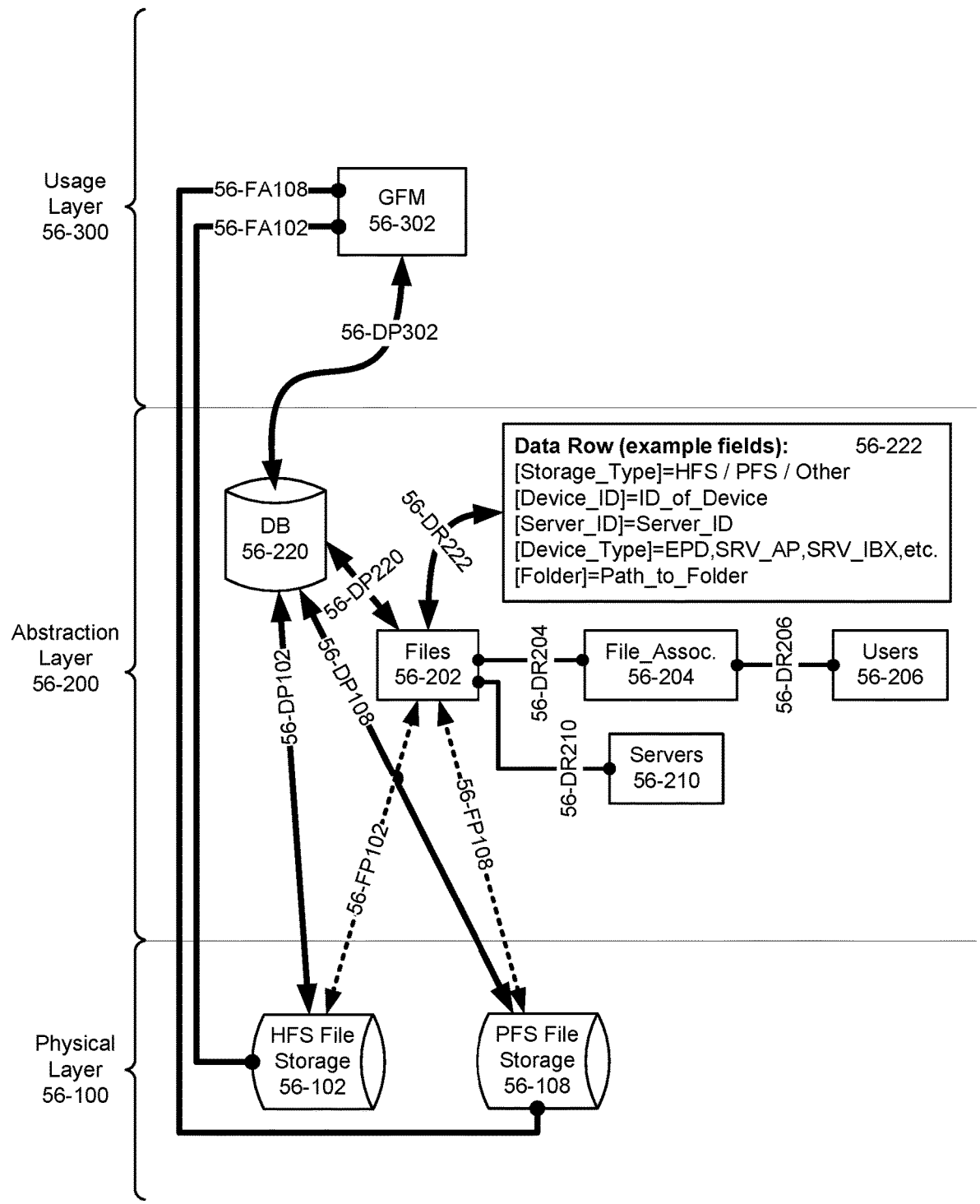
Figure # 56

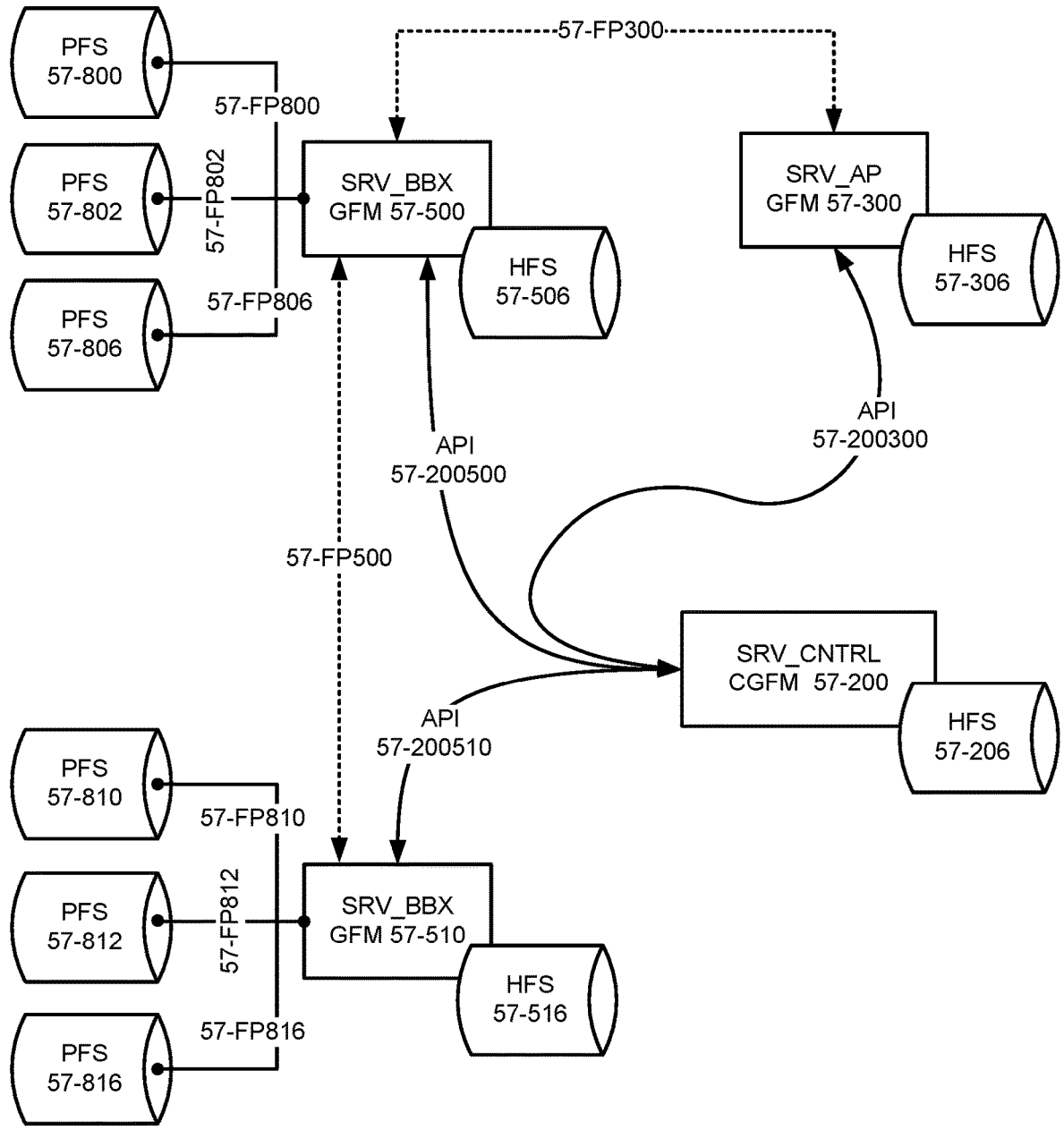
Figure # 57

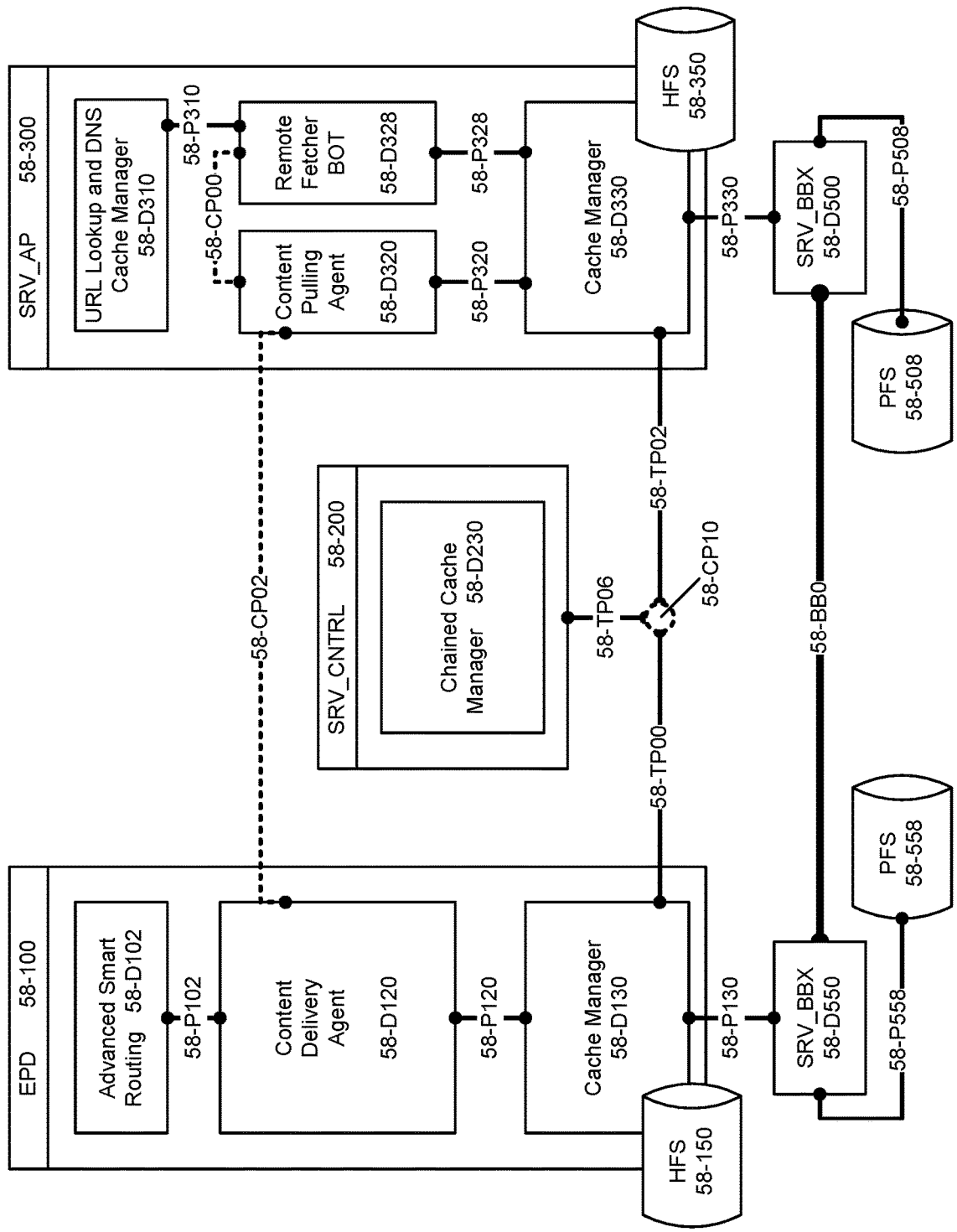
Figure # 58

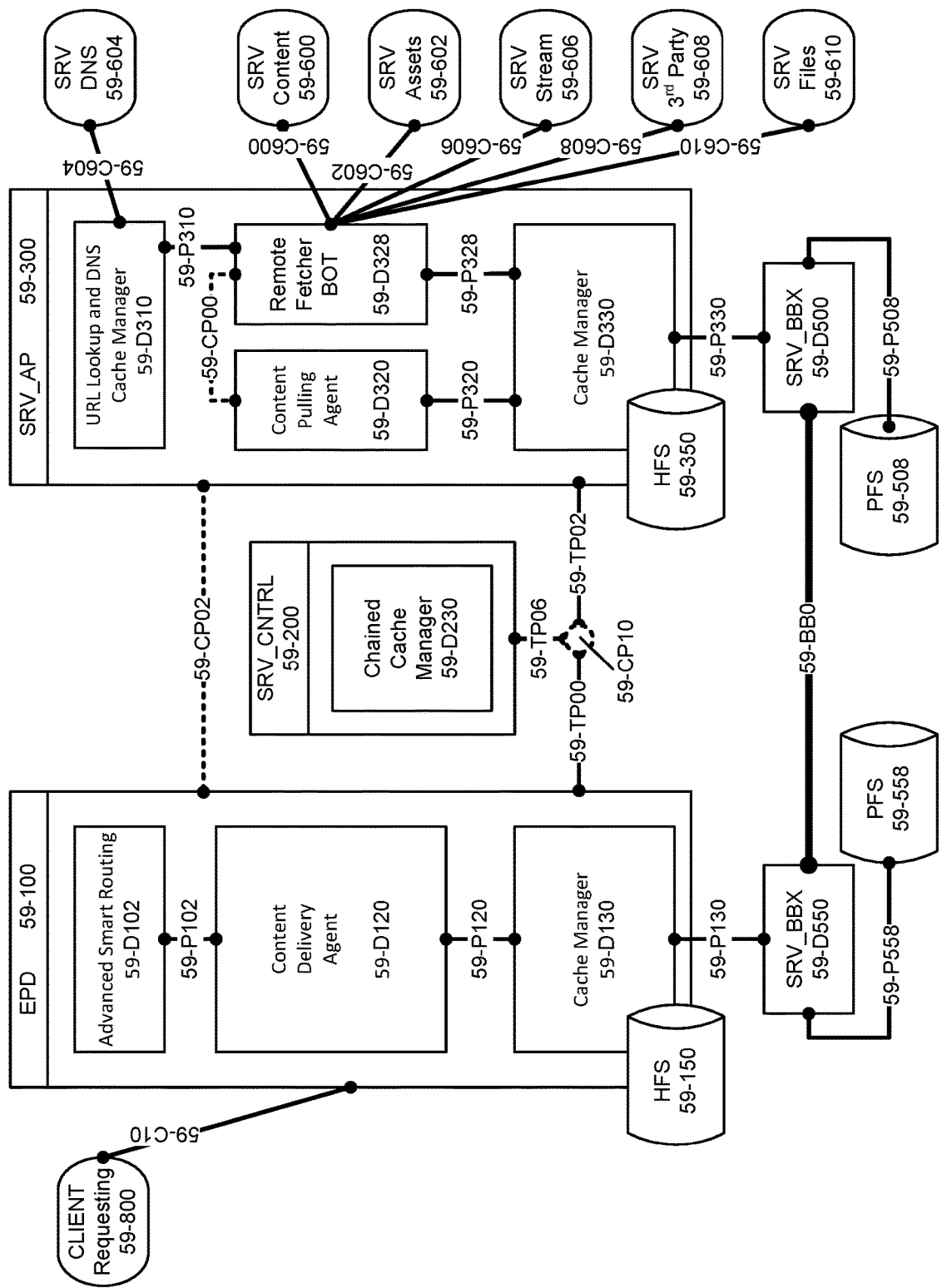
Figure # 59

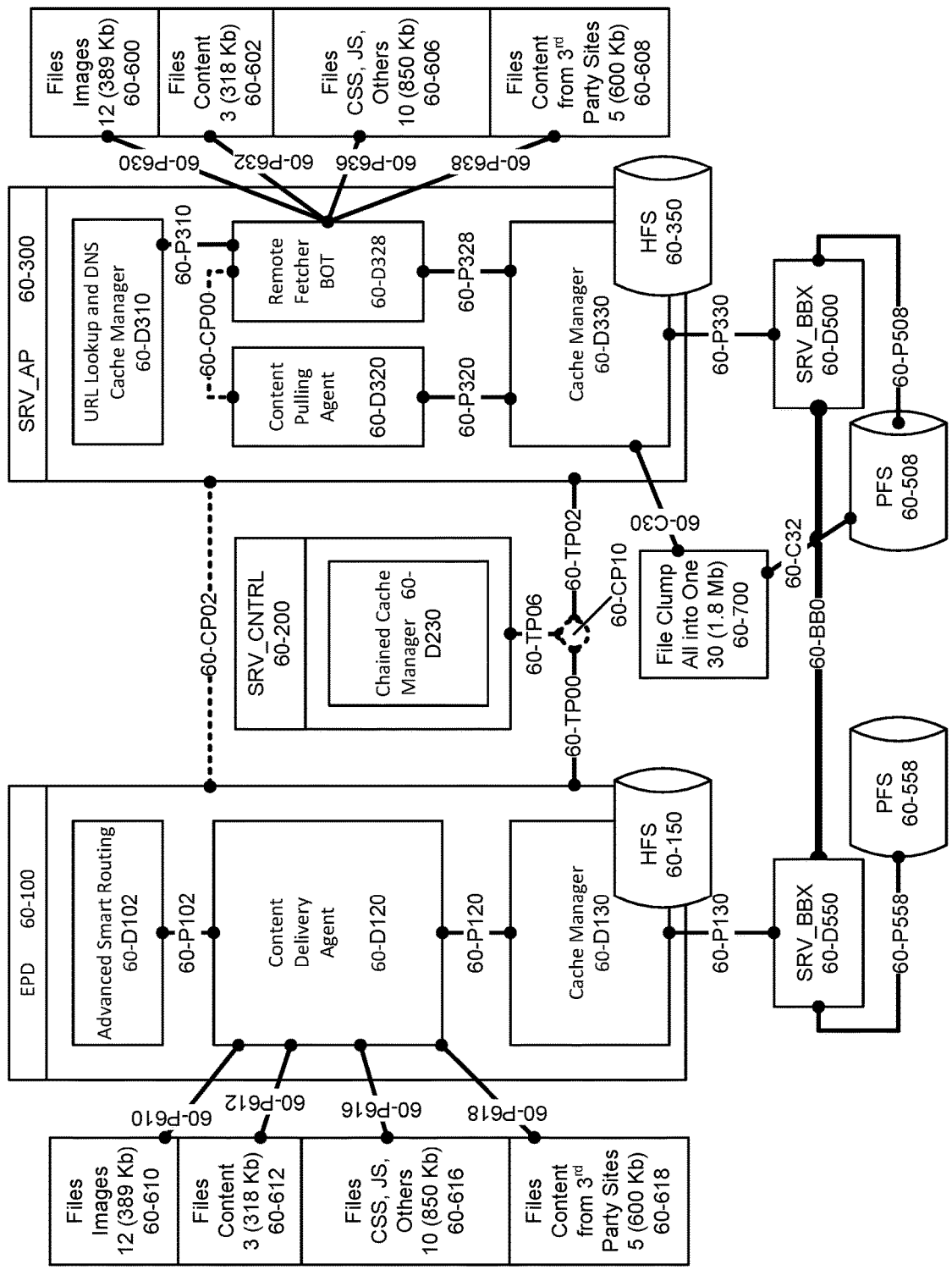
Figure # 60

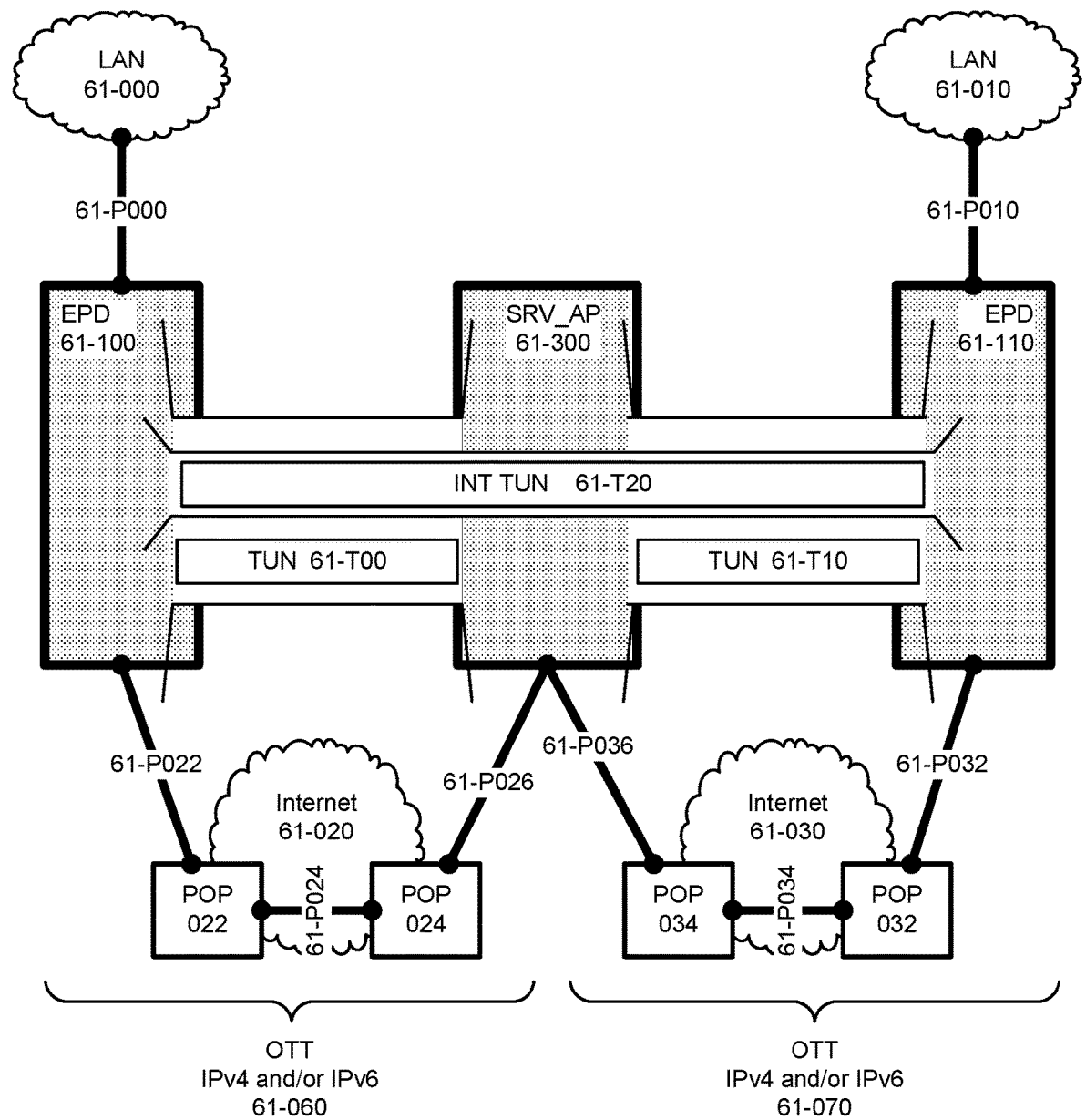
Figure # 61

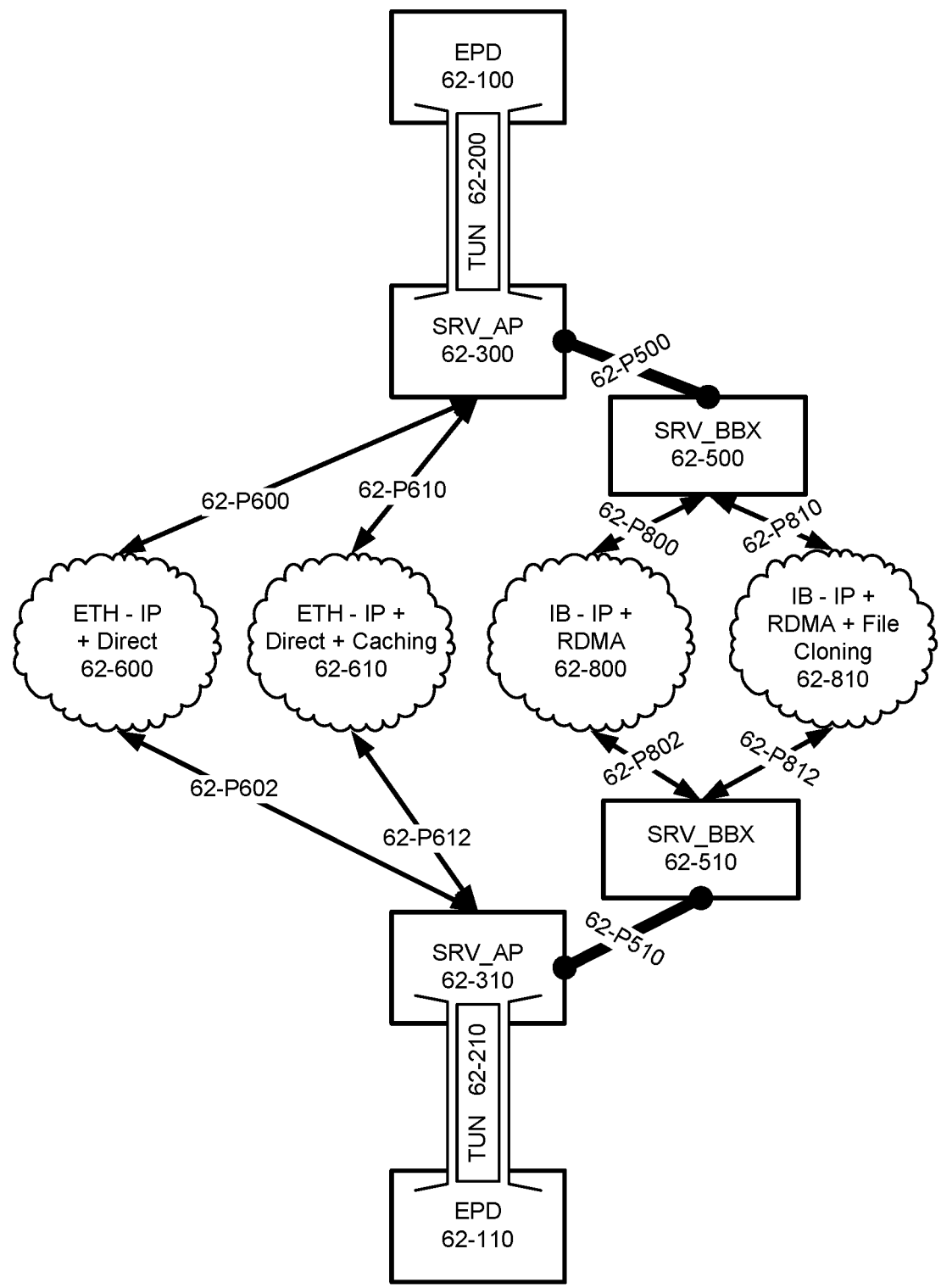
Figure # 62

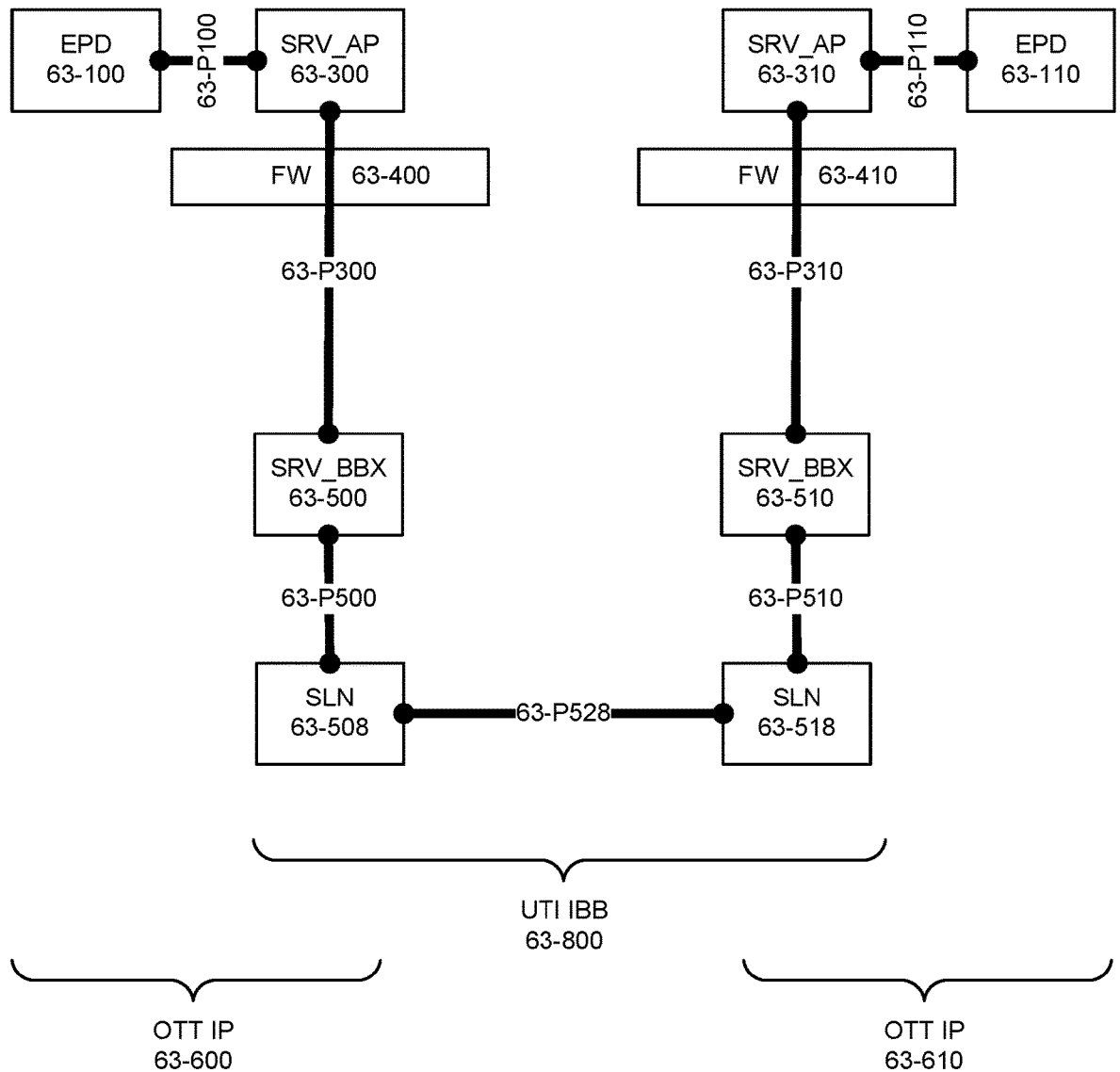
Figure # 63

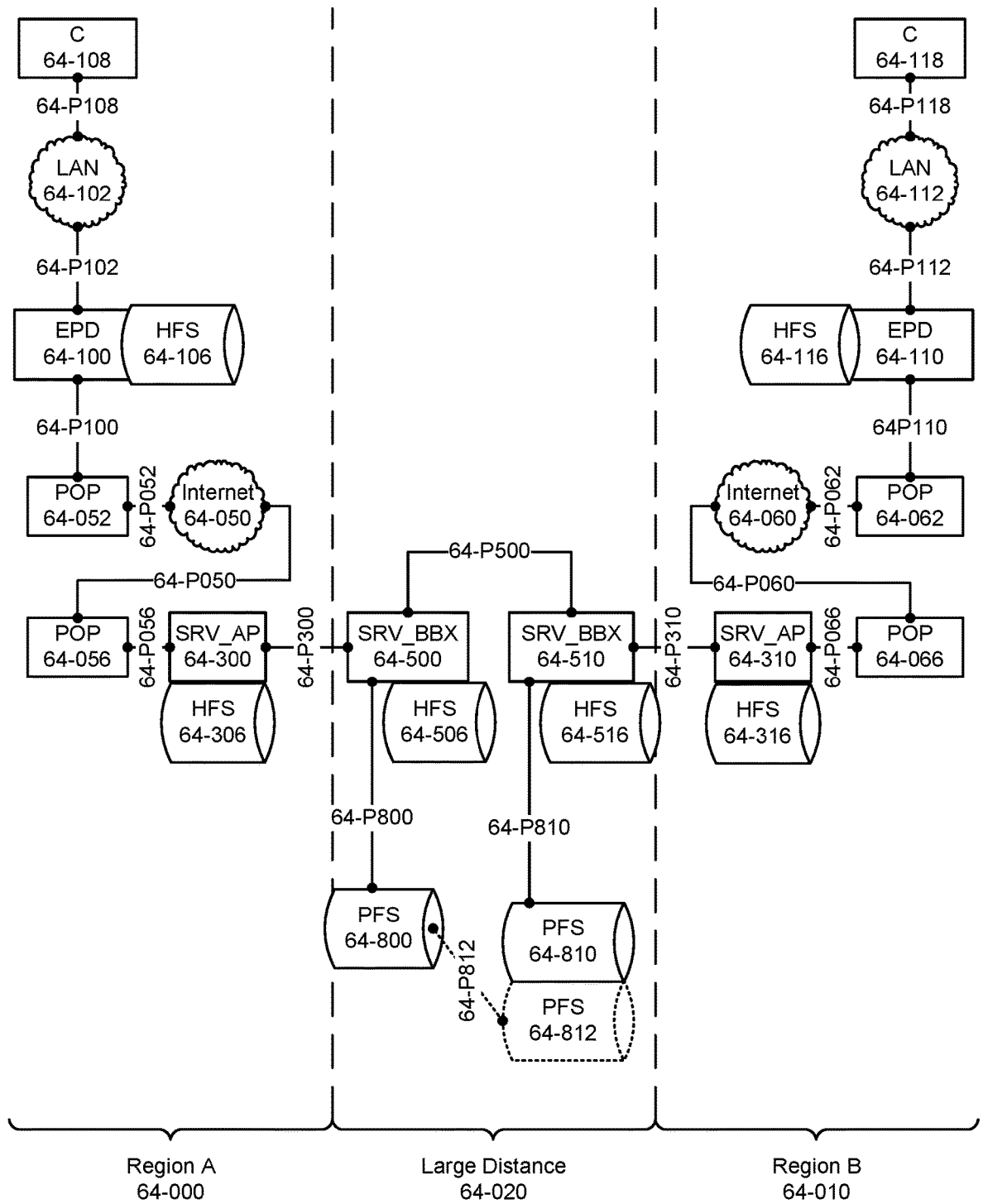
Figure # 64

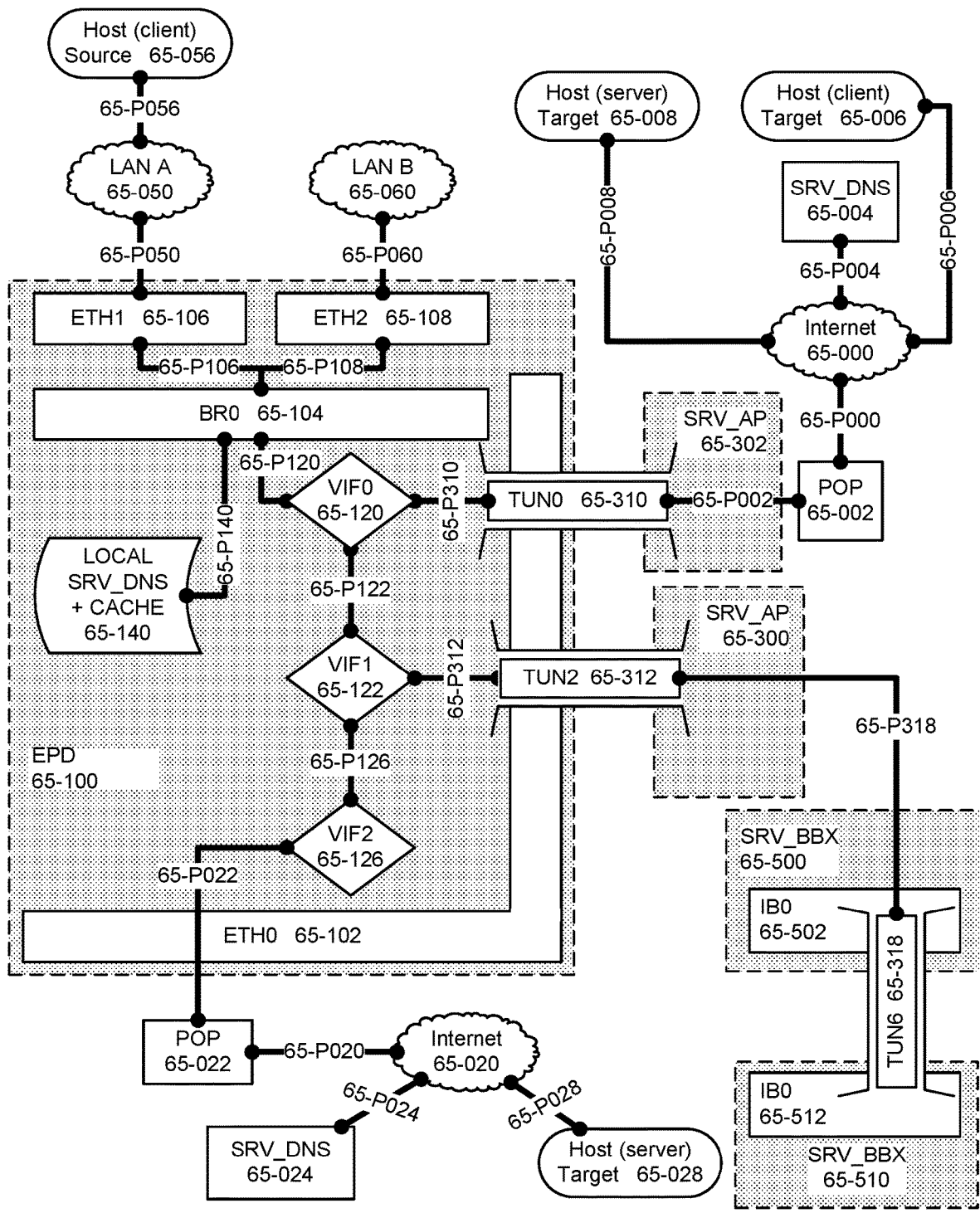
Figure # 65

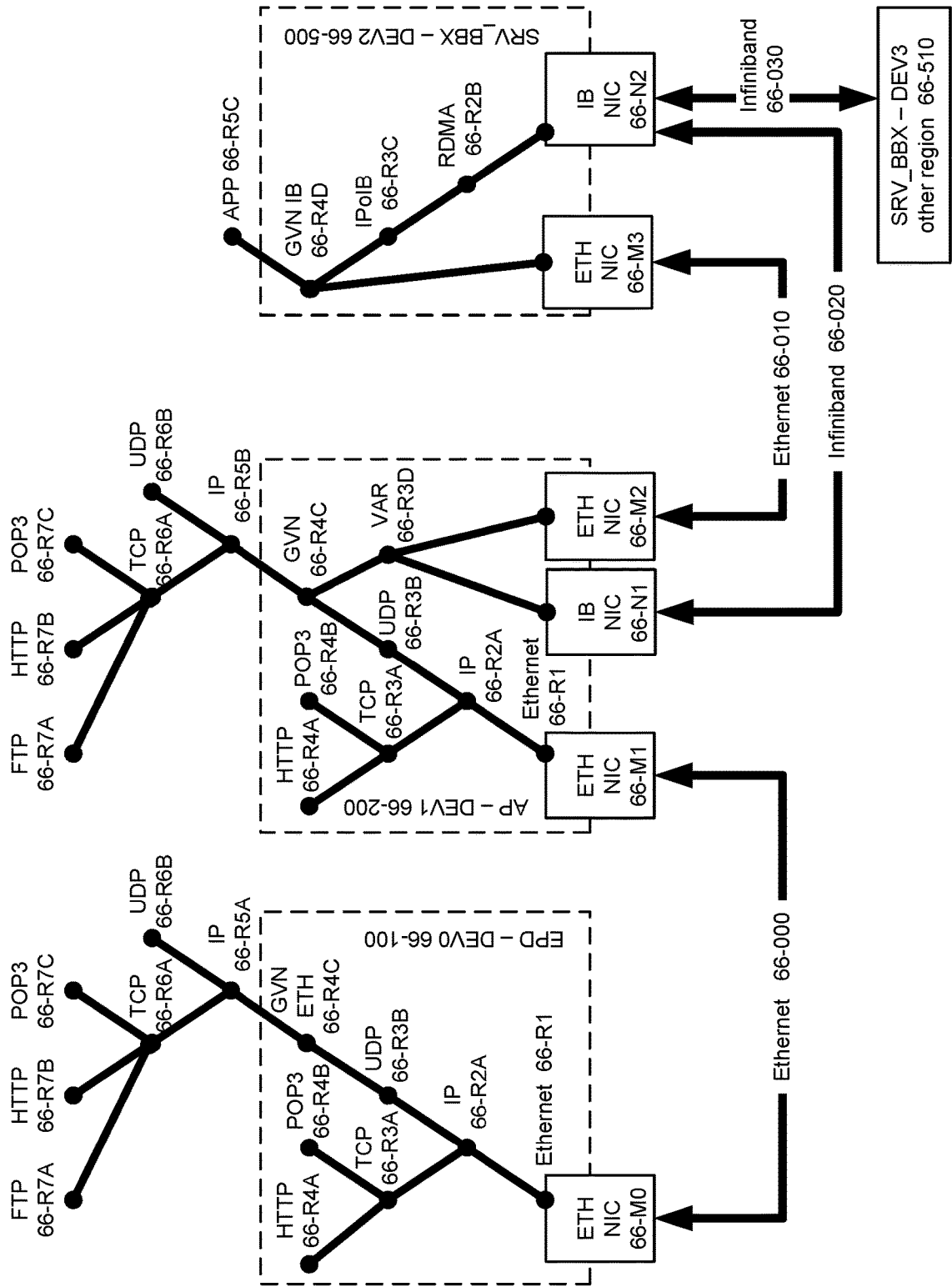
Figure # 66

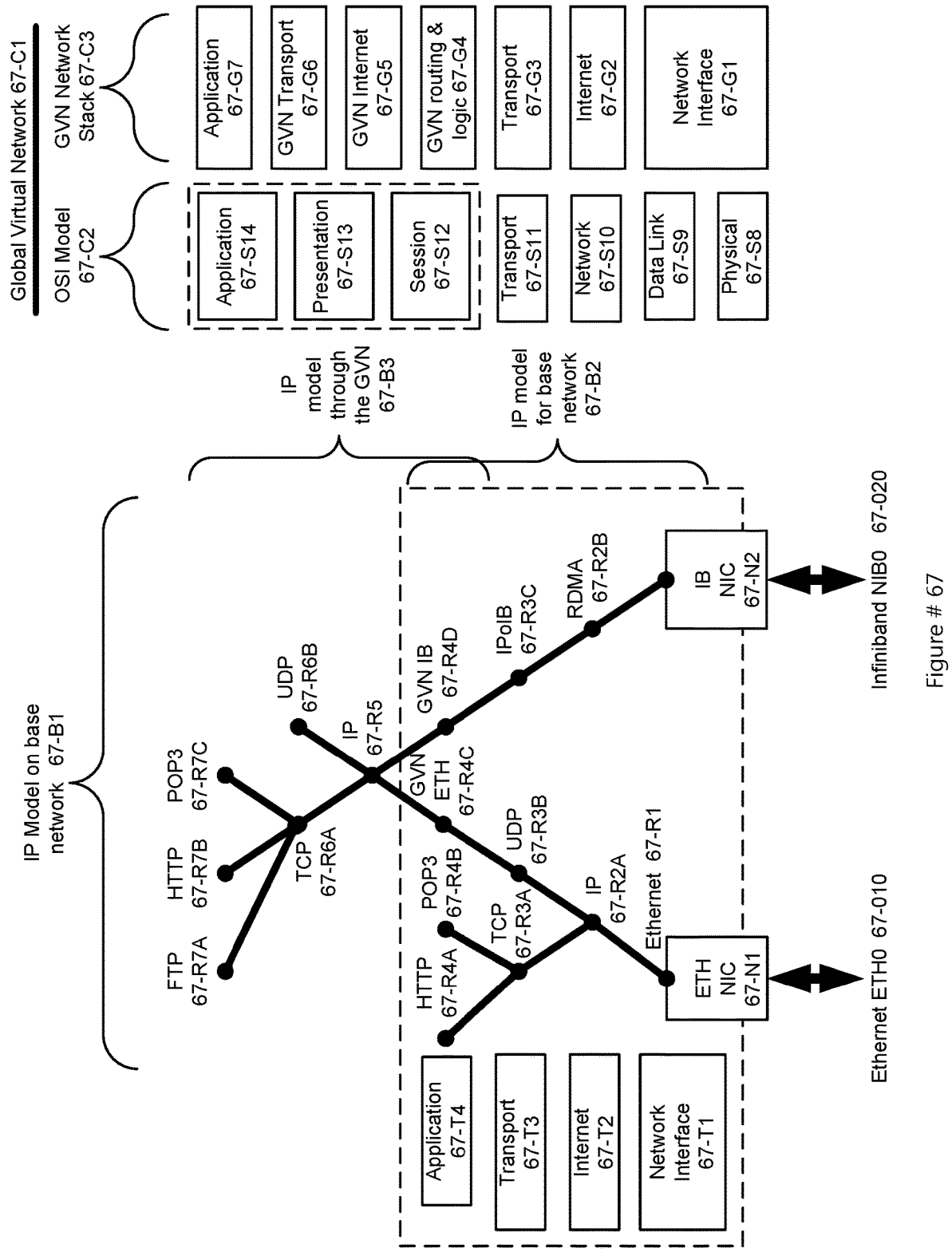
Figure # 67

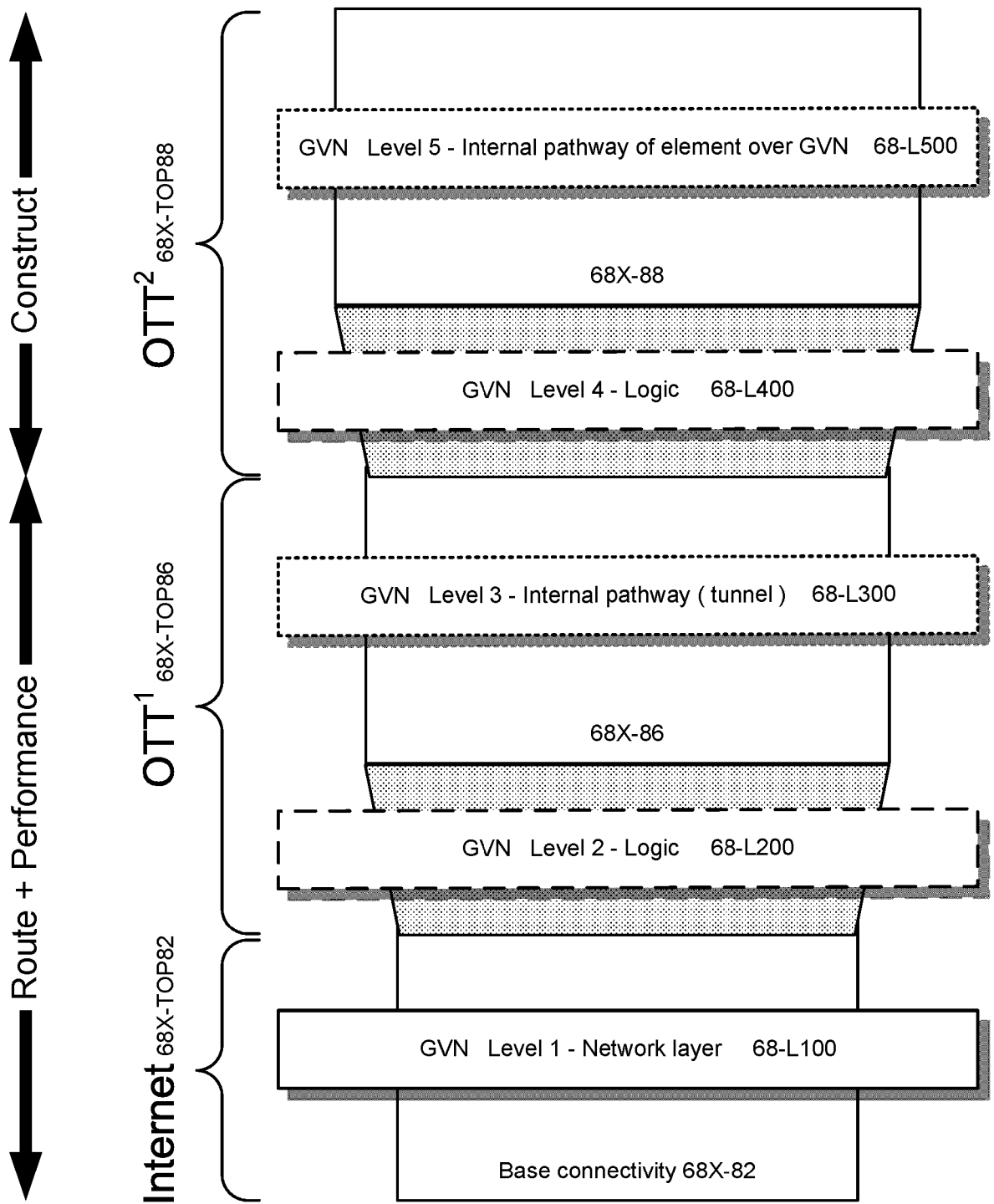
Figure # 68

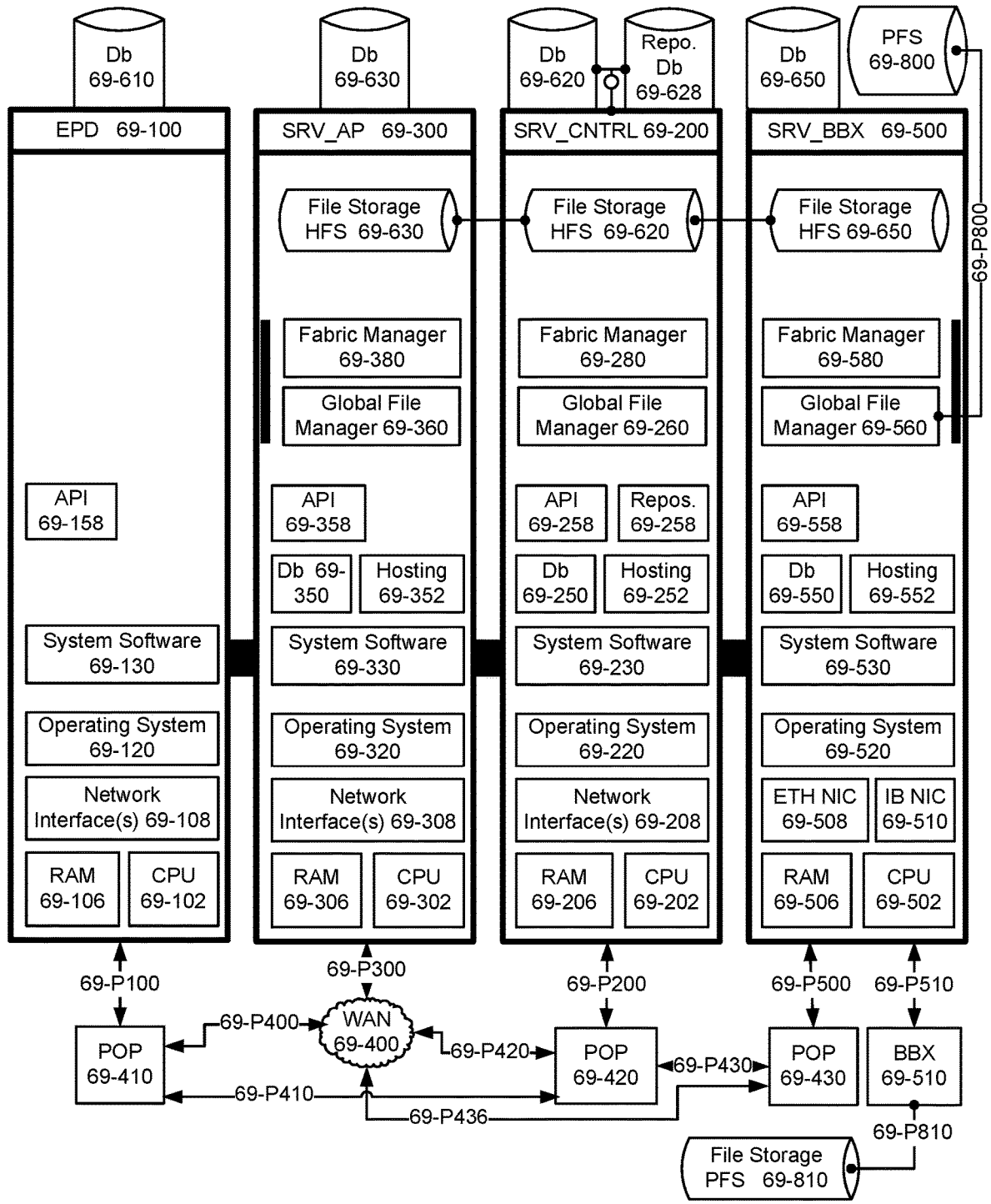
Figure # 69

SYSTEM AND METHOD FOR NETWORK TAPESTRY MULTIPROTOCOL INTEGRATION

This application is a U.S. National Stage application under 35 U.S.C. § 371 of International Patent Application No. PCT/IB2016/001161, filed Jun. 13, 2016, which claims priority to U.S. Provisional Application No. 62/174,394 filed on Jun. 11, 2015, the entire content of which each application is incorporated herein by reference in its entirety.

FIELD OF THE DISCLOSURE

The present disclosure relates generally to networks, and more particularly, the flow of traffic through a global virtual network across various network fabrics integrated into a greater network tapestry.

BACKGROUND OF THE DISCLOSURE

The first deployments of 'networks' typically consisted of a topology with a large central computer core such as a mainframe with slave terminals connected to it directly in the same facility. This manifestation of mainframe and terminals had certain advantages allowing for distributed physical access but in the past, all users needed to be in close proximity to the core. As network transmission over distance improved, slave terminals were able to be located in remote locations further away from the mainframe. Today, this type of topology may be referred to as a central server and thin client devices which connect to it.

Then power and storage were shifted to personal computers (PCs) whose local CPU, RAM and storage allowed for computing to be contained within the PC. Today, the pendulum is swinging back. The rise of personal computers was a driver for the development of wired networking technologies, then laptops (portable computers) were the impetus for wireless networks, and later mobile phones, smart phones, tablets, phablets and other types of mobile and wireless devices were the impetus for improvements in both wired and wireless network infrastructure.

Mobile devices and improved internet connectivity at the last mile spurred a proliferation of services where host clients store, access, and retrieve their data via servers in the cloud. The Internet of Things (IoT) means more and more connected devices—many of these in LANs, PANs, Piconets, etc. and the majority of these devices must not only have an upstream connectivity but must also be found on the Internet.

Line requirements of devices connected to the internet are varied. Some are tolerant of less than ideal connectivity where other devices have an absolute requirement for low latency, zero packet loss and high bandwidth to function properly. And as the proliferation of devices continue, the sheer number of devices will present problems requiring solutions. These problems include how to connect all of these devices reliably, how to efficiently find all of these devices, and how to carry copious amounts of data between them and big data aggregation points.

The internet is comprised of connected devices which constitute a network and the connecting of these networks constitute a network of networks. As networking continues to evolve, core protocols and network types continue to mature and they have expanded to the point where network types can be referred to as a network fabric. Common network fabrics are built upon standard protocols such as IPv4 and IPv6 on top of the Ethernet standard, Fiber Channel, InfiniBand, and various other network protocols and types.

A network fabric may be defined as either a network under administration of one body which is peered to other networks on a one to one basis defined as single honed or as a one-to-many network relationship via a multi-honed peering. A network fabric may also define the scale and scope of a network protocol type from end-to-end. Ethernet defines a type of network but this can also be further classified by Internet Protocol over Ethernet, and then by which version of IP such as IPv4 which stands for Internet Protocol version 4, or IPv6 which stands for Internet Protocol version 6, and other network types. Built on top of Internet Protocol (IP) are protocols such as Transmission Control Protocol (TCP) and User Datagram Protocol (UDP). TCP/IP is more verbose and has a plethora of built-in error checking and handling for reliability of data sent versus UDP which has no stringent error checking combined with a more fluid flow control. This makes UDP more suitable than TCP for the streaming of data such as audio or video casting where a lost packet will not have a dramatically adverse effect on the consumer's experience.

In addition to different protocols and IP versions, built on top of Ethernet, Ethernet itself has different flavors such as Ethernet, Gigabit Ethernet (available in 1 or 10 or 40 or 100 Gigabit) plus other versions of it are expected to be introduced, as line carrying capacity technology improves.

InfiniBand (IB) is an alternative to Ethernet with IB utilizing different physical NIC ports, lines and plugs, and with IB operating in a similar yet different manner to IP.

To connect various computing devices together with the motivating driver for them to be able to talk with or at least pass data to each other, Ethernet is currently the most popular protocol. To connect many nodes into a high performance computing (HPC) environment, InfiniBand (IB) is the preferred choice. IB allows for native remote direct memory access (RDMA) between nodes which bypass the network authentication and elevated process and operating system (O/S) stacks of the host devices where the RDMA storage (or other) devices are connected. This facilitates the hosting of parallel file systems (PFS), providing simultaneous and rapid access for many devices.

To further define scope, each network base protocol such as Ethernet or InfiniBand and the subsequent network protocols running on top of them can be defined as a fabric. At the interconnection point between fabrics, technology such as network address translation (NAT) or equivalent method is necessary for a successful cross connect. One network protocol such as IPv4 may be encapsulated so that its packets run over another protocol such as IB via a "wrapper" protocol such as IP over InfiniBand (IPoIB). If one wanted to connect various distributed nodes of a Parallel File System (PFS) over a network which consists of some non-IB segments such as Ethernet, a wrapper such as RDMA over Converged Ethernet (RoCE) could be utilized.

While RoCE can allow for RDMA access, it is a bit counterproductive because the underlying Ethernet network does not support the true advantages of IB and therefore will present a performance lag compared with RDMA over native IB.

Different types of clients and their users have varied expectations and demands for utilizing the internet today. These expectations also define the quality of service (QoS) requirements for each of these various uses. At the most demanding end of the QoS spectrum are clients & users who require a high quality line characterized by the highest bandwidth at the lowest latency with 100% reliability and availability. Some examples are:

High Performance Computing (HPC)—one of the most demanding situations is HPC where data is huge, distributed across globally disperse locations, and requires 100% lossless transmission at the lowest possible latency. Parallel file systems (PFS) are often utilized with HPC for clients to access central or distributed data stores from both local and distant locations.

Financial Industry—although the traditional communication needs of the financial industry to execute trades utilizes relatively small packets in terms of size, the required bandwidth must be uncongested with the absolute lowest possible latency with 100% reliability. Nanoseconds matter and there can be no loss. Round Trip Time (RTT) is critical because not only does the transaction message have to get through but the confirmation acknowledgement of successful transmission has to be returned as soon as possible.

Mass Media—Live video streams in high definition covering sporting events, news broadcasts, and other purposes require high bandwidth and low latency.

At the other end of the QoS requirements spectrum exist clients & users running applications which can tolerate a certain degree of packet loss and also where latency and/or bandwidth requirements are not mission critical. Some examples are:

Streaming audio—such as internet radio for which bandwidth needs are modest and a little periodic loss will not matter and only present as a momentary bit of static.

RSS text streams—these require very little bandwidth but lossless transmission and in most cases latency is not a materially significant factor.

Data backup (off hours)—requires good enough bandwidth and latency to allow for data to be sent and confirmed but spending extra for premium lines is not justifiable.

Voice calls—where two way audio consumes lower bandwidth, and a bit of loss presents as a momentary bit of static on line.

Email sending/receiving—requires modest bandwidth and "good enough" latency to allow for messages to go through. Higher volume servers and commercial grade messaging need better QoS.

At the lowest QoS requirement demands, bandwidth availability and latency can go up or down but users are tolerant of this fluctuation because they are not willing to pay more money for better service.

At the middle of both extremes are mainstream clients & users who have various levels of QoS expectations and demands. Within the mainstream, there also exists granularity within ranges from low to high levels of expectation. Some examples are:

High end of mainstream—consists of banks, corporations, and various other types of organizations which require WAN connectivity between offices and/or centrally located applications where many distributed "thin clients" connect with a larger central system.

Middle of mainstream—cloud servers in IDC/CDN/etc. which serve consumers and SME clients.

Lower-end of mainstream—budget conscious home users.

In summary, QoS demands often drive which type of network is adopted and budgetary constraints are a factor which influences the standard of quality for the "line" purchased.

Ethernet is a combination of networking technologies and is the most widely used network type deployed from the local area networks within offices, data centers and other clusters of devices to the global backbones across the global internet.

Ethernet became the dominant network type and its widespread use is prevalent both in the LAN and across the broader internet because it was a relatively easy standard to implement and to deploy globally. As more and more devices utilize a protocol or network type, network effects come into play because it makes the decision easier for others to adopt similar technology for compatibility and other reasons.

In the data center, where concentrated computing, storage, processing and other operations spread over various rack-mounted servers, a faster transport than Ethernet was required to back-channel connect these servers together for them to share data.

Fiber channel and Infiniband (IB) are two such technologies offering ultra-low latency and high capacity bandwidth. IB's lossless and parallel transfers offer strong advantages allowing for the use of Remote Direct Memory Access (RDMA) and also offers the opportunity to deploy and utilize globally dispersed parallel file systems (PFS). The limitation of IB was that it was only deployable at a relatively short distance measured in meters. This was then extended to a few kilometers. Until recently, IB "long-distance" links were limited to within a city or between two nearby metro areas connecting data centers to each other via superfast IB over dedicated lines. Technologies now exist which allow IB to be extended over distance and to transit up to 20,000 kilometers between two devices over a dark fiber line. For example, the innovations at the physical layer developed by Bay Microsystems and Obsidian Research offer various advantages such as low latency of IB and the ability for long-distance RDMA via IB over dark fiber between remote regions.

Ethernet Internet from the LAN to Internet to LAN uses TCP/IP, UDP/IP and IPv4, IPv6 addressing protocols. The last mile connectivity refers to linking of a LAN to the network of an ISP via POP to Internet.

Ethernet has a store and forward model where a packet is received, examined and then forwarded only after the payload has been completely received and examined. Latency within a computer/router/network device to handle a packet of Ethernet traffic is approximately 100 microseconds (μs).

Infiniband (IB)—extremely low latency compared with Ethernet. It is also much less verbose than TCP/IP or UDP/IP. It runs on top of Dark Fiber Connections. Compared with Ethernet over Dark Fiber it still is relatively faster and if native IB/RDMA over IB is utilized, latency can be measured as one-way for effective transmission rather than two-way as RTT is for Ethernet. IB bandwidth under load reaches 90 to 96 percent of theoretical BW maximum, approaching true wire speed. IB features cut through switching where it receives the headers of a packet, uses logic for the forwarding decision and pipes the packet payload onward. While IB has traditionally been used within a data center, IB has evolved to break out to become a truly global transport thanks to technologies to extend IB over long distance. These new technologies extent the IB reach over very large distances over dark fiber, up to 20,000 Km.

Remote direct memory access (RDMA) over IB utilizes zero-copy networking where the packet can be directly sent via the IB NIC. This reduces CPU Load and drops latency to 1 microsecond (μs) for a packet.

Parallel File Systems (PFS) offer distributed files and folders across various devices utilizing RDMA and when combined with IB over distance, PFS clusters offer fast file access from remote locations to/from remote file stores at near wire speed.

Reliability is of paramount importance when comparing network types. Main drivers affecting type of network, network protocol, and physical path are time and distance. Latency is a measure of time for data to travel in one direction or for a round trip time (RTT) over a specified distance between two points.

In computing, the main measure of time for networking is milliseconds (ms) and for processing is microseconds (μs) or nanoseconds (ns). The granularity of a tick of time can therefore be measured either as a fraction or as decimals. For example every $1/20^{th}$ or $1/10^{th}$ or $1/100^{th}$ of a millisecond.

TABLE 1 measures of time

| # | Description | Seconds | Milliseconds (ms) | Microseconds (μs) |
|---|---|---|---|---|
| 1 | $1/10^{th}$ of a second | 0.10000 | 100 | 100,000 |
| 2 | $1/20^{th}$ of a second | 0.05000 | 50 | 50,000 |
| 3 | $1/100^{th}$ of a second | 0.01000 | 10 | 10,000 |
| 4 | 10 microseconds | 0.00001 | 0.010 | 10 |
| 5 | 100 microseconds | 0.00010 | 0.100 | 100 |
| 6 | 1,000 microseconds | 0.00100 | 1.000 | 1,000 |

How fine the granularity of a tick can be is determined by the processing power device and other factors. Measurements of latency are typically measured in milliseconds and are influenced by both network type, protocol, distance, network load, congestion, and other factors.

TABLE 2

Fiber line speed taking into account drag of optical fiber latency

| | miles/second in a vacuum | miles/second through fiber | fiber efficiency |
|---|---|---|---|
| Speed of light | 186,282.34 | 126,759.88 | 68.05% |

Table 2 compares the speed of light in a vacuum versus the speed of light inside of the glass core of an optical fiber. This illustrates the physical limitation of fiber efficiency and establishes a baseline for the theoretical best speed that be achieved through fiber. While the Refractive Index of fiber optic cables may vary slightly, an average is assumed as follows: Average of approx. 203 to 204 m/μs vs. speed of light of 299.792 m/μs for an efficiency of 68.05%.

The maximum number of available IPv4 IP Addresses is limited by the 32 bit IP address practical maximum of 4,294,967,296 (two to the power of thirty-two) IPv4 addresses. Of this sum total, there are approximately 588,514,304 reserved addresses, leaving only 3,706,452,992 public addresses available. While Internet Protocol version four (IPv4) is widely deployed, it can be characterized as a victim of its own success because the number of available IPv4 IP Addresses is almost completely exhausted. While technologies such as NATing for devices in a LAN specifically address this issue, the problem remains unsolved and unassigned IPv4 addresses are scarce.

Where the IPv4 addressing system has reached a point of exhaustion with few to zero available IPv4 IP addresses at a time when more and more are needed, IPv6 IP addresses offer a seemingly inexhaustible supply. IPv6 IP Addresses are 128 bits and therefore, the number of available IP Addresses is huge, approximately 340 undecillion or 340,282,366,920,938,463,463,374,607,431,768,211,456 possible IPv6 addresses available. While the number of available IP addresses under IPv6 is virtually unlimited compared with IPv4 address availability, the technology has been slow to be rolled out on a global basis limiting the utility of its deployment.

Many legacy networks are built with devices which are still only able to handle IPv4 addresses, presenting a conundrum. IPv6 has at its core what appears to be an ample supply of available IP addresses, however, IPv6 has not been deployed universally due to a number of factors, one of them being the CAPEX investment sunk into legacy equipment which only handle IPv4 and not both IPv4 and IPv6. Until legacy systems are replaced or upgraded to accommodate both IPv4 and IPv6, the IPv4 address constraint remains.

The Ethernet protocol has relatively high latency, poor efficiency, and low utilization rate over long distance with less than 25% efficiency with respect to line capacity when compared to InfiniBand. Problems are magnified where long distance transmission of data is negatively impacted by the performance flaws of IP based network protocols, and subsequent backwash of bandwidth delay product (BDP) at uneven peering points, and other drawbacks inherent in the native function of the protocols.

Internet connectivity is shared publically over ISP lines and as such is not as reliable as dedicated lines such as MPLS or DDN. Ethernet bandwidth (BW) under load and over long distance drops to a low percentage of the theoretical BW maximum.

There are also well known connectivity issues with respect to peering across multiple network boundaries over distance, across disparate fabrics of networks, and at network edges. These problems and challenges are addressed by a Global Virtual Network and are described in U.S. Prov. Pat. 62/108,987 the contents of which are incorporated by reference.

TCP/IP is verbose and utilizes a store & forward model which requires confirmation. It is prone to congestion slowdowns and bottlenecks through internet hops between non-equivalent segments. The result is higher latency and/or packet loss due to congestion or other factors. When a TCP/IP packet is lost or otherwise not delivered, the sender attempts to resend to ensure delivery. This can put a high demand on hardware resources including RAM and Processor use. The corollary to this is that more hardware is required to push a large amount of traffic (relative to an equivalent amount of traffic which Infiniband could handle) adding to expense and physical space requirements. Further, it leads to higher levels of energy consumption. UDP/IP is one-way and does not require the receiver to send an acknowledgement packet to the sender. This offers a significant speed advantage over TCP/IP, however the tradeoff for this speed gain is that during times of network congestion or other factors which impact reliability, if a packet is lost in transmission, there is no way for either the sender or the receiver to discover this loss.

Infiniband (IB) over dark fiber has advantages but it requires dedicated expensive equipment at both ends of an exclusive point-to-point fiber. In addition to requiring expensive HW edge devices to be installed at each end, the ongoing relatively high cost per month is required for the dark fiber. There is no automatic failover if this line is cut or fails. It is also an IB only network, therefore necessitating costly IB cards to be installed on each device within a network that will utilize this facility. Technical skill is also required both for installation and subsequent ongoing operations. Therefore, integration skill is required to take full advantage of RDMA over IB and this requires investment both in equipment and manpower both upfront and over time.

A significant CAPEX investment is required for the hardware and integration efforts if one were to build a global InfiniBand-only network. For point-to-multipoint topology integration, technical staff are required to set up the architecture and to remain on duty to monitor and maintain it. While the advantages of an IB multi-honed-backbone-to-last-mile are desirable, the upfront expense in hardware endpoint equipment and the high running cost of recurring fees for dark fiber between each point and the point-to-point typology present both a price and technical barrier which only the largest and best funded organizations can surmount.

Today, organizations have flexibility to deploy many types of networks including IPv4, IPv6, InfiniBand, Fiber Channel and other network types, within the LANs and WANs under their direct control. If they wish to have end-to-end network fabrics over distance, current solutions require them to put dedicated lines in place and to invest in middle devices to power these WAN connections.

To summarize, TCP/IP offers reliability at the cost of being verbose and is consequently slower. It requires packets to be sent and for an acknowledgement to return. Accordingly the latency of Round Trip Time (RTT) is measured as the time it takes for a packet to reach its destination AND for an acknowledgment to be returned back to its source. UDP/IP does not require an acknowledgement to be returned. However, UDP isn't tolerant to errors and loss like TCP is. Without flow control UDP is not prone to the same degree of congestion issues as TCP, however it can still suffer from IP protocol inefficiencies. Therefore, if a UDP packet is lost then neither the sender nor the receiver can know. IB has the advantage of ultra-low latency, with parallel transfer but is not widely deployed and requires its own hardware NICs, cables, routers, and other devices to operate. IP and IB are not plug-and-play compatible. To send IP over IB, it has to be encapsulated as IP over InfiniBand (IPoIB) because is not native to the IB protocol. IB has many advantages but it relatively more expensive.

SUMMARY OF THE DISCLOSURE

Systems and methods for connecting devices via a virtual global network across network fabrics using a network tapestry are disclosed. In one embodiment the network system may comprise a first access point server in communication with a first backbone exchange server, a second access point server in communication with a second backbone exchange server, and a network tapestry comprising a first communication path connecting the first and second access point servers and a second communication path connecting the first and second backbone exchange servers.

In one embodiment the first communication path is IP over the Internet. In another embodiment the second communication path is Infiniband over dark fiber.

In other embodiments the network system further includes a first parallel file storage in communication with the first backbone exchange server, a second parallel file storage in communication with the second backbone exchange server, and the first backbone exchange server can directly write to the second parallel file storage using the second communication path without using the first communication path.

In additional embodiments the network system further includes a first firewall in the communication path between the first access point server and the first backbone exchange server and the firewall isolates the first backbone exchange server from threats present on the first communication path. In yet another embodiment the network system further includes a second firewall in the communication path between the second access point server and the second backbone exchange server and the second firewall isolates the second backbone exchange server from threats present on the second communication path.

In another embodiment the network system further includes an end point device in communication with the first access point server and a host server in communication with the second access point server. The communication protocol between the end point device and the host server may be one of InfiniBand, RDMA, IPv4, and IPv6, or other. The communication protocol may encapsulated in a different protocol between the end point device and the first access point server. The communication protocol may encapsulated in a different protocol between the second access point server and the host server. The communication protocol may encapsulated in a different protocol between the first backbone exchange server and the second backbone exchange server.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 1 shows the basic logic of a sequential chained network path.

FIG. 2 shows the topology of multiple link segments with failover.

FIG. 3 illustrates the global node topology for a global virtual network.

FIG. 4 illustrates a framework for defining and describing the characteristics of a network fabric or a segment within that fabric.

FIG. 5 illustrates a global node and performance zones.

FIG. 6 illustrates a global node and performance zones.

FIG. 7 illustrates a simple network topology of a global virtual network arranged in a joined-hub-and-spoke configuration.

FIG. 8 also illustrates a simple network topology of a global virtual network arranged in a joined-hub-and-spoke configuration.

FIG. 9 illustrates hops and network segments in two regions connected by an internet long haul segment.

FIG. 10 illustrates a GVN tunnel between two LANs.

FIG. 11 illustrates the conjoining of various different network segments into an end-to-end path.

FIG. 12 illustrates a potential problem of a bottleneck through a hop between two network segments.

FIG. 13 illustrates an equation to calculate bandwidth delay product (BDP) for a connection segment.

FIG. 14 describes the combining of various network fabrics into an overall network tapestry.

FIG. 15 describes the logic of algorithms which power advanced smart routing (ASR) within a global virtual network (GVN).

FIG. 16 illustrates the total potential Bandwidth with respect to line carrying capacity compared with actual usage.

FIG. 17 illustrates a simple topology of a global virtual network (GVN) consisting of an end point device (EPD) connected to an access point server (SRV_AP) and beyond.

FIG. 18 also illustrates a simple topology of a global virtual network (GVN) consisting of an end point device (EPD) connected to an access point server (SRV_AP) and beyond.

FIG. 19 illustrates the topology of an end point device (EPD) connection to multiple access servers (SRV_AP) via multiple tunnels respectively.

FIG. 20 illustrates a simplified a wide area network (WAN) built by combining the networks of two end point devices (EPD) connected to each other via a global virtual network (GVN).

FIG. 21 illustrates a simple network topology which connects two LANs via a WAN.

FIG. 22 compares the latency of IP versus InfiniBand.

FIG. 23 illustrates a simple topology of a global virtual network (GVN) consisting of an end point device (EPD) connected to an access point server (SRV_AP) and beyond.

FIG. 24 illustrates possible paths that passengers may take through an airport if they walk from check-in to terminal gate area or take a train.

FIG. 25 illustrates possible configurations of the physical back plates for various devices operating in a network like a global virtual network (GVN).

FIG. 26 illustrates two types of network paths through a global virtual network (GVN).

FIG. 27 illustrates four different network pathways between two access point servers (SRV_AP).

FIG. 28 illustrates how multiple end point devices (EPD) can connect with an access point server (SRV_AP) in a region.

FIG. 29 illustrates the logical construction of links between various devices in a global virtual network (GVN).

FIG. 30 also illustrates the logical construction of links between various devices in a global virtual network (GVN).

FIG. 31 illustrates an example topology of devices within a GVN including backbone exchange server (SRV_BBX) topology and an open-jaw API sequence.

FIG. 32 illustrates a series of API calls between GVN devices and an SRV_CNTRL within the GVN.

FIG. 33 illustrates the information flow among devices and the central control server (SRV_CNTRL) in a GVN, FIG. 34 illustrates the positioning of devices into various internet data centers (IDC).

FIG. 35 illustrates three layers of the GVN and how they interact.

FIG. 36 illustrates fabrics of base connections and fabrics within tunnels.

FIG. 37 is a logical visual representation of different network fabrics of a global virtual network (GVN) being woven into a network tapestry.

FIG. 38 illustrates a base connection of Ethernet Fabric at one end with InfiniBand over Fiber in the middle, and either Ethernet or InfiniBand at the other end.

FIG. 39 illustrates two network paths, a base network connection path at layer one of a GVN, and a tunnel at layer three of a GVN.

FIG. 40 illustrates multiple tunnels between devices within a global virtual network (GVN) across multiple regions.

FIG. 41 illustrates the framework for the running of parallel tunnel tests to measure latency, bandwidth, packet loss, and other measurements.

FIG. 42 illustrates an algorithm for running a series of tests in parallel on the connectivity of a path.

FIG. 43 is a diagram used to describe network options.

FIG. 44 is also a diagram used to describe network options.

FIG. 45 is a flowchart of an algorithm used for test running and for remedial action to be taken in the event of a problem being detected.

FIG. 46 illustrates a topology through a global virtual network (GVN) demonstrating the paths from an end point device (EPD) to the internet in the same region.

FIG. 47 illustrates an end to end trans-regional network path.

FIG. 48 illustrates how a GVN is built as a first degree layer over-the-top (OTT[1]) of base network connectivity.

FIG. 49 illustrates one possible topology of a GVN where traffic has more than one option for long haul transport between regions.

FIG. 50 illustrates cross regional traffic pathways between SRV_APs.

FIG. 51 is a flowchart of an algorithm describing how path info is gathered, saved, and utilized to determine the best path for traffic to take through a GVN.

FIG. 52 illustrates how the topology of a global virtual network (GVN) can be leveraged to offer end-to-end native RDMA.

FIG. 53 illustrates how a globally distributed parallel file system (PFS) can allow access to a of three parallel file system (PFS) storage node seamlessly allowing native RDMA access through a GVN Tapestry over the top (OTT) of various non-native network fabrics.

FIG. 54 also illustrates how a globally distributed parallel file system (PFS) can allow access to a of three parallel file system (PFS) storage node seamlessly allowing native RDMA access through a GVN Tapestry over the top (OTT) of various non-native network fabrics.

FIG. 55 illustrates how devices which are connected via a GVN can have direct RDMA access to parallel file system (PFS) devices in various regions.

FIG. 56 illustrates how files are stored, cataloged, found, and accessed in a distributed parallel file system.

FIG. 57 illustrates the operation of global file managers (GFM) on each device in the GVN as well as the operation of a central global file manager (CGFM) on a central control server (SRV_CNTRL).

FIG. 58 illustrates a geographic destination mechanism where modules are distributed across devices such as end point device (EPD), access point server (SRV_AP), central control server (SRV_CNTRL), and backbone exchange servers (SRV_BBX).

FIG. 59 illustrates the geographic destination mechanism within a GVN.

FIG. 60 also illustrates the geographic destination mechanism within a GVN.

FIG. 61 illustrates the bridging of two LANs into a wide area network (WAN).

FIG. 62 illustrates multiple path options for the transfer of files between an end point device (EPD) connected to an access point server (SRV_AP) in one region, and another EPD connected to an access point server (SRV_AP) in another region.

FIG. 63 illustrates the complete isolation of the IBB Path so that internal communications are over a clean and secure path.

FIG. 64 illustrates the topology of a sequential, linear point to point connectivity from Region A to/from Region B via a large distance.

FIG. 65 illustrates the logical organization of physical and virtual interfaces on an end point device (EPD) and their corresponding connectivity to devices beyond the EPD.

FIG. 66 illustrates a conceptual model to describe layers at level one of a global virtual network (GVN) and the layers at level three built upon and integrated with level one.

FIG. 67 illustrates level one of a GVN's IP model compared with the GVN's level three IP model in a stacked, over-the-top organization.

FIG. 68 the base internet layer and a first degree over-the-top layer (OTT[1]) and a second degree over-the-top layer (OTT[2]).

FIG. 69 a system diagram for some example devices in a GVN for harnessing network tapestry.

DETAILED DESCRIPTION

Abbreviations used herein, include:

| Abbreviation | Abbreviation Expanded |
| --- | --- |
| API | Application Programming Interface |
| ASR | Advanced Smart Routing |
| BW | Bandwidth |
| CAPEX | Capital Expenditure |
| CDA | Content Delivery Agent |
| CPA | Content Pulling Agent |
| CPU | Central processing unit |
| DMA | Direct memory access |
| EIP | Egress/Ingress Point |
| EPD | End Point Device |
| Geo-D | Geo-Destination |
| GFM | Global File Manager |
| HFS | Hierarchical File System |
| HPC | High Performance Computing |
| IAB | Internet Society Internet Architecture Board |
| IB | Infiniband |
| IETF | Internet Engineering Task Force |
| IOPS | Input/Output Operations Per Second |
| IoT | Internet of Things |
| IPv4 | Internet Protocol version four (4) |
| IPv6 | Internet Protocol version six (6) |
| ISP | Internet service provider |
| MPLS | Multiprotocol Label Switching |
| NAPIM | Neutral API Mechanism |
| NetTap | Network Tapestry |
| OTT | Over the Top |
| OTT1 | First degree OTT |
| OTT2 | Second degree OTT |
| PEDP | Portable End Point Device |
| PFS | Parallel File Systems |
| RAM | Random access memory |
| RDMA | Remote direct memory access |
| RFB | Remote Fetched Bot |
| SFS | Secure File Storage |
| SNO | Secure Network Optimization |
| SRV_AP | Access Point Server |
| SRV_BBX | Backbone Exchange Server |
| SRV_CNTRL | Central Server |
| Tapestry | Network Tapestry |
| TCP/IP | Transmission Control Protocol/Internet Protocol |
| UDP/IP | User Datagram Protocol/Internet Protocol |
| µs | Microsecond |

A network tapestry is the joining of one or more network fabrics. It is the art of automatically connecting the various fabrics together and integrating them into end-to-end, seamless networks in parallel with each other within or over-the-top (OTT) of layer three of a global virtual network (GVN), which itself is over-the-top of base internet or fiber. This effective joining of fabrics can also be viewed as the combining of various network segments in-the-middle (ITM) of a longer network path. For problems and issues addressed by a Global Virtual Network (GVN) as well as general GVN description and its operations. See U.S. Provisional Patent Application No. 62/089,113.

Local internet connectivity supplied by ISP's is designed for best connectivity within their network. That is why locally hosted and locally CDN'ed sites perform best. They are naturally better because they are closer but they are also on one network under the control of one party or a few parties in the same region with strong peering relationships with no external regional peering edges.

A GVN with wide and broad coverage of SRV_AP's offers an EPD or PEPD with a "local" access point into the GVN, over the top of a client's existing internet connection as supplied via their ISP's connection point, most commonly a point of presence (POP), extending to all points on the global internet. The GVN utilizes over the top (OTT) from LAN's to the nearest SRV_AP and then to a shared high performance network link with aggregation point linking diverse regions separated by great distance and hooked back into the aggregation point at destination. The consumption model offers a low barrier to entry via low cost equipment as well as a pay for use model for the fractional and proportional use of high capacity fiber. The GVN is easy to deploy and operate and can include Advanced Smart Routing (ASR). The end to end network is configured to auto-create connectivity and to make automatic adjustments to changing conditions as needed.

The advantages of a Network Tapestry offered by a GVN are realized through the provision of an end-to-end solution which provides the most efficient, Secure Network Optimization (SNO) services in an automated fashion. The network tapestry is easy to install, easy to configure, and easy to use. The network tapestry results in cost savings because dedicated lines are not required, either a bandwidth model or consumption model may be used, there is a low barrier to entry, and it provides access to advanced connectivity features which would otherwise be unavailable or unaffordable for most clients.

The figures are grouped in the following sections.

Simple network topology: These figures demonstrate simple networks, one with and one without redundancy.

Global network, nodes, and performance related to distance and other factors: These figures show the impact of distance on network and define a performance to proximity ratio.

About a GVN—topology and features: These figures provides a simple introductory description of the hub and spoke topology of devices within a global virtual network (GVN) to demonstrate end-to-end performance enhancement and optimization.

Characteristics of a path—hops, segments, problems at join points of fabrics: These figures demonstrate segments between hops at network devices, peering points, how the GVN is over-the-top (OTT) of a base path, how a typical path consists of segments that each have different specifications, the impact of bandwidth delay product, and other descriptions of network conditions.

GVN overview of example topology and options: These figures show a few example topologies of a GVN and how it can connect various fabrics together, and the subsequent basic routing options offered.

Demonstration of how to set up InfiniBand network as a fabric in the tapestry: These figures describe how to build a simple IB WAN between two LANs. It further demonstrates how an IB over distance fabric can be integrated into a GVN at a physical layer.

Tapestry Topology—Blending of IP over Eth with IB over IP and IB native fabrics into tapestry: These figures describe the logic for the integration of various network fabrics into the GVN, including device connectivity, failover, load-balancing, resources sharing, device-to-device communications and other aspects of integration.

API information exchange between devices for integrated performance: These figures describe the logic for API and other device to device links.

Three Layers of the GVN, and how L3 adapts to conditions at L1 to stretch internal fabric: These figures describe the logical layers of a GVN and how these are managed across various types of network segments to extend an end-to-end network fabric.

ASR at fabric and tapestry scope: These figures demonstrate advanced smart routing (ASR) at both the base connectivity lawyer (GVN L1) and the OTT internal pathway layer (GVN L3). FIG. 47 further describes the logical mapping of different network segment types as known options for traffic to flow over in a GVN.

Tapestry Topology—example—stitched together fabrics/LAN in Cloud as $OTT^2$ over GVN $OTT^1$: These figures demonstrate how an OTT GVN facilitates the option for constructs to be built on top of its internal pathway existing as a second-degree-over-the-top layer ($OTT^2$). These can allow for the $OTT^1$ GVN to handle the routing, QoS, and other optimizations of the base layer, and the $OTT^2$ construct to be utilized as a fabric running through it.

Tapestry Applied—example—file mapping, xfer, availability via PFS devices: These figures demonstrate how an $OTT^2$ layer of the GVN can be utilized as an RDMA fabric to facilitate the use of globally distributed parallel file systems (PFS), from LANs to the cloud and back.

GVN—geographic destination—fast transfer from remote region to local region: These figures describe how the integration of an IB fabric into IP fabrics within a GVN can enhance the operation of the geographic destination mechanism of the GVN.

Tapestry Applied—example—WAN: These figures describe how various fabrics can be weaved together to deliver high performance WAN connectivity between LANs.

Tapestry Logic: These figures describe the logical, physical, and other attributes of a network tapestry.

Systems Diagram—Tapestry: These figures describe the logical structure and organization of GVN network tapestry layers, modules, and elements.

This invention automatically weaves together various network fabrics into a network tapestry. This can be a component of a Global Virtual Network (GVN) which offers an over-the-top (OTT) service to clients in a plug and play manner truly offering low cost hardware and a pay for use service on top of existing internet connections offered by ISPs to clients today.

Simple Network Topology

FIG. 1 shows the basic logic of a sequential chained network path. SRV 1-A connects with SRV 1-B via path 1-P0. SRV 1-B connects with SRV 1-C via path 1-P2. And connections between SRV 1-A and SRV 1-C must pass through SRV 1-B via path segments 1-P0 and 1-P2. There is no direct link between SRV 1-A and SRV 1-C and therefore no redundancy exists if SRV 1-B is down or otherwise unusable. Therefore without redundancy, SRV 1-A has no way to connect with SRV 1-C.

FIG. 2 shows the topology of multiple link segments with failover. This typology describes multiple links between servers for direct connections between each pair, regardless of distance, location or any other factors. Like FIG. 1, there is a sequential chained network path between SRV 2-A and SRV 2-C with a pass through SRV 2-B.

There also is a direct connection segment 2-P4 between SRV 2-A and SRV 2-C therefore this connection does not have to be relayed via an intermediary server SRV 2-B. This offers redundancy and ease of operations. And it offers different routing options from one SRV to another SRV which can be used to compare QoS and speeds and other factors.

Therefore the basic logic of the example connections between SRV 2-A to SRV 2-C with pass-through of SRV 2-B and SRV 2-A to SRV 2-C directly offer redundancy. If one server goes down then the other two can still communicate with each other. If one path goes down, between two of the servers then traffic can pass via two path segments with a server pass through.

Global Network, Nodes, and Performance Related to Distance and Other Factors

FIG. 3 illustrates the global node topology for a global virtual network. This figure shows the backbone connections between a few example Global Nodes and their corresponding service areas in North America, South America, Europe and Asia.

As described in the Legend box at the bottom right, the center of each zone noted herein from a networking perspective is a Global Node. Around each Global Node are two rings which denote the type of connectivity quality zone based on the radius distance from the center of the node. This is for simplification only as many factors determine the size and shape of these zones. However, the two zones can be differentiated from each other as the closest one being a High Performance Zone and the other being an Optimal Service Area.

Global Nodes are connected to each other via long distance high performance network links.

The further a querying client or server or other type of device is from the global node, the higher the latency and at some point the distance is so great that the QoS reduction is such that the device is located in the Optimal Service Area.

Devices which are located outside of the optimal service area are expected to experience a poor QoS.

Geographic areas are indicated for example herein are SJC 3-02 for San Jose, Calif., USA, JFK 3-08 for New York, N.Y., USA, AMS 3-12 for Amsterdam, NL, NRT 3-22 for Tokyo, Japan, HKG 3-28 for Hong Kong, SAR, China, and GIG 3-30 for Rio de Janeiro, Brazil.

There are many other locations around the world within which a global node could be placed which are significant, but for simplicity's sake only a few were indicated for illustrative purposes.

There are also paths indicated between each global node such as path segment 3-P0812 between JFK 3-08 and AMS 3-12. In reality, there are a multitude of path options representing undersea cables, terrestrial cables, and other types of communication lines or links between two points. Those illustrated are meant to simplify the example illustrated. The shorter the distance combined with line speed or wire speed, the lower the latency between the points with the result of faster information transfer.

FIG. 4 illustrates a framework for defining and describing the characteristics of a network fabric or a segment within that fabric. It describes both the device network stack 4-100 as well as the network lines and links to backhaul 4-200.

Within the device 4-100, the physical characteristics 4-110 describe the plug socket, the network plug and cable, the advantages and disadvantages of the physics of the line, the network interface card (NIC) and more. The data link 4-120 describes the nature of the data on the line such as bits per byte, frame size, parameters and other. Network 4-130 describes the protocol, wrappers, nature of packets or frames or other, and other elements. Transport 4-140 describes where flow control, error correction code (ECC) or forward error correction (FEC), algorithms, optional compression, maximum transmission unit (MTU), addressing, peering, identity, security, and other elements may be defined and configured.

Network lines and links to backhaul 4-200 defines the physical attributes and the operational characteristics of the network link from subnetwork 4-210 to the core network 4-220 or backhaul. This can also be called an uplink, a last mile to backhaul, or referred to as various other names. Characteristics which define this lines potential can also be used as benchmarks for measuring performance such as bandwidth (BW), latency, jitter, and other factors.

FIG. 5 illustrates a global node and performance zones. FIG. 5 illustrates a Global Node 5-10 and shows various rings denoting quality of service levels. The High Performance Zone 5-20 has a radius of 5-D00 and indicates the best "last mile" connectivity between clients and the Global Node. The next level of quality is an Optimal Service Area 5-30 and its radius from the center is the sum of 5-D00 plus 5-D02 and it indicates the next level of service. Within the Sub-Optimal Functionality 5-40 ring, the network will still function but sub-optimally compared with closer zones. The Radius 5-D10 indicates the distance at immediate proximity to the Global Node 5-10, such as colocation within the same data center.

FIG. 6 also illustrates a global node and performance zones. This example embodiment is based on FIG. 5 and is a simpler representation of global node and performance zones. 6-20 corresponds to 5-20, 6-30 corresponds to 5-30, and 6-40 corresponds to 5-40. There is a fifth ring 6-50 included herein where the network may or may not function when connected to the center 6-10.

QoS based on distance and quality of lines from center point of origin to various devices. Latency and bandwidth problems are more prevalent and significant the further the destination is from origin. Quantifying these distances and understanding a client device's relative distance provides understanding for expected QoS.

About a GVN—Topology and Features

FIG. 7 illustrates a simple network topology of a global virtual network arranged in a joined-hub-and-spoke configuration.

There are two illustrated hub & spoke clusters described one in each of two regions, region A RGN-A 7-000 and region B RGN-B 7-020. Each hub demonstrates end point devices (EPD) such as 7-102 to 7-112 in RGN-A 7-000 and EPD 7-122 to 7-132 in RGN-B 7-020 which can connect to access point servers (SRV_AP) such as 7-302, 7-306, or 7-308 in RGN-A 7-000 and SRV_AP 7-322, 7-326, or 7-328. End point devices (EPD) 7-302 through 7-132 will connect with one or more multiple SRV_AP servers through one or more multiple concurrent tunnels.

SRV_APs in each region are connected to a local, corresponding backbone exchange server (SRV_BBX) 7-500 in RGN-A 7-000 and 7-520 in RGN-B 7-020. The connection path 7-P510 between SRV_BBX 7-500 and 7-520 is via fast backbone connection over fiber or other network segment. Linked SRV_BBX devices provide global connectivity. SRV_BBX may be one or more load-balanced high performance servers in a region serving as global links.

FIG. 8 also 7 illustrates a simple network topology of a global virtual network arranged in a joined-hub-and-spoke configuration.

This example embodiment is based on FIG. 7 and is equivalent to it with the addition of multiple egress-ingress points (EIP) 8-400, 8-410, 8-420, and 8-430 in each region as added spokes to the hub and spoke topology model, with paths to and from the open internet.

Not illustrated in this example embodiment are central, control server (SRV_CNTRL) servers which can service all of the devices within that region and the SRV_CNTRL may be one or more multiple master servers.

This topology can offer EPD to EIP in remote region route through GVN. Or an EIP in the same region. Or EPD to EPD in same region or EPD to an EPD in another region, or many other possibilities. These connections are secured and optimized through the GVN.

This topology offers an over-the-top (OTT) GVN layer from various networks into aggregation point for traffic to flow via a unified network tapestry over various network fabrics.

Characteristics of a Path—Hops, Segments, Problems at Join Points of Fabrics

FIG. 9 illustrates hops and network segments in two regions connected by an internet long haul segment. This figure is a visual demonstration of hops 9-H010, 9-H020, 9-H030, and 9-H040, plus segments between hops 9-P1000, 9-P1020, 9-P3040, 9-P4000 in two regions connected by either an internet long-haul network segment 9-2030 or a chain of segments between regional hops. Path P2030 represents many hops along the internet over a long distance—this figure is not drawn to scale. Each of these segments may have different specifications and may be considered to be individual fabrics if different from adjoining segments.

FIG. 10 illustrates a GVN tunnel between two LANs. The various described elements in this figure are:

| 1 | D | Device |
| 2 | B | Boundary |
| 3 | P | Path |
| 4 | ISP | Internet service provider |
| 5 | TH | Hop inside tunnel |
| 6 | EH | External hop |
| 7 | BP | Base path |
| 8 | PP | Peering point |

For example, 10-TH02 on EPD0 10-D0 is an internal hop inside of the tunnel between LANs and is also a path within the L3 of the GVN between LAN0 10-TH00 and LAN2 10-TH10.

The path consisting of segments from 10-EH00 to 10-EH32 is at GVN L1 the base path of the network. This figure demonstrates a global virtual network tunnel GVN Tunnel from LAN 10-TH00 to EPD-0 10-00 to SRV_AP AP-0 10-D4 to SRV_AP AP-2 10-D6 to EPD-2 10-D2 to LAN2 10-TH10 illustrating peering points between ISPs and network edges.

EDGE-00 10-B0 is the demarcation point for network access connection between the devices of LAN0 10-TH00 and ISP-0 10-FAB0.

PP-00 is the point where peering occurs between the networks of ISP-0 and ISP-2. PP-02 is the peering point between the networks of ISP-2 and ISP-4.

EDGE-2 10-B2 is the demarcation point for network access connection between devices of LAN-2 10-TH10 and the network of ISP-4.

Some advantages can be realized by placing SRV_AP-0 10-D4 at PP-00 10-B4 so that this SRV_AP directly can peer with both ISP-0 and ISP-2. More advantages can be realized by placing SRV_AP-2 at PP-2 so that this SRV_AP can directly peer with both ISP-2 and ISP-4. If the network of ISP-2 is not ideal, it is possible for traffic to be alternatively routed around ISP-2 by the GVN through another route or line or ISP or carrier.

The internal hop count through the neutral Third Layer of the GVN is six hops from LAN to LAN.

The distance between ISPs is not to scale. Furthermore, it is likely that there could be more hops within the network of an ISP but for simplicity sake, the quantity illustrated has been simplified.

The hops through the internet are from 10-EH00 through 10-EH32 and the hop count is seventeen hops.

While this figure illustrates the joining of tunnels at AP hops, this is viewed as a single tunnel by client devices within the path between LAN1 and LAN2. This singular tunnel represents the neutral Third Layer of the GVN within which it is possible to run all traffic that would normally transit over the internet, including TCP, UDP, and other protocols, plus other tunnels such as IPSec, OpenVPN, PPTP, or other. There are other advantages realized by the Third Layer of the GVN. Some include lower TTL and ability to have more control over routing plus other advantages.

FIG. 11 illustrates the conjoining of various different network segments into an end-to-end path. Elements described in this figure include:

| 1 | BW | Bandwidth |
| 2 | CP | Communications path |

From Client 11-000 to Server 11-300, the traffic transits via a local area network (LAN) 11-010 to an end point device (EPD) 11-100 to an internet service provider's (ISP) 11-200 network to a backbone 11-220 to internet 11-250 in a remote region to an internet data center's (IDC) point of presence (POP) 11-320 into the IDC's internal network 11-310 and then to the server 11-200.

As shown by this example, it is important to understand the characteristics of each segment and how that segment impacts the traffic flow with respect to the complete end-to-end pathway. An internal network or LAN 11-N100 will typically have a reasonable amount of bandwidth (BW) for internal use such as BW 11-B100 which is 10 GigE in size. The bandwidth for an ISP's network 11-N202 will also typically be fairly large as exemplified by BW 11-B202 of 40 GigE. Between those two networks, a last mile connection 11-N200 between the client location and the ISP is a relatively small 11-B200 BW of 100 Mbps. There are numerous drivers behind this but the main one is cost. An ISP will bring a pipe to a neighborhood with a bandwidth of a certain size and then will usually share this amount with many different users to each of their last mile connections. These upstream paths are the beginning segments towards the broader and wider general internet.

A backbone 11-N220 connects ISPs to each other, regions to regions, and more and backbones offer very deep and high bandwidth connectivity such as 11-B220 of 100 GigE. This could represent the carrying capacity of a strand of fiber between two points, and/or the size of the switch's capacity rating or other factors.

The internet 11-N250 in this figure is represented by dual pipes of BW 11-B250 and 11-B252 each at 40 GigE. This is an example of a multi-honed connectivity in an internet. There may be many other large pipes at the core of an internet connected together.

ISP peering 11-N320 between the internet 11-N250 and an IDC network 11-N310 is represented again by multi-honed connectivity BW of 10 GigE each for 11-B320, 11-B322, and 11-B328. This represents dedicated last mile for that data center. There may be many more communication links for an IDC.

The internal IDC network 11-N310 will typically have very high BW 11-B310 distributed amongst various internal networks which each is rated to a certain speed such as 100 GigE. The notation 2*100 GigE represents that this is a network two times 100 GigE BW.

FIG. 12 illustrates a potential problem of a bottleneck through a hop 12-300 between two network segments 12-100 and 12-500. For example, during the serving 12-900 of a file from a server to a client, certain algorithms govern the bandwidth of the transfer based on the end-to-end line carrying capacity. Should the burst of traffic be too high causing loss due to congestion the server throttles back on the bandwidth to enable the most efficient transfer while mitigating loss. This may result in the server being a good and responsible citizen with respect to pipe use but this can also result in an overly aggressive governing of bandwidth significantly slowing the transfer well below the actual end-to-end line carrying capacity.

When a server begins to serve a stream of data or a file, it will blast many packets per second based on what it assumes to be the high bandwidth 11-BW220 of a network segment such as 11-N220. The server is connected to this large pipe network segment.

If the data stream is constricted at 12-300, the loss forces the server to aggressively throttle down the stream slowing transfer, and due to the need to retransmit the lost packets, the server may reduce rate of transfer overly aggressively slowing down the total process.

FIG. 13 illustrates an equation to calculate bandwidth delay product (BDP) for a connection segment or path taking into account various connectivity attributes. Bandwidth 13-000 is in megabits per second (Mbps), Granularity 13-002 is in seconds, Bytes 13-020 over Bits 13-022 for this example is eight bit so ⅛ and latency is a measure of RTT (round-trip-time).

The significance of BDP is that it provides a certainty in the measure of how much data can be transferred down a line from when a server starts blasting the data, and it hits a bottleneck, until when the receiving device recognizes loss and sends acknowledgement packets back to the sending server.

GVN Overview of Example Topology and Options

FIG. 14 describes the combining of various network fabrics into an overall network tapestry and specifically indicates the placement of various connecting paths joining various perimeter locations. This embodiment illustrates that various types of network fabrics can be combined into a greater network tapestry. These fabrics can be seamlessly woven together as described in U.S. Provisional Patent Application No. 62/174,394 into the topology of a global virtual network (GVN), its various devices, communications paths, and other embodiments. It demonstrates how various geographic regions or zones or territory are linked together over various types of paths.

LAN zone zero 14-ZL00 describes a typical local area network (LAN) including the placement of firewalls with respect to an end point device (EPD) 14-100 between the LAN and the external network GVN OTT 14-202 and Internet 14-30. There is a hardware FW 14-40 between LAN 14-04 and EPD 14-100. Another HW or SW FW 14-42 is between the EPD 14-100 and the egress ingress point (EIP) 14-20 to protect from external threats emanating from Internet 14-30.

LAN zone one 14-ZL10 is similar in topology to LAN zone zero 14-ZL00 with the exception that there is no FW placed between EPD 14-110 and LAN 14-46. Internet zone zero 14-ZI00 describes an example internet topology in a region in close proximity to 14-ZL00. Internet zone one 14-ZI10 describes an example internet topology in a region in close proximity to 14-ZL10. Internet zone two 14-ZI20 describes an example internet topology in a region in close proximity to 14-ZD20. Internet zone three 14-ZI30 describes an example internet topology in a region in close proximity to 14-ZD30.

Internet data center zone two 14-ZD20 describes the topology and placement of cloud based firewalls CFW 14-46 including virtualized FW devices behind cloud FW load balancers. Internet data center zone three 14-ZD30 describes the topology and placement of cloud based firewalls CFW 14-48 including virtualized FW devices behind cloud FW load balancers. SRV_BBX 14-72 in region or zone 14-ZD20 can be connected to SRV_BBX 14-80 in other region or zone 14-ZD30 via a dark fiber connection 14-P220 over dark fiber 14-220.

SRV_BBX 14-72 uses this invention to directly write a file to parallel file storage PFS 14-82 via remote direct memory access (RDMA) over 14-P220 bypassing the stack of SRV_BBX 14-80 via path 14-P82.

SRV_BBX 14-80 uses this invention to directly write a file to parallel file storage PFS 14-74 via remote direct memory access (RDMA) over 14-P220 bypassing the stack of SRV_BBX 14-72 via path 14-P74.

Path 14-P210 can be IPv4 or some kind of standardized internet protocol over which traffic flows from SRV_AP 14-300 to and or from SRV_AP 14-310 via path 14-P210 over-the-top of the GVN via a tunnel or other type of communication path.

While the topology described herein does not have FW or traffic monitoring devices within GVN pathways, these devices could be placed on an as needed basis to further secure the flow of data.

FIG. 15 describes the logic of algorithms which power advanced smart routing (ASR) within a global virtual network (GVN). The first main process is to Identify target region 15-100 with its corresponding sub-processes identify region 15-110 and identify potential EIPs to use 15-120. This sets up the subsequent processes to hone in on the target egress ingress point (EIP) to utilize.

The next main process plot route options (ASR) 15-200 utilizes sub processes server availability list 15-210 and routes list ranked 15-220 to determine the most optimal server(s) with which to build tunnels if they do not exist.

The next main process examines network segments 15-300 and utilizes sub processes measure segments 15-310 and network statistics per path 15-320 to evaluate the viability of a path to be used to send the type of traffic required. For example for very small sized data which requires the fastest path, then the shortest distance and lowest latency are of most importance and low bandwidth may be tolerated. Conversely for huge sized data which is not time sensitive in terms of delivery of the first bit, the path offering the highest bandwidth is optimal because although first bit delivery is slower than the other path, last bit arrival is expected to happen sooner due to the higher bandwidth.

The next main process check route status 15-600 and its sub processes compare routes 15-610 and test: is total path complete 15-620 ensure the deliverability of data down that path. The last main process plot best route for traffic 15-700 and its sub processes sub-algorithm: which is best path? 15-710 and is this path best for traffic type? 15-720 are used to determine and set the best route end-to-end.

Each main process and sub process are utilized to ensure that each type of traffic is carried most optimally by the tunnel best suited for that traffic type.

FIG. 16 illustrates the total potential Bandwidth with respect to line carrying capacity compared with actual usage. Based on an example office location when the majority of work gets done by the majority of the workers during business hours, Monday to Friday with a direct correlation on BW consumption. Peaks and valleys illustrated are an example to indicate a cycle during each day. Real work usage will be similar but also unique for each use case.

On this graph, the left or vertical axis is for bandwidth in percentages. It goes from 0% to 120%. The bottom or horizontal axis represents the twenty four hours of time each day, for the seven days of the week.

This example demonstrates that weekdays have a higher BW use profile than weekends and so could be an office open on weekdays only. Other use cases will have their own cyclical profile. Some may use all bandwidth all of the time while others will have times of heavy BW use and other times of lower BW use.

The key point is that fixed, dedicated lines are expensive and may be underutilized for large amounts of time. An OTT service utilizing a less expensive line providing similar quality to a dedicated line is more reasonable and cost effective. Furthermore, an OTT service based on consumption of data traffic rather than bandwidth capacity might be the fairest approach.

It is assumed that for a service offering bandwidth of a certain potential is 100% of carrying capacity for 24 hours each and every day of the week/month. The average cost per GB of traffic is low if the line is in use all of the time at full potential. Factoring CAPEX on equipment, plus running costs for maintenance, IT staff costs, dedicated own dark fiber can be expensive. If an organization only pays for the BW capacity that that organization can afford—it may be shaped cutting peaks and causing times of constriction limiting use.

By offering a service based on the ACTUAL USE of a LINE, full line carrying capacity is utilized when needed, and consumption based usage ensures that the client only pays for what they use.

FIG. 17 illustrates a simple topology of a global virtual network (GVN) consisting of an end point device (EPD) 17-100 connected to an access point server (SRV_AP) 17-300 and beyond. The last mile is from the network edge where the EPD 17-100 is located to the internet service provider's point of presence (POP) which will link to the internet and to an optimal connection to an SRV_AP 17-300. A secure tunnel is built over the top (OTT) of this last-mile to internet connection between EPD 17-100 and SRV_AP 17-300.

The quality of service (QoS) 17-102 of both the base internet path and of the connectivity through the tunnel can be constantly tested, analyzed, adjusted, to various conditions. The base connection can be optimized and the EPD can make multiple connections to one or more SRV_APs and can use multiple IP addresses and ports. Where an IPv4 internet base path between EPD and SRV_AP may be congested, an IPv6 alternative path may be a better option. Or a different route through either protocol may be able to route around problems.

From the SRV_AP 17-300, there can be connections to other regions, or bridges to other protocols or other such options. For example, the tunnel's internal path 17-P100 can be IPv6 which is encapsulated over the base IPv4 network path 17-P100. Past the SRV_AP 17-300, path 17-P110 may be IPv4 and so IPv6 tunnel content will still have to be encapsulated to run over IPv4 for transport to SRV_AP 17-110. However, path 17-112 may be native IPv6 meaning that there is no need to encapsulate IPv6 over IPv6.

Any protocol which can be encapsulated or otherwise "carried" can be run through the GVN over virtually any other protocol or fabric.

The results of the constant testing are stored and mapped to be compared with other options through that fabric as well as to understand the peering or stitching characteristics of fabrics into a tapestry.

FIG. 18 also illustrates a simple topology of a global virtual network (GVN) consisting of an end point device (EPD) connected to an access point server (SRV_AP) and beyond. This figure is similar to FIG. 17 with more elements added such as local area network (LAN) 18-000, egress ingress point (EIP) 18-302, points of presence (POP) 18-012 18-022, IPv4 Cloud 18-010, and IPv6 Cloud 18-020.

The LAN 18-000 is both IPv4 and IPv6 as are the base segments 18-P800. The remote internet segments are either IPv4 only 18-P804 or IPv6 only 18-P806.

The key point is that for traffic entering into the GVN as in ingress into EIP 18-302, it can enter as one or the other of IPv4 or IPv6 and each is connected to their corresponding fabric through the GVN and will egress in the LAN 18-000. Address translation and mapping are critical elements at peering points.

FIG. 19 illustrates the topology of an end point device (EPD) 19-100 connection to multiple access servers (SRV_AP) 19-300 and 19-302 via multiple tunnels 19-P300 and 19-P302 respectively. Base fabric of local area network (LAN) 19-110 is stitched to the base fabric of 19-200. The Tapestry 19-500 is a stitching together of fabrics enabled by a cluster of devices working together as constituent parts of the GVN.

The tunnels between EPD 19-100 and SRV_AP 19-300 and SRV_AP 19-302 are TUN 100-300 and TUN 100-302. They are an example of multiple tunnel options between EPD and best current access point server (SRV_AP) based on Server Availability and other factors such as, Destination, Type of Traffic, QoS of various base network segments between origin and destination.

Tapestry 19-500 allows for protocols to be carrying which can be "run through" various GVN paths to egress and/or ingress at egress ingress points (EIP) of the GVN.

The Cluster of GVN Devices 19-600 represents the various GVN devices operating at the physical layer combined into offering route options through GVN.

GVN Global Network OTT Internet via other Links 19-700 is the GVN Layer 2 logic with modules such as Geographic Destination, DNS services, Advanced Smart Routing (ASR), Global ASR (GASR), Server Availability, Tunnel Builder Module, Testers, Analyzers, Etc.

GVN 19-800 can be described as a construct and is what the client user sees with respect to available network paths to various EIP points at various locations through the GVN utilizing various protocols.

FIG. 20 illustrates a simplified a wide area network (WAN) built by combining the networks of two end point devices (EPD) connected to each other via a global virtual network (GVN). This figure shows a wide area network (WAN) built by combining the networks of two end point devices (EPD) 20-100 and 20-150 connected to each other via a global virtual network (GVN) 20-300 via tunnels TUN0 20-PT0 and TUN2 20-PT2 into the GVN. Not illustrated here but assumed are that at least one or more access point servers (SRV_AP) are at the other end of each of these tunnels and that there also may be more intermediary segments in the GVN network path.

The tunnels TUN0 20-PT0 and TUN2 20-PT2 are over the top (OTT) of a base network link. This base network link can be one or more of many protocols.

This figure further demonstrates that there can be various different protocols operating as fabrics concurrently on the LAN side of both EPDs, such as internet protocol (IP) over Ethernet 20-112 and 20-162, InfiniBand 20-118 and 20-168, or another network protocol 20-116 and 20-166. These can run in parallel over bridges through the GVN and also can be stitched together into a tapestry.

Any protocol can flow through the GVN end to end regardless of the various underlying fabrics of network protocols in the chain of various intermediary segments. For example in FIG. 30, IB over distance via path 30-P106 to 30-P116 allows for remote direct memory access (RDMA) to access a parallel file system (PFS) with plug and play functionality. Furthermore, another option is route via 30-P308 to other regions.

There are various possibilities with one-to-one matches, or one to another type, or one to many, or many to one, or other. From the EPD's perspective 20-100 or EPD 20-110, the end-to-end network attributes inside the tunnel are perfect for the network type between the LAN's on either end.

The global virtual network's (GVN's) tapestry over top various fabrics forms a seamless WAN circuit between them.

FIG. 25 demonstrates the various back-plates on different devices. To physically tie the different network fabrics in the LAN, the EPD has ETH0 for internet connectivity, and three ETH ports for LANs, plus one IB port for LAN.

How to Set Up an InfiniBand Over Distance Network as a Fabric in the Tapestry FIG. 21 illustrates a simple network topology which connects two LANs via a WAN 21-102 over distance which may utilize native InfiniBand (IB) or another high performance network end-to-end.

IB Dev A 21-200 could represent an end point device (EPD) for example EPD A as an enabling device between LAN 21-300 and a broader network. IB Dev B 21-202 could represent and end point device (EPD) for example EPD B as an enabling device for another LAN 21-302. The segment Dark Fiber C 21-100 can be a switched dedicated circuit, strand of dark fiber, dedicated line, or physical network medium.

This kind of point-to-point connectivity over dark fiber requires expensive devices at each end running on top of expensive, required Dark Fiber which needs to be installed at the locations at both ends.

IB over very long distance is made possible and is reliable because of hardware solutions from companies like Bay Microsystems or Obsidian networks.

IB over long distance is better than IP for improved global transport because it offers low latency, high bandwidth transmission.

FIG. 22 compares the latency of IP versus IB, and drills down to examine the time taken with respect to resources use and consumption. It further makes the comparison between the two fabrics and underlying protocols over short, medium and long distances.

HW is the time required for the hardware to process the network operation(s). This includes the time taken by the CPU, RAM, NIC and other components:

HW=CPU+RAM+NIC+Other components where CPU=time required for the CPU to process the network operation(s). The bulk of time is for the CPU to process the network operation(s), but NIC and RAM do add some drag thereby increasing processing time.

In addition to the hardware time, the time required for network operation(s) also includes the time spent by the Operating System (OS), the drivers for the hardware, and the software stack including any applications. The total systems time (SYS) is:

SYS=APP|Software Stack|O/S+drivers for HW|HW

For example, in a GVN use case such as utilization of geographic destination mechanism, although IB is faster than Ethernet, over a short distance it not be worth it to combine files into a single clump by CPA/RFB, then communicate the list of files via side channel API communications, transfer the clump via chained cache and then un-clump back into individual files at the CDA in the EPD. This is because of the time that it takes to do this. However, over a medium to larger distance, the latency reduction is significant enough to warrant the extra effort to pull, cache, clump, transfer from the source region to the destination region, communicate the list of files in a clump, un-clump and serve the separate files at destination.

This analysis includes both the clump/un-clump and messaging functions of this action set/sequence. The time for CPU processing, RAM consumption, internal copy between RAM→SYS→NIC is also reduced when IB is utilized vs ETH because IB is zero-copy with direct pass of packets by application to/from the NIC.

Total time for transfer=CPU+RAM↔SYS↔NIC+ Network Latency (RTT)

Algorithm(s) are utilized for evaluating best times with respect to benchmarks and also with a programmable threshold to dictate when it is efficient to use ETH or more efficient to use IB.

In summary being not just aware but acutely cognizant of various elements which add to latency in consideration of protocol use allows for algorithmic analysis to analyze features, in other cases to predict expected latency or other conditions.

FIG. 23 illustrates a simple topology of a global virtual network (GVN) consisting of an end point device (EPD) connected to an access point server (SRV_AP) and beyond. This figure continues to describe the most basic topology of a GVN and expands upon the EPD connecting to an SRV_AP as described in FIG. 17.

It further demonstrates an added element into the GVN network path of backbone exchange servers (SRV_BBX) in the middle. The two BBX servers are connected to each other by path over an internet back bone (IBB) 23-800. This path can be IP, or IB.

FIG. 24 illustrates possible paths that passengers may take through an airport if they walk from check-in 24-000 to terminal gate area 24-900 or if they take a train. They both start at 24-010 and may travel along paths DA to DF and they may either head directly to 24-100 or may meander. They can make a decision of taking a train at 24-100. If they do so, via path Yes 24-P200, they board train at 24-200 and it takes them directly and at high speed via path 24-P300 to 24-300 where they disembark via path 24-P320. From there, they enter the walking path again at DW and head via other path hops DX, DY, DZ to the boarding area at 24-090. Those that choose to walk via path No 24-090 will begin walking at DG and will most likely meander as they walk between various other hop points in their path until they too reach end 24-090. While embarkation and disembarkation of the train may add a bit of extra time, this is more than made up for by the speedy nature of conveyance of the train. Those that take the train also experience less fatigue and potential stress than walkers experience.

The path from planes 24-900 to terminal exit 24-000 begins at start 24-910 and again offers choice of riding the train or walking with similar performance and time advantages for those that opt to take the train. This is an analogy of the decision of whether or not to use Slinghop between long-distance points or to have packets travel along extended internet paths.

Boarding a train and disembarking take some time and effort. Trains operate on a fixed or variable schedule and all occupants of a train ride together from fixed point A to fixed point B. Where walkers on the adjoining paths never stop moving.

The efficiency of a train to convey passengers is faster and more direct. People walking may take indirect paths and potentially get delayed or lost. The train gets them there via same known assured-delivery path.

FIG. 25 illustrates possible configurations of the physical back plates (in front of a backplane) for various devices operating in a network like a global virtual network (GVN). These back plates utilize two types of network fabric physical plugs, Ethernet and InfiniBand and it also denotes a few possible roles that those plugs can take. There may be more or less or different types of plugs depending on use and these are provided as an example only.

The illustration of an end point device's (EPD) 25-100 back plate noting four RJ45 Ethernet ports, ETH0 25-110 operating as a WAN, and three LAN ports ETH1 25-112, ETH2 25-114, ETH3 25-116. WAN port 25-110 is the plug for the cable connection to the base internet connectivity via path 25-P100. The one InfiniBand (IB) socket IB0 25-120 is for IB cables to connect via path 25-P122 to an IB switch in the LAN 25-126 and also could connect to a parallel file system (PFS) device 25-128 or other devices.

This example embodiment further demonstrates back plates for access point server (SRV_AP) 25-300, a sling node (SRV_SLN) 25-550, and a backbone exchange server (SRV_BBX) 25-500. It also illustrations the connective pathways between devices, and also from the devices to various clouds to other devices, such as a remote SRV_SLN 25-558 and a remote SRV_BBX 25-552.

The GVN connectivity from EPD 25-100 to SRV_BBX 25-500 via SRV_AP 25-300 is OTT the ISP Last Mile connection path 25-P000 through the internet 25-000, and OTT the LAN 25-032 in the internet data center (IDC) path 25-302.

These physical ports, back plates (in front of backplanes), connection paths, and other elements described herein are for example only. The absence of IB ports on the SRV_AP 25-300 is illustrated to act as an "air gap" between end to end base protocols, where IB could be encapsulated over Ethernet for end to end IB for clients in the LAN of the EPD 25-100 such as LAN 25-016. However, SRV_APs may also have IB ports if there is native IB connectivity between them and EPDs or other devices and if the need arises.

FIG. 26 illustrates two types of network paths through a global virtual network (GVN) namely an end-to-end internet protocol (IP) over Ethernet path and a blended path of IP at either end and an InfiniBand (IB) backbone path in the middle.

Both of these paths have a local IP section of segments Internet 26-000 and 26-012. The latency, bandwidth and other characteristic of these local sections 26-000 and 26-012 are equivalent for both of these paths. The middle segments of the IP path are 26-P028 through 26-P056 and the latency for this path section is measured by 26-260.

The slingshot mechanism has a transfer advantage over section 26-420, however there is an amount of time added at both ends of the slingshot at stages 26-400 and 26-440. In analyzing which is the better path, the net latency for the IB slingshot path 26-260 must be directly compared against IP path 6-200.

Tapestry Topology—Blend of IP Over ETH with IB Over IP and IB Native Fabrics into Tapestry FIG. 27 illustrates four different network pathways between two access point servers (SRV_AP) 25-200 and 25-202.

There are two IP over Ethernet paths demonstrated, 27-P420 to 25-P436 which is IPv4 end-to-end, and 27-P420 to 27-P626 to 27-P636 which is a blend of IPv4 and IPv6 segments.

Another described base connectivity described is from SRV_AP 27-200 to backbone exchange server (SRV_BBX) 27-500 which uses a network slingshot to convey data to a remote SRV_BBX 27-510 to SRV_AP 27-202 with return traffic utilizing reciprocal slingshot mechanism, both over fiber back bone.

The TUN 27-222 is a constructed over-the-top (OTT) tunnel pathway over the base of either of these three connectivity paths. Algorithmic analysis can be applied to choose which transport type over which path is most optimal. This figure does not describe the EPD or other device which connect to the SRV_AP but they can be operating therein.

FIG. 28 illustrates how multiple end point devices (EPD) can connect with an access point server (SRV_AP) in a region. Two regions are illustrated herein. An egress ingress point (EIP) to a pop of presence (POP) 28-004 and 28-024 to interact with various destination servers (could also be devices) in each region via the local internets 28-002 and 28-022 there.

There are two types of cross regional connection path types through the GVN illustrated herein. OTT 28-600 to OTT 28-650 to OTT 28-610 which is end to end over the top of internet protocol.

The alternative path is OTT 28-600 to IBB 28-800 to OTT 28-610, where the IBB portion is a non-OTT path, possibly IB between two backbone exchange servers (SRV_BBX) 28-500 and 28-520.

FIG. 29 illustrates the logical construction of links between various devices in a global virtual network (GVN).

It describes backbone exchange server(s) SRV_BBX 29-500 and 29-502 each of which acts as a hub for the region it serves. The SRV_BBX servers 29-500 and 29-502 are connected to each other over backbone path 29-P500 which could be high performance IP over Ethernet or InfiniBand (IB) or other such technology.

Each SRV_BBX "hub" serves various access point servers (SRV_AP). Each end point device (EPD) connects with various (one or more) SRV_AP servers simultaneously so that there is redundancy and that routing options exist for traffic to move via the best connectivity from moment to moment.

Connection paths indicated can be tunnels over the top (OTT) of the IP Ethernet Internet, or tunnels over Ethernet direct links, or IB over Fiber, or IB over Ethernet (RoCE), or other type of connectivity.

Placement of SRV_BBX and SRV_AP devices are based expected demand from client's locations, locate in best IDC with respect to pipes, interconnects to serve a target region while connecting global locations.

Devices also connect to a central, control server (SRV_CNTRL) 29-200 via paths such as 29-EP112 to EPD 25-112 or path 29-P218 to SRV_AP 29-318, etc. Having these paths allow for devices to connect with SRV_CNTRL via API or alternative traffic path for information conveyance.

FIG. 30 also illustrates the logical construction of links between various devices in a global virtual network (GVN). This figure continues from FIG. 29 in describing the connectivity within a global virtual network (GVN) of various devices, with a focus on end point devices (EPD) 30-100 30-110 to access point server (SRV_AP) 30-300.

In some respects it simplifies the picture presented in FIG. 29 with some added elements such as multiple connection paths from each device to either other devices or to clouds or combinations such as a tunnel (TUN) 30-T00 or 30-T02 over-the-top (OTT) a GVN cloud 30-200.

A GVN and its component parts offer a service to improve and secure client connectivity. Multiple "local" presences in multiple locations simultaneously, automated systems that are controllable and configurable, providing optimized connectivity realizing a cost savings with the benefits of being an MPLS substitute and providing extended high performance connectivity such as remote direct memory access (RDMA), security and privacy via encrypted tunnels, and other benefits.

A huge benefit is the ability to connect various network fabric types, such as IB in the LAN 30-108 of an EPD 30-100 with the IB LAN 30-118 of EPD 30-110 that from the client's perspective is IB end-to-end even though some base segments in the middle are not native IB but rather IP. This is achieved through either encapsulation of IB over IP, or by routing through another IB native line, or other method.

The key point is that a GVN allows for various network fabrics to operate over-the-top (OTT) of various other network fabrics at a base layer. The overall effect is the weaving together of various fabrics into a network tapestry, enabled and optimized for best performance at the highest security by the GVN.

API Information Exchange Between Devices for Integrated Performance

FIG. 31 is a diagram illustrating an example topology of devices within a GVN including backbone exchange server (SRV_BBX) topology with security and an open-jaw API sequence, in accordance with an embodiment of the present disclosure. This example embodiment illustrates a series of API calls in a sequence within an example topology of devices within a typical global virtual network.

The first API call's request 31-A2 from an access point server SRV_AP 31-300 to a central, control server SRV_CNTRL 31-200 is received, parsed and processed by SRV_CNTRL 31-200. It then triggers three more API calls all initiated by the SRV_CNTRL 31-200. Depending on the nature of the communications, these may be in sequence or can be simultaneously processed in parallel. These three additional calls of request 31-A4 to a backbone exchange server SRV_BBX 31-800 and response back 31-A6, 31-A8 request to another SRV_BBX 31-810 and its response 31-A10, and finally the third additional API call of request 31-A12 to SRV_AP 31-302 and its response 31-A14 back to SRV_CNTRL 31-200. When all three of these "internal" calls are completed, the final response 31-A16 is returned back to SRV_AP 31-300, the device which initiated the first request of 31-A2.

The API request 31-A2 and response 31-A16 can be characterized as an open-jaw call with a requirement that it may not complete until its internal calls 31-A4 to 31-A6 involving SRV_BBX 31-800, 31-A8 to 31-A10 involving SRV_BBX 31-810, and 31-A12 to 31-A14 involving SRV_AP 31-302 are completed. This may be because information is required by SRV_AP 31-300 before it can take a subsequent action, for measuring and integration purposes, or other reason. For example, if an end-to-end tunnel should be built from SRV_AP 31-300 through SRV_BBX 31-800 to SRV_BBX 31-810 to an SRV_AP 31-302 via paths 31-P800 to 31-P808 to 31-P810, then all of those devices may need to be configured or triggered with the appropriate information and details. This type of API call can illustrate the request to set this up via 31-A2 to SRV_CNTRL 31-200 which will then through the internal three API calls 31A4 to 31-A6, 31-A4 to 31-A10, 31-A12 to 31-A14, and the response 31-A16 can include both configuration and settings information for SRV_AP 31-300 to utilize as well as an indication from SRV_CNTRL 31-200 that the other peer devices are set and ready.

FIG. 31 includes EIP 31-500, via 31-P500, POP 31-600 and 31-P600 to the open internet 31-700. FIG. 31 includes EIP 31-502, via 31-P502, POP 31-602 and 31-P502 to EIP 31-502 the open internet 31-702. 31-P100 connects EPD 31-100 and SRV_AP 31-300. 31-P500 connects SRV_AP 31-300 and EIP 31-500. 31-P102 connects EPD 31-102 and SRV_AP 31-302. 31-P502 connects SRV_AP 31-302 and EIP 31-502.

In some embodiments, 31-A4/31-A6 and 31-A8/31-A10 and 31-A12/31-A14 are independent API calls in series/sequences. In other embodiments, 31-A4/31-A6 and 31-A8/31-A10 and 31-A12/31-A14 may be performed in parallel.

Security elements can be placed at various locations within the GVN topology illustrated herein. For example, firewalls FW 31-400 and FW 31-402 may be located along 31-P800 and 31-P810. Firewalls FW 31-400 and FW 31-402 may protect SRV_BBX 31-800 and 31-810 from internet threats ensuring secure backbone communications.

Information about secure egress and ingress points (EIP) 31-500 and 31-502 may also be a factor in this kind of API exchange.

FIG. 32 illustrates a series of API calls between GVN devices and an SRV_CNTRL within the GVN. It illustrates open-jaw API Call bookends encapsulating and enclosing internal API calls. Three internal round-trips are dependencies required by the exterior round-trip to be completed successfully for the outer API call to be constituted as complete. This example embodiment is based on FIG. 31 and it may provide a different perspective of a set of API calls between GVN devices and a central, control server SRV_CNTRL 32-200 in a global virtual network GVN. Open-jaw call bookends API #1 (32-A2 to 32-A16) encapsulate and enclose internal API calls API #2 (31-A4 to 31-A6), API #3 (31-A8 to 31-A10), and API #4 (31-A12 to 31-A14).

Three internal round-trips are a dependency required for the exterior round-trip to be constituted as complete. Response (RESP) for API #1 (32-A16) will wait for internal API calls API #2 (31-A4 to 31-A6), API #3 (31-A8 to 31-A10), API #4 (31-A12 to 31-A14) to be completed before evaluating results and sending back as RESP. Only then will the Open-Jaw API be able to close and response be sent.

This type of sequence is similar to a transaction set of SQL statements. All have to complete or none are able to complete. Roll back may therefore also be possible in the event of a failure of one or more of the calls.

FIG. 33 illustrates the information flow among devices and the central control server (SRV_CNTRL) 33-200 in a GVN, in accordance with an embodiment of the present disclosure. A central repository comprised of database 33-58 and file storage 33-68 may be coupled to the SRV_CNTRL 33-200. In some embodiments, the central repository may store API/action information, in other embodiments it will contain tunnel and route information, and also data utilized to generate contextually device specific server availability lists, and more. For example, the central repository may store a definition of the API/action, a script associated with the API/action that may be used to process the API/action. In some embodiments, the central repository may also store peer relationship of devices. This repository may also store information about known network fabrics, their current and historical performance, characteristics of a network fabric which may be useful in analysis of similar network fabrics, and more.

33-P100 33-P200 33-P300 33-P202 33-P502 33-P206 33-P506 represent communications between GVN devices which have a peer-pair and therefore privileged relationship with each other. EPD 33-100, SRV_AP 33-300 Other Device 33-502 may be coupled with File Storage 33-60 33-62 33-64 and database 33-50 33-52 33-54.

There exists a circular pattern of peer-pair communication illustrated from SRV_CNTRL 33-200 to EPD 33-100 via 33-P100, to SRV_AP 33-300 via 33-P300, or to other devices 33-502 via 33-P502. The EPD 33-100 communicates with SRV_CNTRL 33-200 via P200, SRV_AP 33-300 via 33-P202, and other devices 33-502 via 33-P502.

In some instances, there may be a loop of information shared between devices such as in the case when an EPD 33-100 may request information via 33-P200 from SRV_CNTRL 33-200 which is sent back to EPD 33-100 via 33-P100.

In other instances, one device may report information relevant to other devices such as an SRV_AP 33-300 reporting via 33-P202 to SRV_CNTRL 33-200 which is then sends information via 33-P100 to EPDs 33-100, or via 33-P502 to other devices 33-502.

In yet other instances, a full loop may not be required such as the sending of log information from a device such as an EPD 33-100 to SRV_CNTRL 33-200 via 33-P200, there is no need to further forward this information onward. However, logging information may at a later time be moved from repository on SRV_CNTRL 33-200 to a long-term log storage server 33-502 via 33-P502.

Direct link 33-PT02 is between devices EPD 33-100 and SRV_AP 33-300. Direct link 33-PT08 is from SRV_AP 33-300 to other devices 33-502. Direct links involve communications between devices which do not need involvement of SRV_CNTRL 33-200.

The PUSH info 33-208 from SRV_CNTRL 33-200 could be an RSS feed or other type of information publishing via 33-P208. The API-queries 33-206 from SRV_CNTRL 33-200 could be either a traditional API transaction or RESTful API call with request made via 33-P206REQ and response received via 33-P206RESP. The PUSH 33-206 and API-queries are presented to illustrate devices which do not share peer-pair relationships, action code or definition (e.g., action code and/or definition has not been obtained, action code and/or definition is obsolete), privileged status, and/or similar systems architecture with GVN devices.

Data info is stored in databases on DB 33-50 for EPD 33-100, on DB 33-52 for SRV_AP 33-300, on DB 33-54 for other devices 33-502, DB 33-58 for SRV_CNTRL 33-200, and on DB 33-56 for SRV_BBX 33-500. Furthermore two types of file storage are described herein, HFS—hierarchical file storage for storage hardware hosted on a device for its own internal access, and PFS—Parallel file storage systems which are stand alone and offer RDMA access. PFS 33-510 represents PFS file storage on another device in another location via RDMA (remote) access.

FIG. 34 illustrates the positioning of devices into various internet data centers (IDC), where IDC1 34-002 and IDC2 34-004 are in same region, IDC3 34-006 is located in another region, IDC0 34-000 is denotes the location of central server (SRV_CNTRL) 34-200.

34-P500 is region to region connection between global nodes by international or cross regional link to connect IDC 1 34-002 with IDC 3 34-006. SRV_CNTRL 34-200 servers are multiple master topology with equivalent operation when interacting with various devices. A key feature is aggregation topology where a mesh of SRV_AP 34-200 34-202 34-210 34-212 across multiple data centers in regional clusters linked via paths 34-P200 34-P202 34-P210 34-P212 to a common SRV_BBX node 34-500 which is connected to another SRV_BBX 34-506 in another region which is a long-distance transport aggregation point for SRV_AP 34-220 34-222 via paths 34-P220 and 34-P222. Device operation and collaboration is via API paths such as from SRV_AP 34-212 to SRV_CNTRL 34-200 via path 34-API-08.

Three Layers of the GVN, and how L3 Adapts to Conditions at L1 to Stretch Internal Fabric FIG. 35 illustrates three layers of the GVN and how they interact. LAN 35-000 connects to LAN 35-020 via EPD at hop 35-H0 through to hop 35-H8 inside of internal tunnel 35-L300. In tunnel segments 35-P010 to 35-P016 constitute the end-to-end fabric through the GVN.

The level two logic layer 35-L200 analyzes and adjusts connectivity over the level one network layer 35-L100 to best weave together various layer one fabrics to be optimized for the GVN. Peering points of fabrics and level one base connectivity are 35-S00, 35-S02, 35-S04, and 35-S06. Interaction between 35-L200 and 35-L100 are via 35-LC0102 and interaction between 35-L300 and 35-L200 are via 35-L0203. Seams between base fabrics 35-S00, 35-S02, 35-S04, 35-S06 are managed by Level two 35-L200 such that the traffic of one fabric can flow over a different fabric.

Base internet fabrics 35-100 to 35-102 can be IPv4, IPv6, IB, IPv4/IPv6, or other network type. Path through L300 is the GVN Layer visible to clients. L100 represents the physical network layer for various network segments end-to-end. L200 is the layer where the tapestry is constructed via logic, integration, address mapping, routing, and other techniques.

FIG. 36 illustrates fabrics of base connections and fabrics within tunnels (TUN1) 36-T00. The tunnel runs over-the-top (OTT) of the base connection(s). A further embodiment illustrates communications path(s) between two devices, end point device (EPD) 36-100 and access point server (SRV_AP) 36-200.

The tunnel is over-the-top (OTT) of other base connections and these paths represent network fabric types when available such as 36-OTT00→Internet Protocol version 4 (IPv4) which is the most ubiquitous, 36-OTT02→Internet Protocol version 6 (IPv6), 36-OTT06→InfiniBand (IB), 36-OTT08→Other—some other network type or a combination of fabrics such as IPv4/IPv6 enabled fabric over network segments.

TUN1 36-T00 represents a tunnel (or bridge) built between the two devices over-the-top (OTT) of the Internet. Could be one of 36-OTT00, 36-OTT02, 36-OTT06 or 36-OTT08 end-to-end, or could also be OTT of a combination of various different fabrics in a chain of network segments.

36-P00 is IPv4 fabric within the tunnel, 36-P02 is IPv6 fabric within the tunnel, and 36-P04 is RoCE or encapsulated RDMA over IP Ethernet, 36-P06 is IB over IP (IBoIP) as or other similar protocol, and 36-P08 can also be combination such as IPv4 and IPv6, or other. The key point is end-to-end fabric through tapestry over GVN over any other fabric or chain of various other network fabrics. Devices located either at LAN at EPD 36-100 or in the cloud at SRV_AP 36-300 see the network end-to-end as the fabric which is run through the tunnel, regardless of the underlying base connection.

FIG. 37 is a logical visual representation of different network fabrics at the level one of a global virtual network (GVN) such as being woven into a network tapestry at level three. The flow could be one fabric entering at the top, being combined and carried end-to-end by GVN and exiting at the other end.

For example, IPv6 37-102 can enter the Network Tapestry 37-300 via path 37-P102 and exit at fabric via path 37-P112 to IPv6 37-112, regardless of which type of fabric is in the middle that the GVN is running over the top of.

These various fabrics through the GVN can run in parallel alongside the other fabrics, with an ingress or entry point and an egress or exit point.

FIG. 38 illustrates a base connection of Ethernet Fabric 38-000 at one end with InfiniBand over Fiber 38-002 in the middle, and either Ethernet or InfiniBand 38-006 at the other end. It further illustrates three over-the-top (OTT) tunnels between EPD 38-110 38-120 38-130 and servers 38-116 38-126 and a parallel file system (PFS) device 38-136 at the other end. EPD 38-110 to TUN 38-210 to server 38-116 is InfiniBand (IB) end-to-end. EPD 38-120 to TUN 38-220 to server 38-126 is IP end-to-end. EPD 38-130 is remote direct memory access (RDMA) end-to-end allowing for long distance RDMA access into PFS 38-136.

Paths from one point to another point over the internet will typically transit across more than one type of fabric. The GVN automatically analyzes and weaves together many different network fabrics into a network tapestry. This permits client devices to have a parallel sets of consistent end-to-end fabrics of their choice in parallel over-the-top of a variety of diverse fabric segments. The GVN is a first degree OTT (expressed as $OTT^1$) over the base network such as the internet, and second degree OTT ($OTT^2$) constructs are be built over top of the GVN.

The network tapestry allows for example IPv6 between EPD 38-120 to a server 38-126, but from EPD 38-120 to SRV_AP 38-320, the base connection 38-000 may be over IPv4, because the IPv6 within the tunnel be encapsulated. From the client's perspective it will be IPv6 end-to-end from origin to destination along the network path. The underlying network segments weaved together constitute a tapestry of IPv4 and IPv6 fabrics with potentially other protocols like IB weaved together.

FIG. 39 illustrates two network paths, one at the bottom illustrating the base network connection path at layer one of a GVN, and the other at the top demonstrating a tunnel at the level three of a GVN. To integrate various network fabric types into a network tapestry it involves various devices organized into the topology of the GVN as well as various distributed modules such as, EPD/PEDP connecting to SRV_AP over the top of regular internet connections, Advanced Smart Routing (ASR), Geographic destination, Geographic destination mechanism elements such as chained cache, reverse geo-casting and others, NAPIM enhancing information exchange to enhance data transmission, Global File Manager (GFM), and more.

An EPD knows which SRV_APs it can connect with by utilizing a server availability list produced specifically for that EPD based on testing, load balancing taking into account current and predicted demand from other EPDs and other factors considered by the server availability mechanism 39-222.

Therefore for each device to function according to its role, such as an EPD which will connect with an access point server (SRV_AP), that EPD should have multiple options with respect to building or rebuilding tunnels, stormy weather mode helps it deal with challenging network conditions, and for EPD devices to connect both hosts and peers, plus middle devices, core junctions, and others need to coordinate actions based on shared information.

A key feature for selecting best path type based on data being handled is that testers 39-118 and builders 39-110 work with tunnel manager 39-210 and advanced smart routing 39-228. Related firewall and security monitor 39-0140 and other modules 39-160 working at layer one 39-GVN-1 provide some support to the testers and builders. Traffic and bandwidth analyzer 39-258 and connectivity analysis 39-288 provide information which is used by traffic and bandwidth logger 39-328, and more. The EPD has a tunnel tester 39-322 as does the SRV_AP 39-312 because network path analysis should provide insight into both directions. This approach helps to detect problems with peering or bottlenecks or routing or other issues which may occur in one direction but not in the other direction of data flow.

When dealing with different types of content flow, for example a click vs content serving (images) vs a video stream or large data file are a bit different in their QoS requirements and all of these can handled differently.

To build a dynamic system which is constructs a pathway through a tunnel or series of joined tunnels 39-T01 to 39-T02 to 39-T03 at layer three 39-GIV-3, information is used not just to maintain connectivity between EPD 39-100 and SRV_AP via 39-T01 and between SRV_AP 39-300 and SRV_AP 39-302 via 39-T02, and between SRV_AP 39-302 and EPD 39-102 via 39-T03, but also the best possible bandwidth, at the lowest possible latency, and with other improvements offered.

Enhanced security is provided by auto-built multiple-tunnels between EPDs and SRV_APs, and between other devices and utilizing tunnels within tunnels, and automated secure boot at startup, dynamic tunnels manager capable of on-the-fly configuration, set up, adjustments, and more. These also lead to productivity gains through better connectivity and can provide for best secure network optimization, improved routing and more. Other functionality is both triggered by heartbeat cycles, by scheduled maintenance times and events. This functionality includes testing, logging and analysis of connectivity with automated healing, and understanding of the stitching together of various types of networks into a network tapestry provides a multi-protocol set of multiple fabrics weaved together at the base internet layer one 39-GVN-1 and any end to end path inside the tunnel 39-GVN-3. Testing can analyze the performance of LAN to GVN at both ends of tunnel 39-CTN140 and 39-CTN240, and also can compare and contrast performance and fitness of GVN 39-CTN340 vs Internet 39-CPT340 transregional sections of segments.

ASR at Fabric and Tapestry Scopes

FIG. 40 illustrates multiple tunnels between devices within a global virtual network (GVN) across multiple regions. This example embodiment further describes the routing options available for traffic to take inside a global virtual network's (GVN) pathways at the layer three of a GVN 39-GVN-3. The construct of a GVN is over-the-top (OTT) of the base internet fabrics. Which each segment will take into account the physical network type at layer one 39-GVN-1, the pathway at layer three 39-GVN-3 can be another network type. This approach allows for the tapestry of network types and various fabric protocols to run end-to-end to carry data via the most optimal path for that data type automatically taking into account data size, network conditions and other factors.

The advantage of the OTT over the base internet connection from a client's location at EPD 40-100 to the first SRV_AP 40-300 or SRV_AP 40-302 or SRV_AP 40-304 are that the client can use their regular line, at a lower cost over a dedicated solution, with multiple options from which to enter into the GVN. Although the EPD 40-100 is connecting over the same internet line, TUN 40-T00 and TUN 40-T02 and TUN 40-T04 may offer different quality of service (QoS) because of routing factors, congestion, peering, and capacity of pipes in the middle, and other factors, therefore multiple options improve overall QoS by providing alternatives. These TUNS also can offer different base fabrics on top of which internal fabrics can operate OTT. For example, native InfiniBand (IB) at GVN layer three 39-GVN-3 will run most efficiently if on top of IB at layer one 39-GVN-1.

The GVN is delivered as a service over the top (OTT) of a base connection to aggregation points to backbone to OTT over other fabrics with automation, including multi-layer, multi-step best path analysis via advanced smart routing (ASR), and more functionality. The more available options, the better.

The EPD 40-100 is in one location 40-M0, and SRV_APs in region 40-M2 SRV_AP 40-300, SRV_AP 40-302, and SRV_AP 40-304, and with SRV_APs in region 40-M3 SRV_AP 40-310, SRV_AP 40-312, and SRV_AP 40-314.

Because of the nature of the construct of pathways at layer three 39-GVN-3, there exists a need to mitigate the risk of looping, to prevent wrong geographic destination routing, ASR remote redirect backtrack, as well as to test for, to note and to address broken links between SRV_APs, regions, and other problems.

This diagram also demonstrates the mapping of various egress ingress points (EIP) such as 40-510, 40-512 and 40-514 both as destinations for GVN traffic to find internet fabrics beyond the GVN, as well as a routing starting point for traffic entering the GVN from those locations to be routed via layer three 39-GVN-3 to other locations such as LAN 40-000 via EPD 40-100, or other destinations available via the GVN.

Path selection is therefore based on QoS factors, fabric type at layer one 39-GVN-1, capacity vs current load, contextual mapping based on a device and its path options, and other fixed and dynamic factors.

FIG. 41 illustrates the framework for the running of parallel tunnel tests to measure latency 41-100, bandwidth 41-110, packet loss 41-120, and other measurements 41-150. These processes can be run on a network segment between two devices, over a network fabric at layer one 39-GVN-1, over a GVN pathway or segment at layer three 39-GVN-3, or over other network paths or segments.

Tests can be run in sequential order or in parallel from junction 41-020.

After testing, other processes are run at post-running of tests to clean up, and free resources 41-300. At the end of testing, log test results 41-320 saves pertinent information for reference both by the device running the tests as well as for analysis by a central control server (SRV_AP). This information can be utilized when building contextual dynamic lists of servers for a device to be able to connect with constituting a server availability list taking into account test results as well as mapping of route options for GVN path constructs.

FIG. 42 illustrates an algorithm for running a series of tests in parallel on the connectivity of a path 42-010. Tests are run both on tunnels at layer three 39-GVN-3 and also on the base connection 39-GVN-1. A current tunnel is tested 42-110 and compared and contrasted against testing of the base path 42-120 between for example an EPD and an SRV_AP. Analysis of the results of these two tests can provide insight into the health of the base connection as well as the health of the tunnel. If a tunnel's health is poor but the base connection is good, then a remedy might be simply to rebuild the tunnel, or to use a different set of IP and ports for access into that AP, or other remedy.

In the instance that a tunnel test 42-110 returns poor results but that a test of an alternative tunnel 42-130 provides better connectivity, traffic load can simply be shifted to the better of the two.

It is also crucial to monitor the network use of current users 42-160 for a few reasons. One of the reasons is that performance measurements of tests need to take into account current network load because the test will be sharing bandwidth of the line and therefore may appear to produce a false low BW measure against expected line capacity. Therefore if a connection has a BW of 20 Mbps and users are using 15 Mbps of that BW during a test, it is reasonable to assume that the test will not yield more than 5 Mbps because that is all that is available to it. Another reason to monitor concurrent use is to utilize that information to set parameters for tests such that the testing itself does not impede, slow down, or otherwise interfere with QoS for clients currently using the network.

All results are shared with SRV_CNTRL 42-280 so that granular test results can be aggregated both per device and also by region, system wide, etc. so that it can be analyzed and utilized in the future.

FIG. 43 is a diagram used to describe network options. A 43-100 is source and traffic can be split based on ideal path type, or fabric, or QoS, or other criteria. Testing and logging of QoS of each path 43-P210, 43-P220, 43-P230, 43-P240 and 43-P250 offers analysis and override potential if better via other type of path exists.

The B level B1 43-210, B2 43-220, B3 43-230, B4 43-240, and B5 43-250 are the first connections OTT of base internet connection. The performance of paths 43-P210, 43-P220, 43-P230, 43-P240, and 43-P250 can be compared and contrasted to determine best path from a set of available paths. QoS can also factor fabric and protocol type when determining best path based on most optimal conditions.

The C level C1 43-302 through C15 43-330 are long distance connections based on data type, QoS, relative QoS of currently available alternative connections and paths through the GVN. C level are via B level which all connect with A level as a starting point.

FIG. 44 is also a diagram used to describe network options. This figure continues demonstrating example embodiments described in FIG. 43 with respect to A, B, and C level routing options. New elements are a Client 100, an aggregation point D 44-500 just prior to destination, and a Server 44-800. It further indicates connection paths from level C to aggregation point D such as 44-CP328 from C14 44-328 to D 44-500. There is also a communication path from Client 100 to A 44-100.

This example embodiment can be used to describe the multi-step options available to advanced smart routing (ASR) to be used when plotting best route for traffic type and also taking into account best route based on path quality (QoS) from testing.

There are other embodiments such as a visual mapping to plot route options, to use as a framework for testing and other uses.

FIG. 45 is a flowchart of an algorithm used for test running 45-100 and for remedial action to be taken 45-300 in the event of a problem being detected. This algorithm has a start point 45-000 and an end 45-500 and therefore needs to be triggered when required to run as it is not an infinite loop.

Actions to take could be how to handle detected packet loss 45-P310 which calls for multi-streaming of duplicate content 45-310, or for example if there is a problem with base connection 45-P340 to adjust settings 45-340 at the layer one of the GVN 39-GVN-1, or if there are segment issues 45-P380 the remedy will be to adjust protocol settings 45-390, and more.

Notification can also be triggered in at least two instances; first if a problem is detected 45-200 but not identified logic follows path 45-P300. If the base connection is up but the problem remains elusive, then support can be notified 45-240. Another example of notification is if bandwidth use is at or above capacity 45-P350, then the administrator can be notified 45-350 of this condition. There are also other events which may trigger notification.

Logging is done both of tests 45-110 and also of the remedial actions if problem was detected 45-410. These logs can be replicated to a central control server (SRV_CNTRL) for analysis and future utilization.

FIG. 46 illustrates a topology through a global virtual network (GVN) demonstrating the paths from an end point device (EPD) to the internet in the same region 46-000. The EPD 46-100 also connects to an access point server (SR-V_AP) 46-200 via a tunnel over-the-top of the client's base internet connection. This example embodiment further demonstrates path options for traffic beyond SRV_AP 46-200 to different devices such as an SRV_AP 46-700 via path 46-P700, SRV_AP 46-702 via path 46-P702, and to a backbone exchange server (SRV_BBX) 46-500 via path 46-P500.

This example embodiment further describes same or different protocols in other regions demonstrating the weaving together of various fabrics into a network tapestry. The quality of these connections is also measured. Connectivity quality of service (QoS) from EPD 46-100 to Local Internet 46-000 is measured by QoS ISP 46-802. The performance of the tunnel is measured by QoS TUN OTT ISP to GVN 46-806. Connectivity through the GVN beyond SRV_AP 46-200 is measured by QoS GVN 46-808.

Analysis of the quality of connection through various path type options through the GVN can be utilized to determine the best path for traffic to take based on matching fabric type to data type, size, QoS requirements, and other factors. The more fabrics are understood and weaved together, the more various fabric type options are afforded by a tapestry.

FIG. 47 illustrates an end to end trans-regional network path 47-CPT300. It partitions this path into three distinct sections, a local section in one region 47-CTP310, a local section in the other region 47-CPT320, and a middle section connecting the two regions over long distance backhaul 47-CTP330.

Further features described are fabrics available along this network path 47-CPT300. An internet protocol version four (IPv4) path 47-400 is illustrated by segments from 47-P402 to 47-428. An internet protocol version six (IPv6) path 48-600 is illustrated by segments from 47-P612 to 47-P628. A combination IPv4 and IPv6 path 47-500 is from segment 47-512 to 47-520. A reciprocal slingshot mechanism into a Slinghop is described by path 47-800. A Slinghop integrated into and combined with an IPv4 path is demonstrated by combo path 47-900.

Automated mapping of segments and understanding section options allows for the most efficient weaving together of various network fabrics into a tapestry. Automated tests examine and evaluate all routes, including segments on the base path at level one of a GVN 39-GVN-1, and also inside the GVN Tapestry at level three of the GVN 39-GVN-3.

While there exist methods to run one type of network over another type of base network segment through encapsulation or other methods, these may be inconsistent across multiple diverse segments on the internet and therefore the GVN level two 39-GVN-2 must be able to step between network path fabric types when needed. For example IPv6 can be encapsulated over 47-P402 through 47-P408 and then can be run over native IPv6 via 47-P510 then on to 47-512 through 47-520 and then via 47-P622 to 47-P628.

Tapestry Topology—Example—Stitched Together Fabrics

FIG. 48 illustrates how a GVN is built as a first degree layer over-the-top (OTT$^1$) of base network connectivity. The GVN also weaves together various fabrics and connects layers together, such as from a local area network (LAN) A 48-002 through an egress ingress point (EIP) 48-108 to a local cloud node 48-122 which is a second degree layer over-the-top (OTT$^2$) of a Local GVN (OTT$^1$) 48-112 on an EPD 48-100. The complete network path illustrated can be described as a cloud bridge pathway end-to-end from LAN A 48-002 to LAN B 48-012.

The multi-dimensional over-the-top construct between EPD 48-100 to access point server (SRV_AP) 48-300 is built OTT a combined IPv4 and IPv6 pathway, with the GVN building an IP tunnel 48-112 between them, and through the tunnel a connected pathway built over top of that 48-122.

This topology further extends the edges of the LAN beyond the edge of the LAN 48-000 past the EPD 48-100 and into the cloud as a LAN extension into the cloud 48-322. This mechanism can also pull a cloud node into the EPD 48-100 acting as a local node for cloud services to be hosted via an APP or other GVN functionality.

Other advantages can be realized via this kind of tapestry construct.

FIG. 49 illustrates one possible topology of a GVN where traffic has more than one option for long haul transport between regions.

A tunnel or other type of network path between two access point servers (SRV_AP) can be IP over-the-top (OTT) of the base internet or long haul or other type of Ethernet via path 49-P308 between SRV_AP 49-300 to SRV_AP 49-310. This segment is measured and analyzed by section ETH 49-020.

It also demonstrates a path option between two backbone exchange servers (SRV_BBX) 49-500 and SRV_BBX 49-510 via path 49-P500 to IBX cluster 49-038 to path 49-P510 to SRV_BBX 49-510. This segment is measured and analyzed by section IB 49-028.

FIG. 50 illustrates cross regional traffic pathways between SRV_APs. This figure is similar to FIG. 49 where it describes multiple path options for long distance backhaul such as 50-P620 IP path measured by section OTT IP 50-620. The other option is for IB path 50-P500 through BBX Cluster 50-520 to path 50-P510 between SRV_BBX 50-500 and SRV_BBX 50-510.

This example embodiment further demonstrates multiple SRV_AP servers in IDCs in Region A 50-608 and in Region B 50-618 which offer redundancy, multiple paths, and high availability "front-line" resources for EPD's to have connectivity options governed by server availability.

In this embodiment, SRV_BBX 50-500 and SRV_BBX 50-510 act as aggregation points for their respective regions and are also a cross-regional global node offering enhanced connectivity pathways to another region global nodes and devices there.

FIG. 51 is a flowchart of an algorithm describing how path info is gathered 51-110 and saved 51-116, tests run and compiled 51-120 and utilized to determine the best path for traffic to take through a GVN, to analyze and save 51-126 these results in a database 51-B010. Protocols and specifications for each path are tested 51-130 and saved 51-136. This algorithm can make adjustments 51-210 as needed to improve connectivity. It checks if routes are ideal 51-220, and if not 51-P250, new routes are built and tested 51-250.

If connections 51-300 are not ideal, the path checking and testing restarts via path 51-P102. If conditions are ideal, 51-P380, the results are logged 51-380 and then the path 51-P022 to restart at 51-020. It will wait until the next time cycle 51-040 and if it is time 51-P100, it starts again 51-100.

Tapestry Applied—Example—File Mapping, xfer, Availability Via PFS Devices GVN—Geo-D—Fast Transfer from Remote Region to Local Region FIG. 52 illustrates how the topology of a global virtual network (GVN) can be leveraged to offer end-to-end native RDMA from within the local area network (LAN) of one or more end point device (EPD) 52-100 52-110 locations to connect via a path to a parallel file system (PFS) device 52-608 in either the same or a remote region. It is OTT1 over a GVN tapestry.

RDMA over IB OTT2 fabric construct is built upon a construct which is OTT of the OTT1 of the GVN.

This figure extends the edge of the RDMA fabric so that it is connected via 52-P608 as native RDMA fabric 52-P638. Authentication at the edge can be based on a number of factors at the application layer rather than at the network layer. These can toggle whether the device is discoverable, and if reads and/or writes and/or other operations are allowed on the device, the drive, the folder, the file, etc.

Maximum communications optimization for traffic via integration points on GVN to InfiniBand Server Exchange Point (SRV_BBX). SRV_BBX Parallel File System (PFS) allowing for RDMA availability for File Managers on SRV_AP's both locally and via IB transport FIG. 53 illustrates how a globally distributed parallel file system (PFS) can allow access to one of three parallel file system storage nodes 53-800, or 53-802, or 53-812 seamlessly allowing native RDMA access through a GVN Tapestry over the top (OTT) of various non-native network fabrics to realize the required quality of service (QoS) and adhering to the high performance computing (HPC) principles required for this functionality. The path 53-P300 is the base internet connection over top of which 53-TUN00 runs OTT of 53-P300. The path 53-P500 is either within an IDC or OTT Internet between IDCs.

Another embodiment can be for example of one PFS instance 53-800 in a client's LAN A 53-102 behind an EPD 53-100 linked to two other PFS instances "in the cloud" 53-802 and 53-812. The pathway connecting these three PFS devices through the GVN can be native RDMA as a construct fabric within the greater GVN tapestry regardless of base network connectivity, and in parallel with other constructed fabrics through the GVN.

FIG. 54 also illustrates how a globally distributed parallel file system (PFS) can allow access to a of three parallel file system (PFS) storage node seamlessly allowing native RDMA access through a GVN Tapestry over the top (OTT) of various non-native network fabrics. This example embodiment is a continuation from FIG. 53 and further illustrates the logical construct of RDMA pathway options as bridge paths 54-P600 to 54-P508 and end-to-end path 54-P610 as second-degree over-the-top (OTT2) pathways within a global virtual network (GVN).

This example embodiment further illustrates the application of the network tapestry to offer native RDMA through GVN tunnels between various end points over top (OTT) of various different network fabrics.

Devices in the LAN 54-000 can access files which are physically stored on PFS file storage devices such as 54-600 and/or 54-610 via RDMA as if they were locally and directly connected to the PFS devices. Files synchronization and transfer replication via regions can also be via path 54-P510.

FIG. 55 builds upon FIGS. 53 to 54, and illustrates how devices which are connected via a GVN can have direct RDMA access to parallel file system (PFS) devices in various regions.

It also demonstrates how each server has a hierarchical file system (HFS) attached to it such as access point server (SRV_AP) 55-300 contains HFS file storage device 55-308, and backbone exchange server (SRV_BBX) 55-500 contains HFS 55-508, etc.

The two SRV_BBX servers 55-500 and 55-510 are connected via path IBB 55-580 which refers to Internet Backbone or a fiber connection or other connectivity between two regions. Each SRV_BBX is connected to one or more SRV_AP for example SRV_BBX 55-510 is linked with SRV_AP 55-310. Each SRV_BBX is connected to a native InfiniBand (IB) Cluster in their region such as IB Cluster 55-550 connected with SRV_BBX 55-500 via path 55-P500. This IB Cluster 55-550 provides logical network pathway access to PFS devices 55-552, 55-556, and 55-558 respectively. IB Cluster 55-560 similarly provides access to PFS devices 55-568, 55-566, and 55-562.

This topology as a second degree over the top OTT2 allows for native RDMA paths which are cross regional, cross fabric regardless of network fabrics at the base.

FIG. 56 illustrates how files are stored, cataloged, found, and accessed based on files at the physical layer 56-100, how they are used by a global file manager (GFM) at the usage layer 56-300, and how information about the files is storage in a database (DB) 56-220 at the abstraction layer 56-200. Pathways 56-FA108 and 56-FA102 denote file access (FA). Paths 56-DP102, 56-DP108, and 56-DP220 are for database info path (DP) between the physical files stored on HFS device 56-102 and/or PFS device 56-108, and the file info in the files table at 56-202. Information about each file is stored in a Files table database row for example 56-222 data row. Example fields for a data row in the files table can be [Storage Type] of HFS, PFS, or other, [Device ID] is the ID of Device referencing the devices table, [Server ID] is the Server ID, [Device Type] can be EPD, SRV_AP, SRV_BBX, or other, and [Folder] is the Path to Folder where the file is saved. Other fields may be in the structure of the Files table.

File path (FP) 56-PF102 and 56-FP108 are for file access to HFS 56-102 or to PFS 56-108 respectively, and these are a combination of device type, device ID, and folder ID where the physical file is located.

Other tables related to the files table 56-202 such as file association 56-204, servers 56-210, and users 56-206 can related to files. There may be more or less tables in an implementation.

The key point is that the GFM 56-302 at the usage layer 56-300 has indexed and organized information stored in tables at the abstraction layer 56-200, containing extensive info about each file, and where files are stored on devices at the physical layer 56-100.

FIG. 57 illustrates the operation of global file managers (GFM) on each device in the GVN as well as the operation of a central global file manager (CGFM) on a central control server (SRV_CNTRL) 57-200.

Each GFM is responsible for keeping track of files stored on hierarchical file storage (HFS) devices contained within them such as SRV_AP GFM 57-300 keeping track of files stored on HFS 57-306, SRV_BBX GFM 57-500 to keep track of files stored on HFS 57-506, etc.

Each GFM on every device reports information about its files to the CGFM on the SRV_CNTRL 57-200 via API paths 57-200300, 57-200500, and 57-200510. Conversely, the CGFM also utilizes the aforementioned API paths to replicate file storage and location information to all devices.

Furthermore when files are stored, modified, deleted, or otherwise managed on parallel file system (PFS) devices such as 57-800, 57-802, 57-806, 57-810, 57-812, and 57-816, the file information is also conveyed to the CGFM 57-200 and it in turn replicates this information to all devices.

Also indicated are file transfer path 57-FP300 between SRV_BBX 57-500 and SRV_AP 57-300, and also file transfer path 57-FP500 between SRV_BBX 57-500 and SRV_BBX 57-510.

Tapestry Applied—Example—Geo-Destination

FIG. 58 illustrates a geographic destination mechanism where modules are distributed across devices such as end point device (EPD) 58-100, access point server (SRV_AP) 58-300, central control server (SRV_CNTRL) 58-200, and backbone exchange servers (SRV_BBX) 58-D550 and 58-D500.

Connectivity between EPD 58-100 and SRV_AP 58-300 can be via paths 58-CP02, or 58-TP00 to 58-TP02 or between SRV_BBX 58-D550 and 58-D500 via backbone path 58-BB0.

The SRV_BBX servers allow for the geographic destination mechanism to leverage the network tapestry to realize high speed, long distance file availability via PFS as opposed to chained caching (only) client-server transfer technologies and/or other methods.

FIG. 59 illustrates the geographic destination mechanism within a GVN. It further illustrates an example of the efficiency for the remote fetcher bot (RFB) 59-D328 & content pulling agent (CPA) 58-D320 to work together on behalf of a remote client 58-800 to fetch content 58-600, 58-602, 58-606, 58-608, and 58-610. The content delivery agent (CDA) 58-D120 operating on EPD 58-100 communicates with the CPA 58-D320 such that it operations as if the client 58-800 were located in the remote region where the SRV_AP 58-300 is located. Using the IP Address of the remotely located SRV_AP 58-300, the content fetched from a geo-location perspective is local to that remote region. However, to boost performance, the following functionality of geographic destination mechanism serves to speed up and at the same time to simplify (from the user's perspective on the client), the process as follows: On a modern web page, there tends to be a mash up of many separate content files served from various sources. Where a client fetches individual files from remotely located servers has limitations and problems due to routing, bandwidth (BW) bottlenecks, latency, packet loss, and other issues.

When a client has to fetch a multitude of files such as tens to more than a hundred individual files plus manage the flow of streaming data, the problems of distance can be compounded significantly.

FIG. 60 also illustrates the geographic destination mechanism within a GVN, specifically demonstrating how multiple files 59-600, 59-602, 59-606, and 59-608 are retrieved by the remote fetcher bot (RFB) 59-D328 on access point server (SRV_AP) 59-300 in the remote region where the content is located.

The retrieved files are passed to the cache manager 59-D330 on the SRV_AP 59-300 where they are catalogued and clumped together into one large file 59-700 which can be saved to either parallel file system (PFS) 59-508 or PFS 59-558.

This list of catalogued files is passed to the content delivery agent (CDA) 59-D120 on the EPD 59-100 to be utilized both by the cache manager 59-D130 to de-clump and check the files, and upon successful validation to the CDA 59-D120 to serve the files to clients. The files 59-610, 59-612, 59-616, and 59-618 are served from the EPD 59-100 to the requesting client as if they were being served by the source servers.

This geographic mechanism in conjunction with other elements of a GVN provides the effect of a reverse CDN bringing remote sites to the client at local performance QoS such as low latency and high BW.

Tapestry Applied—Example—WAN

FIG. 61 illustrates the bridging of two LANs 61-000 and 61-010 into a wide area network (WAN) via the EPD's each first connected to an access point server SRV_AP 61-200 via base tunnels build over the top (OTT) of their internet connections.

From EPD 61-100, the base connectivity path OTT is via paths 61-P022 to a point of presence (POP) 61-022 to the internet 61-020 to the POP 61-024 of the SRV_AP 61-300.

From EPD 61-110, the base connectivity path OTT is via paths 61-P032 to a point of presence (POP) 61-032 to the internet 61-030 to the POP 61-034 of the SRV_AP 61-300. This could also point to another SRV_AP not illustrated herein which could be linked to SRV_AP 61-300.

The transit path 61-P026 from POP 61-024 to SRV_AP 61-300 to POP 61-034 via 61-P036 could be the path through the internet, through the SRV_AP or by passing the SRV_AP and relying on the routing on the public network. If the EPD 61-100 wants to connect to EPD 61-102 via the internet, it may follow a different route based on policies out of the control of the GVN or either EPD.

EPD 61-100 builds a tunnel TUN 61-T00 between itself and SRV_AP 61-300. EPD 61-102 also builds a tunnel TUN 61T10 between itself and SRV_AP 61-300. One or both of these tunnels may or may not be encrypted or secured.

There can also be another tunnel, internal tunnel INT TUN 61-T20 running through both of the other tunnels, joined at the SRV_AP 61-300 through which traffic can flow. This tunnel can be the communications path through which the WAN is built connecting EPD 61-100 to EPD 61-110.

The key point is that in tunnel vs base connection connectivity can each be different network protocols. The network tapestry afforded by the GVN can be a blend of different network protocols mapped to a chain of various network segments while concurrently the GVN can be one network type end-to-end over-the-top fabric within the internal tunnel.

FIG. 62 illustrates multiple path options for the transfer of files between an end point device (EPD) 62-100 connected to an access point server (SRV_AP) 62-300 via tunnel TUN 59-200 in one region, and another EPD 62-110 connected to an access point server (SRV_AP) 62-310 via TUN 59-210 in another region.

The paths 62-P600 to 62-600 to 62-P602 and 62-P610 to 62-610 to 62-P612 are for IP OTT internet. The paths via 62-600 are for end-to-end file transfer and the paths via 62-610 utilize chained caching of the file to take advantage of hyper-high speeds at the backbone to bring a file to a storage device as close as possible to the requesting client for a pull or recipient device for a push.

The path 62-P500 connects backbone exchange server (SRV_BBX) 62-500 to SRV_AP 62-300.

The path 62-P510 connects backbone exchange server (SRV_BBX) 62-510 to SRV_AP 62-310.

The paths 62-P800 to 62-800 to 62-P802 and 62-P810 to 62-810 to 62-P810 are for native InfiniBand (TB) over dark fiber or equivalent private line over top of which IP and/or RDMA can flow. Paths via 62-800 are for direct RDMA access to files on the PFS server where they are stored. Paths via 62-810 involve the cloning of files from source PFS device to another PFS device in another region.

Traffic choice is via most advantageous path with traffic flow decision based on traffic type via the most appropriate path type. Best flow of different data via best path type then down best "current" route path through the GVN. This is a double good.

FIG. 63 illustrates the complete isolation of the IBB Path 63-800 so that internal communications are over a clean and secure path.

FW 63-400 and FW 63-410 protect the internal IP communication paths 63-P300 and 63-P310 between access point server (SRV_AP) 63-300 to backbone exchange server (SRV_BBX) 63-500, and SRV_AP 63-310 to SRV_BBX 63-510 respectively.

Another protection is that paths 63-P100, 63-P300, 63-P110, and 63-P310 are internet protocol (IP) and paths 63-P500, 63-P510, and 63-P528 are InfiniBand (IB). This physical protocol jump in addition to firewalls provides a gap that makes it logically impossible for contamination between IP and IB.

FIG. 64 illustrates the topology of a sequential, linear point to point connectivity from Region A 64-000 to/from Region B 64-010 via a large distance 64-020.

SRV_BBX 64-500 acts as a common gate for SRV_AP's in Region A 64-000 such as SRV_AP 64-300.

SRV_BBX 64-510 acts as a common gate for SRV_AP's in Region B 64-010 such as SRV_AP 64-310. The SRV_AP and SRV_BBX in the same region could be located in the same internet data center (IDC) or they could be located in other IDC's in same region, connected by fast links.

A secure file system layer using RDMA over IB between SRV_BBX 64-500 and 64-510 can provide ultra-fast access to files stored on parallel file system (PFS) devices managed by global file system (GFS).

Tapestry Logic and Logical Structures

FIG. 65 illustrates the logical organization of physical and virtual interfaces on an end point device (EPD) 65-100 and their corresponding connectivity to devices beyond the EPD 65-100.

The physical ports ETH0 65-100, ETH1 65-106, and ETH2 65-108 correspond with network plugs on backplanes of the EPD. ETH0 65-102 connects with the last mile connection between the EPD 65-100 and the internet provided by the internet service provider (ISP). ETH0 65-102 connects via path 65-P022 to a point of presence (POP) 65-022 and from there to the internet 65-020 and beyond.

Tunnels TUN0 65-310 and TUN2 65-312 run over-the-top (OTT) of the last mile connectivity over and through ETH0 65-102.

ETH1 65-106 connects with LAN A 65-050 and ETH2 65-108 connects with LAN B 65-060.

Both ETH1 65-106 and ETH2 65-108 are aggregated as LAN connections within the EPD 65-100 at bridge BR0 65-104.

Routing is applied at each of a chain of virtual interfaces (VIF) between BR0 65-104 to VIF0 65-102, where routing table matches go through TUN0 65-310. For addresses which are not matched, they are passed to the VIF1 65-122 where routing table matches will push traffic to TUN2 65-312. The remaining unmatched addresses go to VIF2 65-126 which will then egress via path 65-P022.

Physical fabrics are tested and managed at each of the various physical interfaces. Over the top fabrics are constructed on top of these physical interfaces and these constitute a global virtual network (GVN). The various fabrics are weaved together into a network tapestry.

FIG. 66 illustrates a conceptual model to describe layers at level one 39-GVN-1 of a global virtual network (GVN) and the layers at level three 39-GVN-3 built upon and integrated with level one 39-GVN-1.

It describes the logical construct of layers for an end point device (EPD) 66-100, an access point server (SRV_AP) 66-200, and a backbone exchange server (SRV_BBX) 66-500. It also demonstrates the physical network interfaces (NIC) on each of these devices such as Ethernet NIC 66-M0 on EPD 66-100, or Ethernet NIC 66-M1, IB NIC 66-N1, Ethernet NIC 66-M2 on SRV_AP 66-200, or ETH NIC 66-M3, IB NIC 66-N2 on SRV_BBX 66-500.

Connectivity between ETH NIC 66-M0 on EPD 66-100 and ETH NIC 66-M1 on SRV_AP 66-200 via path Ethernet 66-000. Connectivity between SRV_AP 66-200 and SRV_BBX 66-500 is via either Ethernet path 66-010 or InfiniBand 66-020 providing one or the other as network connectivity options. IB NIC 66-N2 can also connect via InfiniBand path 66-030 to SRV_BBX in another region 66-510. See FIG. 67 for more details about conceptual model layers at the GVN level one 39-GVN-1 and GVN level three 39-GVN-3.

FIG. 67 illustrates level one of a GVN's 39-GVN-1 IP model compared with the GVN's level three 39-GVN-3 IP model in a stacked, over-the-top organization. Level one's Network Interface 67-T1 is the Ethernet protocol 67-R1 for ETH NIC 67-N1. The internet 67-T2 corresponds with IP 67-R2A. Transport 67-T3 corresponds with either protocol TCP 67-R3A or UDP 67-R3B. Application layer 67-T4 can be HTTP 67-R4A, or POP3 67-R4B, or other, or the GVN ETH layer 67-R4C. The GVN stack 67-C3 then correlates with IP layer 67-R5 in the GVN internet 67-G5. GVN Transport 67-G6 correlates with TCP 67-R6A and UPD 67-R6B. Application 67-G7 correlates with FTP 67-R7A, HTTP 67-R7B, POP3 67-R7C, or other.

It further demonstrates how the base layer can be predicated upon an InfiniBand (IB) NIC 67-N2. RDMA layer 67-R2B correlates with Internet 67-T2, and internet protocol (IP) over IB IPoIB 67-R3C correlates with Transport 67-T3, and GVN IB 67-R4D correlates with Application 67-T4.

Systems Diagram—Tapestry

FIG. 68 the base internet layer 68-ATOP82 and a first degree over-the-top layer (OTT$^1$) and a second degree over-the-top layer (OTT$^2$). The internet and OTT$^1$ layers together combine to provide the best route and performance options for traffic to flow through a global virtual network (GVN). The OTT$^2$ layer is on top of the OTT$^1$ layer to provide for a construct to be built on top of the GVN.

There are also five levels of the GVN described which correspond with the three layers noted above.

GVN Level 1 68-L100 is the base network layer. GVN Level 3 68-L300 is the internal pathway which optimized traffic flows through and GVN Level 2 68-L200 is a the logic layer between Level 1 68-L100 and Level 3 68-L300 and this logic layer is where testing, analysis, mapping, routing, adjusting, encapsulating, securing, and other operations are executed to ensure best performance of Level 3 68-L300 over various options presented by Level 1 68-L100.

GVN Level 5 68-L500 is the internal pathway of a constructed element built over-the-top of the GVN internal pathway at Level 3 68-L300 which itself is built over-the-top of the base network layer Level 1 68-L100. GVN Level 4 68-L400 is a logic layer between Level 5 68-L500 and 68-L300 and it entails understanding the options available to it through the GVN, with similar testing, analysis and other operations. Of specific focus are the peering points, stepping up and down between OTT levels, mapping, protocols, and end-to-end pathway options with respect to most appropriate and efficient stitching together of segments in the middle of the path.

This example embodiment can related directly with FIG. 48 where LAN A 48-200, Internet 48-000, Internet 48-010, and LAN B 48-012 are all at GVN Level 1 68-L100.

Local GVN 48-112, GVN on AP 48-312, and Local GVN 48-116 are all at GVN Level 3 68-L300. This layer is where performance and routing are focused on providing options for the GVN.

Local Cloud Node 48-122, LAN extension in Cloud 48-322, and Local Cloud Node 48-128 are all at GVN Level 5 68-L500. These represent the construct through the GVN.

FIG. 69 a system diagram for some example devices in a GVN for harnessing network tapestry. The devices described herein are end point device (EPD) 69-100, access point server (SRV_AP) 69-300, central, control server (SRV_CN-TRL), and backbone exchange server (SRV_BBX) 69-500.

There are two types of network interface cards indicated on the SRV_BBX Ethernet IP NIC 69-506 and IB NIC 69-510 to correspond with these different network protocols based on differences to hardware (HW).

System Software 69-130, 69-330, 69-230, and 69-530 constitute the fabric logic of the GVN to create network tapestry.

There are also communication paths indicated such as:

69-P200↔69-P430↔69-P500—API between SRV_BBX 300 and SRV_CNTRL 200.

69-P510↔SRV_BBX 69-510↔69-P810—which is pass-through to other regions. A parallel file storage device PFS 69-810 is indicated herein as an example and the BBX 69-510 can connect to many others.

69-P100↔69-P400↔69-P300—can indicate traffic or API between EPD & SRV_AP

69-P100↔69-P410↔69-P200—can indicate the API or other type of communications path between EPD and SRV_CNTRL

69-P300↔69-P436↔69-P500—is the path between SRV_AP 69-300 and SRV_BBX 69-500

69-P510↔BBX 69-510—represents the path for traffic over backbone between SRV_BBX servers connecting regional clusters across long distance, or simply joining SRV_BBX hub and spoke clusters with others, including devices such as PFS clusters, other SRV_BBX, other backbones, or more.

Global file managers 69-360, 69-260, and 69-560 catalog and manage files on both hierarchical file systems (HFS) storage devices 69-630, 69-620, 69-650 as well as parallel file systems such as 69-800 or 69-810.

Fabric managers 69-380, 69-280, and 69-580 work independently and at times in lockstep to build first degree over-the-top (OTT1) and second degree over-the-top (OTT2) layers.

The invention claimed is:

1. A system for connecting devices via a global virtual network across network fabrics, comprising:
    a first access point server in communication with a first backbone exchange server and an end point device, wherein the end point device is coupled to a first file system, wherein the first access point server and the end point device communicate via (a) a first communication protocol that uses a store and forward model and (b) a tunnel built over-the-top of the first communication protocol, the tunnel using a second communication protocol that uses cut through switching;
    a second access point server in communication with a second backbone exchange server, wherein the second backbone exchange server is coupled to a second file system, and wherein:
        the second access point server is coupled to the first access point server via a first communication path, the first communication path using the first communication protocol, and
        the second backbone exchange server is coupled to the first backbone exchange server via a second communication path, the second communication path using the second communication protocol; and
    at least one controller that selects the tunnel and the second communication path to carry traffic between the end point device and the second access point server based on one or more of a characteristic of the traffic, a service requirement of the traffic, a characteristic of the first communication path, or a characteristic of the second communication path, wherein carrying the traffic includes writing a file from the end point device to the second file system via a native end-to-end remote direct memory access (RDMA) fabric using the second communication protocol.

2. The system of claim 1 wherein the first communication path is IP over the Internet.

3. The system of claim 1 wherein the second communication path is Infiniband.

4. The system of claim 1 wherein the first communication path is IP over the Internet and the second communication path is Infiniband.

5. The system of claim 1 wherein the end point device directly writes to the second file system using the second communication path without using the first communication path.

6. The system of claim 5 wherein the first communication path is IP over the Internet.

7. The system of claim 5 wherein the second communication path is dark fiber.

8. The system of claim 5 wherein the first communication path is IP over the Internet and the second communication path is dark fiber.

9. The system of claim 5 wherein the end point device uses the remote direct memory access (RDMA) protocol to write to the second file system.

10. The system of claim 1 further comprising:
    a first firewall in the communication path between the first access point server and the first backbone exchange server;
    wherein the firewall isolates the first backbone exchange server from threats present on the first communication path.

11. The system of claim 10 further comprising:
    a second firewall in the communication path between the second access point server and the second backbone exchange server;
    wherein the second firewall isolates the second backbone exchange server from threats present on the first communication path.

12. The system of claim 1 further comprising:
    a host server in communication with the second access point server.

13. The system of claim 12 further wherein the communication protocol between the end point device and the host server is one of Infiniband, RDMA, IPv4, and IPv6.

14. The system of claim 13 further wherein the communication protocol is encapsulated in a different protocol between the end point device and the first access point server.

15. The system of claim 13 further wherein the communication protocol is encapsulated in a different protocol between the second access point server and the host server.

16. The system of claim 13 further wherein the communication protocol is encapsulated in a different protocol between the first backbone exchange server and the second backbone exchange server.

* * * * *